United States Patent
Zhu et al.

(10) Patent No.: US 11,438,860 B2
(45) Date of Patent: Sep. 6, 2022

(54) EVENT SUBSCRIPTION METHOD, APPARATUS, AND SYSTEM

(71) Applicant: Huawei Technologies Co., Ltd., Shenzhen (CN)

(72) Inventors: Fenqin Zhu, Shanghai (CN); Yali Yan, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/062,939

(22) Filed: Oct. 5, 2020

(65) Prior Publication Data

US 2021/0022101 A1 Jan. 21, 2021

Related U.S. Application Data

(63) Continuation of application No. PCT/CN2019/079001, filed on Mar. 21, 2019.

(30) Foreign Application Priority Data

Apr. 4, 2018 (CN) .......................... 201810302102.7

(51) Int. Cl.
*H04W 60/04* (2009.01)
*H04W 4/60* (2018.01)
(Continued)

(52) U.S. Cl.
CPC .............. *H04W 60/04* (2013.01); *H04W 4/50* (2018.02); *H04W 4/60* (2018.02); *H04W 8/04* (2013.01); *H04W 8/18* (2013.01)

(58) Field of Classification Search
CPC ................................. H04W 60/04; H04W 8/04
See application file for complete search history.

(56) References Cited

U.S. PATENT DOCUMENTS 8,787,337 B2 * 7/2014 Jain ...................... H04W 60/04
370/338
2012/0079082 A1 3/2012 Ding et al.
(Continued)

FOREIGN PATENT DOCUMENTS

CN 1885993 A 12/2006
CN 101754180 A 6/2010
(Continued)

OTHER PUBLICATIONS

3GPP TS 23.682 V15.4.0 (Mar. 2018), "3rd Generation Partnership Project; Technical Specification Group Services and System Aspects; Architecture enhancements to facilitate communications with packet data networks and applications (Release 15)," 124 pages.
(Continued)

*Primary Examiner* — Barry W Taylor
(74) *Attorney, Agent, or Firm* — Conley Rose, P.C.

(57) ABSTRACT

An event subscription method includes receiving, by a user data management network element, a second message for subscribing to a second event, where the second message includes a second time parameter and a type of the second event, the type of the second event indicates an event type of the second event, and the type of the second event is a loss of connectivity event, and performing, by the user data management network element, a monitoring management operation on a first event and the second event based on duration of a subscribed periodic update timer of a user equipment (UE) and the second time parameter, where the type of the first event indicates an event type of the first event, and the duration of the subscribed periodic update timer of the UE is determined based on a subscription to the first event.

20 Claims, 24 Drawing Sheets

(51) Int. Cl.
*H04W 4/50* (2018.01)
*H04W 8/04* (2009.01)
*H04W 8/18* (2009.01)

(56) References Cited

U.S. PATENT DOCUMENTS

| | | | | |
|---|---|---|---|---|
| 2016/0142860 A1* | 5/2016 | Kim | ............ | H04W 4/70 |
| | | | | 455/435.1 |
| 2016/0277243 A1* | 9/2016 | Kim | ............ | H04W 24/08 |
| 2016/0286385 A1* | 9/2016 | Ryu | ............ | H04W 68/00 |
| 2016/0337841 A1* | 11/2016 | Won | ............ | H04W 4/70 |
| 2019/0110241 A1* | 4/2019 | Jain | ............ | H04W 24/02 |

FOREIGN PATENT DOCUMENTS

| | | |
|---|---|---|
| CN | 101925047 A | 12/2010 |
| CN | 104702638 A | 6/2015 |
| WO | 2015172079 A1 | 11/2015 |

OTHER PUBLICATIONS

3GPP TS 23.401 V15.3.0 (Mar. 2018), "3rd Generation Partnership Project; Technical Specification Group Services and System Aspects; General Packet Radio Service (GPRS) enhancements for Evolved Universal Terrestrial Radio Access Network (E-UTRAN) access (Release 15)," 405 pages.

3GPP TS 24.301 V15.2.0 (Mar. 2018), "3rd Generation Partnership Project;Technical Specification Group Core Network and Terminals;Non-Access-Stratum (NAS) protocol for Evolved Packet System (EPS); Stage 3 (Release 15)," 513 pages.

3GPP TS 23.502 V15.1.0 (Mar. 2018), "3rd Generation Partnership Project; Technical Specification Group Services and System Aspects; Procedures for the 5G System; Stage 2 (Release 15)," 285 pages.

Huawei et al., "Enhancement of Monitoring Event Configuration," SA WG2 Meeting #130, S2-1900455, Jan. 21-25, 2019, Kochi, India, 2 pages.

Ericsson, "Enhancement of Monitoring Event configuration and Network Parameter Configuration," 3GPP TSG-SA2 Meeting #133, S2-1906370, Reno, Nevada, USA, May 13-17, 2019, 9 pages.

Huawei,"Update for Specific Monitoring Event Handling",SA WG2 Meeting #107 S2-150679,Jan. 26-30, 2015, Total 4 Pages.

Huawei et al.,"Introduction of Monitoring Procedures",SA WG2 Meeting #108 S2-151218,Apr. 13-17, 2015,Total 12 Pages.

Huawei et al.,"Enable T8 for MONTE procedures",SA WG2 Meeting #121 S2-173579,Hangzhou, PRC, May 15-19, 2017,Total 32 Pages.

Huawei et al., "Enhancement of Monitoring Event configuration," 3GPP TSG-SA2 Meeting #133, S2-1905512, May 13-17, 2019, Reno, NV, USA, 11 pages.

* cited by examiner

EVENT SUBSCRIPTION METHOD, APPARATUS, AND SYSTEM

CROSS-REFERENCE TO RELATED APPLICATIONS

This application is a continuation of International Patent Application No. PCT/CN2019/079001 filed on Mar. 21, 2019, which claims priority to Chinese Patent Application No. 201810302102.7 filed on Apr. 4, 2018. The disclosures of the aforementioned applications are hereby incorporated by reference in their entireties.

TECHNICAL FIELD

This application relates to the communications field, and in particular, to an event subscription method, an apparatus, and a system.

BACKGROUND

In a service capability exposure architecture, a service capability server (SCS)/application server (AS) is supported to subscribe to an event for a user equipment (UE). The SCS/AS may subscribe to a plurality of events for the UE, including a loss of connectivity event and a UE reachability event.

In the other approaches, when the SCS/AS subscribes to an event, if a subscription to another event for same UE already exists, and both an existing event subscription request and a new event subscription request carry a time parameter used to set a subscribed periodic update timer of the UE, a home subscriber server (HSS)/unified data management (UDM) network element needs to determine, according to a network policy, to reject or accept the new event subscription request. If the HSS/UDM accepts the new event subscription request, the existing event subscription request is canceled. A plurality of event subscriptions cannot be supported.

SUMMARY

This application provides an event subscription method, an apparatus, and a system, to support a plurality of event subscriptions and improve system performance.

According to a first aspect, an event subscription method is provided, and includes the following operations.

First, a user data management network element receives a second message. The second message is used for subscribing to a second event, the second message includes a second time parameter and a type of the second event, the type of the second event is used to indicate an event type of the second event, and the type of the second event is a loss of connectivity event.

Then, the user data management network element performs a monitoring management operation on a first event and the second event based on duration of a subscribed periodic update timer of user equipment UE and the second time parameter, or based on at least one of a combination of duration of a subscribed periodic update timer of UE and the second time parameter, and a combination of a type of the first event and the type of the second event. The type of the first event is used to indicate an event type of the first event, and the duration of the subscribed periodic update timer of the UE is determined based on a subscription to the first event.

According to the event subscription method in this embodiment of this application, when receiving two event subscription requests for same UE, the user data management function network element performs a monitoring management operation on a first event and a second event based on a type of the second event, based on duration of a subscribed periodic update timer of the UE and a second time parameter, or based on at least one of a combination of duration of a subscribed periodic update timer of the UE and a second time parameter, and a combination of a type of the first event and a type of the second event. In this way, both a subscription to the first event and a subscription to the second event can take effect. This can improve system performance.

With reference to the first aspect, in a possible implementation, the monitoring management operation includes if the second time parameter is greater than the duration of the subscribed periodic update timer of the UE, determining, by the user data management network element, duration of a first timer, and sending event parameter information to a mobility management function network element, where the event parameter information includes the duration of the first timer and the type of the second event, and the duration of the first timer is associated with the type of the second event, or the duration of the first timer is used for subscribing to the second event.

It should be understood that, in this case, the duration of the subscribed periodic update timer of the UE remains unchanged.

In this solution, the mobility management function network element has two timers a mobile reachable timer and the first timer. The first timer is a timer newly added to the mobility management function network element. The mobile reachable timer is set based on the subscription to the first event. Correspondingly, the subscribed timer of the UE is also set based on the subscription to the first event. The second timer is set based on the subscription to the second event. The mobility management function network element may monitor the second event using the first timer. If the type of the first event is a UE reachability event, the mobility management function network element may monitor the first event by monitoring that the UE changes to a connected mode or becomes reachable for paging. If the type of the first event is also a loss of connectivity event, the mobility management function network element may monitor the first event based on the mobile reachable timer.

Optionally, the event parameter information may further include the type of the first event and the duration of the subscribed periodic update timer of the UE.

That is, the user data management function network element also sends the type of the first event and the duration of the subscribed periodic update timer of the UE while sending the type of the second event and the duration of the second timer. The type of the first event is associated with the duration of the subscribed periodic update timer of the UE.

Optionally, the duration of the second timer may be equal to the second time parameter. In this case, the mobile reachable timer and the first timer are started at the same time. Alternatively, the duration of the first timer may be an absolute value of a difference between the duration of the subscribed periodic update timer of the UE and the second time parameter. In this case, the first timer is started while the mobile reachable timer expires.

With reference to the first aspect, in a possible implementation, the monitoring management operation includes if the second time parameter is equal to the duration of the subscribed periodic update timer of the UE, sending, by the user data management network element, event parameter information to a mobility management function network element, where the event parameter information includes the type of the second event.

It should be understood that, in this case, the duration of the subscribed periodic update timer of the UE remains unchanged.

Optionally, the event parameter information may further include indication information, and the indication information is used to indicate that the subscription to the second event is associated with a mobile reachable timer or used to indicate that a mobile reachable timer is further used for subscribing to the second event. Alternatively, the mobility management function network element considers, by default, that the subscription to the second event is associated with the mobile reachable timer. If the type of the first event is a loss of connectivity event, the subscription to the first event is also associated with the mobile reachable timer.

Optionally, the event parameter information may further include the duration of the subscribed periodic update timer of the UE, or may further include the type of the first event.

That is, the user data management function network element also sends the duration of the subscribed periodic update timer of the UE or the type of the first event while sending the type of the second event. The type of the second event is associated with the duration of the subscribed periodic update timer of the UE.

With reference to the first aspect, in a possible implementation, the monitoring management operation includes if the second time parameter is less than the duration of the subscribed periodic update timer of the UE, determining, by the user data management network element, updated duration of the subscribed periodic update timer of the UE based on the second time parameter, and sending event parameter information to a mobility management function network element, where the event parameter information includes the updated duration of the subscribed periodic update timer of the UE and the type of the second event, and the updated duration of the subscribed periodic update timer of the UE is associated with the type of the second event, or the updated duration of the subscribed periodic update timer of the UE is used for subscribing to the second event.

Further, if the type of the first event is loss of connectivity, the monitoring management operation further includes determining, by the user data management network element, duration of a first timer, where the event parameter information further includes the duration of the first timer, and the duration of the first timer is associated with the type of the first event, or the duration of the first timer is further used for subscribing to the first event.

Further, if the type of the first event is a UE reachability event, the subscribed periodic update timer of the UE needs to be reset based on the second time parameter. If the type of the first event is the loss of connectivity event, the subscribed periodic update timer of the UE needs to be reset based on the second time parameter, and the first timer of the mobility management function network element further needs to be set. The first timer is a timer newly added to the mobility management function network element. The mobility management function network element may monitor the second event using a mobile reachable timer, and monitor the first event using the first timer.

Optionally, if the type of the first event is loss of connectivity, the event parameter information may further include the type of the first event. The type of the first event is associated with the duration of the first timer.

Optionally, the updated duration of the subscribed periodic update timer of the UE is equal to the second time parameter. Alternatively, the updated duration of the subscribed periodic update timer of the UE is a difference between the second time parameter and preset duration. The preset duration may be, for example, four minutes. However, this is not limited in this application.

Further, if the type of the first event is loss of connectivity, the duration of the second timer may be equal to the duration of the subscribed periodic update timer of the UE. In this case, the mobile reachable timer and the first timer are started at the same time. Alternatively, the duration of the first timer may be an absolute value of a difference between the duration of the subscribed periodic update timer of the UE and the second time parameter. In this case, the second timer is started while the mobile reachable timer expires.

When the type of the second event is loss of connectivity, in the foregoing possible implementations, when the second time parameter is compared with the duration of the subscribed periodic update timer of the UE, the difference between the second time parameter and the preset duration may be compared with the duration of the subscribed periodic update timer of the UE, and the operation in the foregoing corresponding case is performed based on a result of comparison between the duration of the subscribed periodic update timer of the UE and the difference between the second time parameter and the preset duration.

With reference to the first aspect, in a possible implementation, the duration of the first timer is a larger value between the duration of the subscribed periodic update timer of the UE and the second time parameter, or the duration of the first timer is the absolute value of the difference between the duration of the subscribed periodic update timer of the UE and the second time parameter.

With reference to the first aspect, in a possible implementation, the user data management network element is an HSS or a UDM function network element, and/or the mobility management function network element is a Serving General Packet Radio Service (GPRS) Support Node (SGSN), a mobility management unit, or an access control and mobility management function network element.

According to a second aspect, an event subscription method is provided, and includes the following operations.

First, a user data management network element receives a first message. The first message is used for subscribing to a first event, the first message includes a first time parameter and a type of the first event, and the type of the first event is used to indicate an event type of the first event.

Next, the user data management network element determines duration of a subscribed periodic update timer of user equipment UE based on the first time parameter, and sends the duration of the subscribed periodic update timer of the UE and the type of the first event to a mobility management function network element.

Then, the user data management network element receives a second message. The second message is used for subscribing to a second event, the second message includes a type of the second event, and the type of the second event is used to indicate an event type of the second event.

Last, if the type of the second event is a UE reachability event, the user data management network element sends event parameter information to the mobility management function network element. The event parameter information includes the type of the second event.

With reference to the second aspect, in a possible implementation, the second message includes a second time parameter.

If the second time parameter is less than the duration of the subscribed periodic update timer of the UE, before sending, by the user data management network element, event parameter information to the mobility management function network element, the method further includes determining, by the user data management network element, updated duration of the subscribed periodic update timer of the UE based on the second time parameter, and the event parameter information further includes the updated duration of the subscribed periodic update timer of the UE.

With reference to the second aspect, in a possible implementation, if the type of the first event is a loss of connectivity event, the user data management network element determines both the updated duration of the subscribed periodic update timer of the UE and duration of a first timer based on the second time parameter, and the event parameter information further includes the duration of the first timer, and the duration of the first timer is used for subscribing to the first event.

Further, if the type of the second event is UE reachability, and the second time parameter is less than or equal to the duration of the subscribed periodic update timer of the UE, the subscribed periodic update timer of the UE and a mobile reachable timer of the mobility management function network element do not need to be reset. When the user data management network element sends the event parameter information including the type of the second event to the mobility management function network element, the second event parameter information may further carry the type of the first event.

If the type of the second event is UE reachability, the second time parameter is less than the duration of the subscribed periodic update timer of the UE, and the type of the first event is UE reachability, the subscribed periodic update timer of the UE needs to be reset based on the second time parameter. After determining the updated duration of the subscribed periodic update timer of the UE based on the second time parameter, the user data management function network element sends the type of the second event and the updated duration of the subscribed periodic update timer of the UE to the mobility management function network element. In addition, the mobility management function network element may further send the type of the first event at the same time. After receiving the updated duration of the subscribed periodic update timer of the UE, based on the updated duration of the subscribed periodic update timer of the UE, the mobility management function network element updates the subscribed periodic update timer of the UE, and correspondingly updates the mobile reachable timer. In this case, the mobility management function network element has only an updated mobile reachable timer.

If the type of the second event is the UE reachability event, the second time parameter is less than the duration of the subscribed periodic update timer of the UE, and the type of the first event is the loss of connectivity event, the subscribed periodic update timer of the UE needs to be reset based on the second time parameter, and the first timer of the mobility management function network element further needs to be set. In addition, the mobility management function network element may further send the type of the first event at the same time. After determining the updated duration of the subscribed periodic update timer of the UE and the duration of the first timer based on the second time parameter, the user data management function network element sends the type of the second event, the updated duration of the subscribed periodic update timer of the UE, and the duration of the first timer to the mobility management function network element. After receiving the updated duration of the subscribed periodic update timer of the UE, based on the updated duration of the subscribed periodic update timer of the UE, the mobility management function network element updates the subscribed periodic update timer of the UE, and correspondingly updates the mobile reachable timer. In addition, the mobility management function network element sets the first timer based on the duration of the first timer. In this case, the mobility management function network element has two timers: an updated mobile reachable timer and the first timer. The first timer is a timer newly added to the mobility management function network element. The mobility management function network element may monitor the first event using the first timer.

Optionally, if the type of the second event is the UE reachability event, the updated duration of the subscribed periodic update timer of the UE may be equal to the second time parameter, and duration of the updated mobile reachable timer is equal to a sum of the first time parameter and preset duration. The preset duration may be, for example, four minutes. However, this is not limited in this embodiment of this application.

Further, the duration of the first timer is the duration of the subscribed periodic update timer of the UE, or is a sum of the duration of the subscribed periodic update timer of the UE and the preset duration. In this case, the second timer and the mobile reachable timer are started at the same time. Alternatively, the duration of the first timer is an absolute value of a difference between the duration of the subscribed periodic update timer of the UE and the second time parameter. In this case, the first timer is started while the mobile reachable timer expires.

Optionally, if the type of the second event is UE reachability, the second message may further include a second maximum response time, and if the second maximum response time is greater than a first maximum response time, the event parameter information further includes the second maximum response time, and/or if the second message further includes a second suggested quantity of downlink packets, and the second suggested quantity of downlink packets is greater than a first suggested quantity of downlink packets, the event parameter information further includes the second suggested quantity of downlink packets.

A maximum response time is used to indicate a time in which the UE is in a reachable state. The first maximum response time is a maximum value in maximum response times included in all event subscription request messages for the UE. A suggested quantity of downlink packets is used to indicate a quantity of packets buffered by a network element when the UE is unreachable. The first suggested quantity of downlink packets is a maximum value in suggested quantities, of downlink packets, included in all the event subscription request messages for the UE. That is, the first maximum response time is the maximum value in all the maximum response times included in all the event subscription request messages for the UE. The first suggested quantity of downlink packets is the maximum value in all the suggested quantities, of downlink packets, included in all the event subscription request messages for the UE.

Therefore, according to the event subscription method in this application, the user data management network element can simultaneously monitor two events.

According to a third aspect, an event subscription method is provided, and includes the following operations.

First, a mobility management function network element receives duration of a subscribed periodic update timer of user equipment UE, a type of a first event, and a type of a second event. The type of the first event is used to indicate an event type of the first event, the type of the second event is used to indicate an event type of the second event, the type of the first event is a loss of connectivity event or a UE reachability event, and the type of the second event is a loss of connectivity event or a UE reachability event.

Then, the mobility management function network element sets a mobile reachable timer of the mobility management function network element based on the duration of the subscribed periodic update timer of the UE, and monitors the first event and the second event.

According to the communication method in this embodiment of this application, the mobility management function network element can simultaneously monitor two events, that is, the first event and the second event. This can improve system performance.

With reference to the third aspect, in a possible implementation, if the type of the first event is the loss of connectivity event, the method further includes if the first event is associated with the mobile reachable timer, reporting, by the mobility management function network element, the first event when the mobile reachable timer expires.

With reference to the third aspect, in a possible implementation, if the type of the first event is the UE reachability event, the method further includes reporting, by the mobility management function network element, the first event when the mobility management function network element detects that the UE changes to a connected mode or the UE can be paged.

With reference to the third aspect, in a possible implementation, the method further includes receiving, by the mobility management function network element, duration of a first timer, setting, by the mobility management function network element, the first timer of the mobility management function network element based on the duration of the first timer, where the first timer is associated with the first event, and reporting, by the mobility management function network element, the first event when the first timer expires.

With reference to the third aspect, in a possible implementation, if the type of the second event is the loss of connectivity event, the method further includes if the second event is associated with the mobile reachable timer, reporting, by the mobility management function network element, the second event when the mobile reachable timer expires.

With reference to the third aspect, in a possible implementation, the method further includes receiving, by the mobility management function network element, duration of a first timer, setting, by the mobility management function network element, the first timer of the mobility management function network element based on the duration of the first timer, where the first timer is associated with the second event, and reporting, by the mobility management function network element, the second event when the first timer expires.

With reference to the third aspect, in a possible implementation, if the type of the second event is the UE reachability event, the method further includes reporting, by the mobility management function network element, the second event when the mobility management function network element detects that the UE changes to the connected mode or the UE can be paged.

According to a fourth aspect, an event subscription method is provided, including receiving, by a user data management network element, a first message from a first capability exposure function network element, where the first message is used for subscribing to a first event, determining, by the user data management network element, whether to activate the subscription to the first event, and if the user data management network element determines to activate the subscription to the first event, sending, by the user data management network element, first activation indication information to the first capability exposure function network element, and sending first deactivation indication information to a second capability exposure function network element, where the first activation indication information is used to indicate that the subscription to the first event is activated, and the first deactivation indication information is used to indicate that a currently activated subscription to a second event is deactivated, or if the user data management network element determines not to activate the subscription to the first event, sending, by the user data management network element, first non-activation indication information to the first capability exposure function network element, where the first non-activation indication information is used to indicate that the subscription to the first event is not activated.

The subscription to the first event and the subscription to the second event are event subscriptions for same user equipment UE.

An event type of the first event herein may be a loss of connectivity event, or may be a UE reachability event. An event type of the second event in the following may be a loss of connectivity event, or may be a UE reachability event. This is not limited in this embodiment of this application.

Optionally, the user data management network element may determine, based on a priority of the subscription to the first event, whether to activate the subscription to the first event. The priority of the subscription to the first event may be carried in the first message. Alternatively, an event priority may be specified in a protocol or preconfigured by a system based on an event type or an event subscription type. For example, a priority of the loss of connectivity event is higher than a priority of the UE reachability event, or a priority of the loss of connectivity event is lower than a priority of the UE reachability event. Which information or mechanism used by the user data management network element to determine whether to activate a currently configured event subscription, that is, the subscription to the first event, and a manner in which the user data management network element learns of the event priority are not limited in this embodiment of this application.

According to the event subscription method in this embodiment of this application, only one event subscription can be activated for same UE. However, the user data management network element has stored a currently effective event subscription (for example, the subscription to the second event) and a currently ineffective event subscription (for example, the subscription to the first event), that is, has stored related information of the currently effective event subscription and related information of the currently ineffective event subscription. Therefore, the user data management network element can still activate the currently ineffective event subscription based on the stored event subscriptions or the stored related information of the event subscriptions even if the currently effective event subscription is subsequently deleted.

In this way, compared with a other approaches event subscription mechanism in which another event subscription is canceled while one event subscription is accepted, the event subscription method in this embodiment of this application allows the user data management network element to make, when accepting a new event subscription request and by deactivating instead of canceling an existing event subscription request, the existing event subscription request be in an ineffective state, or to make, when not accepting a new event subscription request, the new event subscription request be in an ineffective state. Based on the flexible event subscription mechanism, after a currently effective event subscription request is deleted, an originally ineffective event subscription request can be activated. This can improve system performance.

With reference to the fourth aspect, in a possible implementation, if the user data management network element determines to activate the subscription to the first event, the method further includes receiving, by the user data management network element, an event subscription deletion request message from the first capability exposure function network element, where the event subscription deletion request message is used to delete the subscription to the first event, deleting, by the user data management network element, the subscription to the first event based on the event subscription deletion request message, and determining to activate the subscription to the second event in at least one event subscription that is currently in a to-be-activated state, and sending, by the user data management network element, second activation indication information to the second capability exposure function network element, where the second activation indication information is used to indicate that the subscription to the second event is activated.

According to the event subscription method in this embodiment of this application, after deleting a currently effective event subscription request, the user data management network element may activate an originally ineffective event subscription request. This can improve system performance.

With reference to the fourth aspect, in a possible implementation, if the user data management network element determines not to activate the subscription to the first event, the method further includes receiving, by the user data management network element, an event subscription deletion request message from the second capability exposure function network element, where the event subscription deletion request message is used to delete the subscription to the second event, deleting, by the user data management network element, the subscription to the second event based on the event subscription deletion request message, and determining to activate the subscription to the first event in at least one event subscription that is currently in a to-be-activated state, and sending, by the user data management network element, third activation indication information to the first capability exposure function network element, where the third activation indication information is used to indicate that the subscription to the first event is activated.

According to the event subscription method in this embodiment of this application, after deleting a currently effective event subscription request, the user data management network element may activate an originally ineffective event subscription request. This can improve system performance.

With reference to the fourth aspect, in a possible implementation, determining, by the user data management network element, whether to activate the subscription to the first event includes determining, by the user data management network element based on the priority of the subscription to the first event, whether to activate the subscription to the first event.

With reference to the fourth aspect, in a possible implementation, the subscription to the first event or the subscription to the second event is used to subscribe to the loss of connectivity event or the UE reachability event.

With reference to the fourth aspect, in a possible implementation, the first capability exposure function network element and the second capability exposure function network element are a same capability exposure network element or different capability exposure network elements.

In the other approaches, if the first capability exposure function network element and the second capability exposure function network element are two different capability exposure network elements, because the user data management network element cancels the subscription to the second event after accepting the subscription to the first event, that is, the user data management network element deletes related information of the subscription to the second event, including an address and the like of the second capability exposure network element, even if the user data management network element subsequently deletes the subscription to the first event, the second capability exposure network element does not learn that the user data management network element has deleted the subscription to the first event, and does not immediately re-subscribe to the second event. However, when accepting the subscription to the first event, the user data management network element in this embodiment of this application only deactivates instead of deleting the subscription to the second event. Therefore, the user data management network element can immediately activate the subscription to the second event after deleting the subscription to the first event. This can improve event subscription efficiency, and can reduce signaling overheads because the second capability exposure network element does not need to send a second message to the user data management network element when needing to re-subscribe to the second event.

With reference to the fourth aspect, in a possible implementation, a deactivated event subscription and a non-activated event subscription are in the to-be-activated state, and an event subscription in the to-be-activated state can be activated.

According to a fifth aspect, a communication method is provided, including receiving, by a user data management network element, a second message, where the second message includes a second time parameter, if the second time parameter is less than duration of a subscribed periodic update timer of user equipment UE, determining, by the user data management network element, updated duration of the subscribed periodic update timer of the UE based on the second time parameter, where the updated duration of the subscribed periodic update timer of the UE is used to update the subscribed periodic update timer of the UE, and the duration of the subscribed periodic update timer of the UE is determined based on a first time parameter in a first message received by the user data management network element, and sending, by the user data management network element, the updated duration of the subscribed periodic update timer of the UE to a mobility management function network element.

Optionally, the second time parameter may be a maximum latency, or may be a maximum detection time.

According to the communication method in this embodiment of this application, the user data management network element sets the subscribed periodic update timer of the UE based on a smaller value between the currently received second time parameter and the duration that is of the subscribed periodic update timer of the UE and that is stored in the user data management network element. In this way, the UE can also meet a current parameter configuration when meeting a previous parameter configuration. For example, the duration that is of the subscribed periodic update timer of the UE and that is stored in the user data management network element is two hours, that is, a maximum latency that is of the UE and that is configured in the previous parameter configuration is two hours, or is a difference between two hours and preset duration (for example, four minutes), and the current parameter configuration, that is, a maximum latency that is of the UE and that is configured using the second message, is one hour. The UE definitely meets that the maximum latency is two hours, provided that the UE meets that the maximum latency is one hour.

With reference to the fifth aspect, in a possible implementation, the first message includes a type of a first event, and the method further includes sending, by the user data management network element, the type of the first event to the mobility management function network element, where the type of the first event is used to indicate an event type of the first event.

With reference to the fifth aspect, in a possible implementation, if the type of the first event is a UE loss of connectivity event, the method includes determining, by the user data management network element, duration of a first timer based on the second time parameter and/or the duration of the subscribed periodic update timer of the UE, and further sending, by the user data management network element, the duration of the first timer to the mobility management function network element when sending the updated duration of the subscribed periodic update timer of the UE to the mobility management function network element, where the duration of the first timer is used to set the first timer of the mobility management function network element, and the first timer is used for subscribing to the first event.

Optionally, the duration of the first timer is the duration of the subscribed periodic update timer of the UE. Alternatively, the duration of the first timer is an absolute value of a difference between the duration of the subscribed periodic update timer of the UE and the second time parameter.

With reference to the fifth aspect, in a possible implementation, the second message includes a second maximum response time, and if the second maximum response time is greater than a first maximum response time, the user data management network element further sends the second maximum response time to the mobility management function network element, where a maximum response time is used to indicate a time in which the UE is in a reachable state, and the first maximum response time is a maximum value in maximum response times included in all event subscription request messages for the UE, and/or the second message includes a second suggested quantity of downlink packets, and if the second suggested quantity of downlink packets is greater than a first suggested quantity of downlink packets, the user data management network element further sends the second suggested quantity of downlink packets to the mobility management function network element, where a suggested quantity of downlink packets is used to indicate a quantity of packets buffered by a network element when the UE is unreachable, and the first suggested quantity of downlink packets is a maximum value in suggested quantities, of downlink packets, included in all the event subscription request messages for the UE.

With reference to the fifth aspect, in a possible implementation, the duration of the first timer is the duration of the subscribed periodic update timer of the UE, or the duration of the first timer is the absolute value of the difference between the duration of the subscribed periodic update timer of the UE and the second time parameter.

According to a sixth aspect, an apparatus is provided, and is configured to perform the method in any one of the first and the second aspects or the possible implementations of the first and the second aspects. Further, the apparatus includes units configured to perform the method in any one of the first and the second aspects or the possible implementations of the first and the second aspects.

According to a seventh aspect, an apparatus is provided, and is configured to perform the method in any one of the third aspect or the possible implementations of the third aspect. Further, the apparatus includes units configured to perform the method in any one of the third aspect or the possible implementations of the third aspect.

According to an eighth aspect, an apparatus is provided, and is configured to perform the method in any one of the fourth aspect or the possible implementations of the fourth aspect. Further, the apparatus includes units configured to perform the method in any one of the fourth aspect or the possible implementations of the fourth aspect.

According to a ninth aspect, an apparatus is provided, and is configured to perform the method in any one of the fifth aspect or the possible implementations of the fifth aspect. Further, the apparatus includes units configured to perform the method in any one of the fifth aspect or the possible implementations of the fifth aspect.

According to a tenth aspect, an apparatus is provided. The apparatus includes a transceiver, a memory, and a processor. The memory is configured to store a computer program. The processor is configured to invoke the computer program in the memory and run the computer program, to enable the apparatus to perform the method in any one of the foregoing aspects or the possible implementations of the foregoing aspects.

According to an eleventh aspect, a computer-readable storage medium is provided, and is configured to store a computer program. The computer program includes an instruction used to perform the method in any one of the foregoing aspects or the possible implementations of the foregoing aspects.

According to a twelfth aspect, a computer program product including an instruction is provided. When the instruction is run on a computer, the computer is enabled to perform the method in any one of the foregoing aspects or the possible implementations of the foregoing aspects.

DESCRIPTION OF EMBODIMENTS

Figure 1:
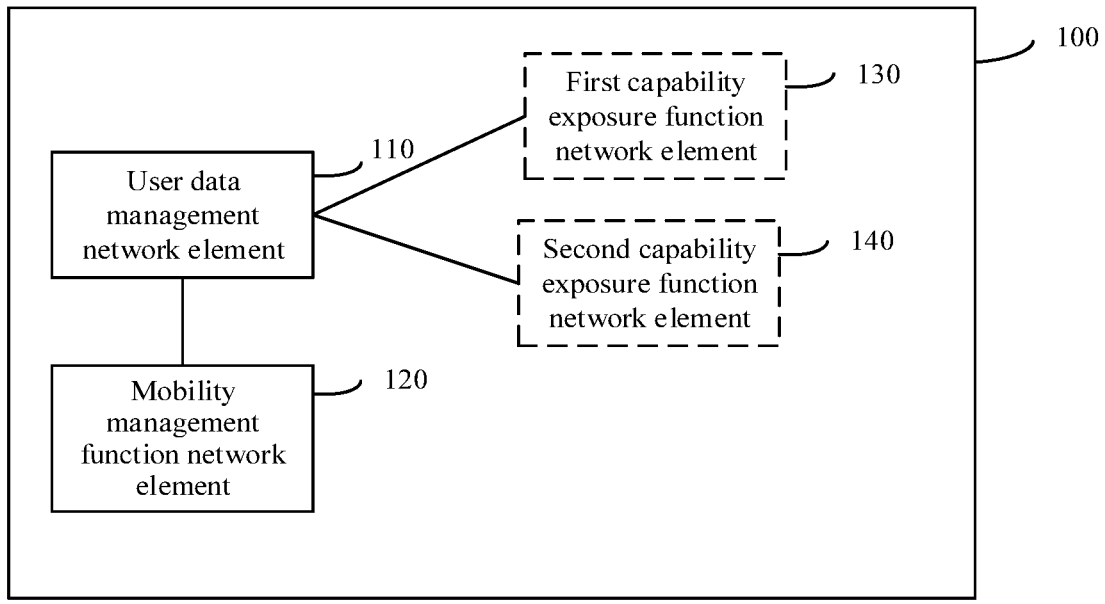
FIG. 1 is a schematic block diagram of a system applicable to this application.

The following describes technical solutions of this application with reference to accompanying drawings.

It should be understood that division of manners, cases, types, and embodiments in the embodiments of this application are merely for ease of description, but should not constitute any special limitation, and features in the manners, types, cases, and embodiments may be combined if they are not mutually exclusive.

The term "and/or" in this specification describes only an association relationship for describing associated objects and represents that three relationships may exist. For example, A and/or B may represent the following three cases: only A exists, both A and B exist, and only B exists. In addition, the character "/" in this specification generally indicates an "or" relationship between the associated objects.

It should be further understood that the terms "first" and "second" in the embodiments of this application are merely used for differentiation, and should not be construed as any limitation on this application.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

In a service capability exposure architecture, an SCS/AS is supported to subscribe to an event for a UE. The SCS/AS may subscribe to a plurality of events for the UE, including a loss of connectivity event and a UE reachability event.

Loss of connectivity means that a 3rd Generation Partnership Project (3GPP) network detects that the UE is no longer reachable for signaling or a user plane. Loss of connectivity is usually detected when a mobility management entity (MME)/SGSN/access and mobility management function (AMF) network element detects that a configured mobile reachable timer expires. If the mobile reachable timer expires, the loss of connectivity event occurs, that is, the UE is no longer reachable for the signaling or the user plane.

UE reachability means that the 3GPP network detects that the UE becomes reachable for a short message service (SMS) or downlink data. UE reachability is usually detected when the MME/SGSN/AMF detects that the UE changes to a connected mode (ECM-CONNECTED) or becomes reachable for paging. If the MME/SGSN/AMF detects that the UE changes to the connected mode or can be paged, the UE reachability event occurs.

In the other approaches, when the UE has no data to be transmitted, the UE is in an idle mode or an energy saving mode. When a subscribed periodic update timer (for example, a routing area update (RAU)/tracking area update (TAU)/registration area update timer) configured by a network for the UE expires, the UE interacts with the network to perform a periodic RAU/TAU/registration update procedure. If the UE performs a normal periodic RAU/TAU/Registration update, it is ensured that the UE is reachable within a specific time, otherwise, the UE is no longer reachable.

When the SCS/AS subscribes to an event, an HSS/UDM sets the subscribed periodic update timer of the UE based on the event subscription of the SCS/AS. If an event type is loss of connectivity and an event subscription request carries a maximum detection time, the HSS/UDM sets the subscribed periodic update timer of the UE based on the maximum detection time. For example, the HSS/UDM may use the maximum detection time as duration of the subscribed periodic update timer of the UE, or use a difference between the maximum detection time and preset duration as duration of the subscribed periodic update timer of the UE. The preset duration is usually four minutes. However, this is not limited in the embodiments of this application. If an event type is UE reachability and an event subscription request carries a maximum latency, the HSS/UDM sets the subscribed periodic update timer of the UE based on the maximum latency. For example, the HSS/UDM may use the maximum latency as the duration of the subscribed periodic update timer of the UE. The maximum detection time indicates a maximum time period in which the network and the UE do not communicate with each other. After this time period, the network needs to notify the SCS/SA subscribing to the event that the UE is unreachable. The maximum latency indicates a maximum latency acceptable for downlink data transmission.

In the other approaches, when the SCS/AS subscribes to an event, if a subscription to another event for same UE already exists, and both an existing event subscription request and a new event subscription request carry a time parameter used to set a subscribed periodic update timer of the UE, the HSS/UDM network element needs to determine, according to a network policy, to reject or accept the new event subscription request. If the HSS/UDM accepts the new event subscription request, the existing event subscription request is canceled. A plurality of event subscriptions cannot be supported.

In view of this, this application provides an event subscription method. In the method, a user data management network element can accept two event subscription requests, to enable two event subscriptions to take effect. This can improve system performance.

FIG. 1 is a schematic block diagram of a system 100 applicable to this application. As shown in FIG. 1, the system 100 includes a user data management network element 110 and a mobility management function network element 120. Optionally, the system may further include a first capability exposure function network element 130 and a second capability exposure function network element 140. Further, the user data management network element 110 is an HSS or a UDM function network element. Optionally, the mobility management function network element 120 is an SGSN, a mobility management unit, or an access control and mobility management function network element.

Optionally, the system may further include UE that is not shown.

In a possible implementation, the system 100 may implement an event subscription method provided in this application, to monitor a plurality of subscription events. For example, the system 100 monitors two subscription events. The following describes in detail the system 100 based on an event type of a second event in the two events.

A: The event type of the second event is loss of connectivity.

The user data management network element 110 is configured to first receive a second message. The second message is used for subscribing to the second event, the second message includes a second time parameter and a type of the second event, the type of the second event is used to indicate the event type of the second event, and the type of the second event is loss of connectivity. Then, the user data management network element 110 performs a monitoring management operation on a first event and the second event based on duration of a subscribed periodic update timer of the UE and the second time parameter, or based on at least one of a combination of duration of a subscribed periodic update timer of UE and the second time parameter, and a combination of a type of the first event and the type of the second event. The type of the first event is used to indicate an event type of the first event, and the duration of the subscribed periodic update timer of the UE is determined based on a subscription to the first event.

Optionally, the second time parameter may be a maximum detection time. For the maximum detection time, refer to the foregoing descriptions. Details are not described herein again.

Further, the user data management network element 110 first receives the subscription to the first event (or a request for subscribing to the first event), and may set the subscribed periodic update timer of the UE based on the subscription to the first event. For example, if the subscription to the first event is used to subscribe to a UE reachability event, that is, when the type of the first event is the UE reachability event, the user data management network element 110 may use a received maximum latency as the duration of the subscribed periodic update timer of the UE. For another example, if the subscription to the first event is used to subscribe to a loss of connectivity event, that is, when the type of the first event is the loss of connectivity event, the user data management network element 110 may use the received maximum detection time as the duration of the subscribed periodic update timer of the UE, or use a difference between the maximum detection time and preset duration as the duration of the subscribed periodic update timer of the UE. The preset duration is usually four minutes. However, this is not limited in this embodiment of this application. Then, when receiving the subscription to the second event (or a request for subscribing to the second event) using the second message, the user data management network element 110 accepts the subscription to the second event and does not delete the subscription to the first event, that is, accepts both the subscription to the first event and the subscription to the second event, and simultaneously performs the monitoring management operation on the first event and the second event based on the type of the second event, based on current duration of the subscribed periodic update timer of the UE and the second time parameter, or based on at least one of a combination of current duration of the subscribed periodic update timer of the UE and the second time parameter, and a combination of the type of the first event and the type of the second event.

Therefore, when accepting two event subscription requests for same UE, the user data management function network element in this embodiment of this application can perform a monitoring management operation on a first event and a second event based on a type of the second event, based on duration of a subscribed periodic update timer of the UE and a second time parameter, or based on at least one of a combination of duration of a subscribed periodic update timer of the UE and a second time parameter, and a combination of a type of the first event and a type of the second event. In this way, both a subscription to the first event and a subscription to the second event can take effect. This can improve system performance.

The user data management network element 110 performs different monitoring management operations in three different cases in which the second time parameter is greater than, equal to, and less than the duration of the subscribed periodic update timer of the UE. The following separately describes the three cases.

First, it should be understood that a mobile reachable timer of the mobility management function network element is set based on the current duration of the subscribed periodic update timer of the UE.

In a first case, the second time parameter is greater than the duration of the subscribed periodic update timer of the UE.

In this case, the monitoring management operation includes determining, by the user data management network element, duration of a first timer, and sending event parameter information to the mobility management function network element.

The event parameter information includes the duration of the first timer and the type of the second event. The duration of the first timer is used for subscribing to the second event, the duration of the first timer is associated with the type of the second event, or the duration of the first timer is associated with the subscription to the second event or the second event. Alternatively, the duration of the first timer is used to set the first timer of the mobility management function network element, and the first timer is used for subscribing to the second event. Further, if the type of the second event is a loss of connectivity event, and the second time parameter is greater than the duration of the subscribed periodic update timer of the UE, duration of the mobile reachable timer of the mobility management function network element remains unchanged, and the user data management function network element needs to determine duration of a timer associated with the subscription to the second event, that is, the duration of the first timer of the mobility management function network element. When sending the type of the second event to the mobility management function network element, the user data management function network element sends, to the mobility management function network element, the duration that is of the first timer and that is associated with the type of the second event.

After receiving the duration of the first timer, the mobility management function network element sets the first timer based on the duration of the first timer. If the user data management function network element does not send, when sending the type of the second event and the duration of the second timer, the type of the first event or a parameter used to set the duration of the subscribed periodic update timer of the UE, the mobility management function network element does not change existing duration of the subscribed periodic update timer of the UE by default. In this case, the mobility management function network element has two timers: the mobile reachable timer and the first timer. The first timer is a timer newly added to the mobility management function network element. The mobile reachable timer is set based on the subscription to the first event. Correspondingly, the subscribed timer of the UE is also set based on the subscription to the first event. The second timer is set based on the subscription to the second event. The mobility management function network element may monitor the second event using the first timer. If the type of the first event is also the UE reachability event, the mobility management function network element may monitor the first event by monitoring that the UE changes to a connected mode or becomes reachable for paging. If the type of the first event is also the loss of connectivity event, the mobility management function network element may monitor the first event based on the mobile reachable timer.

Optionally, the event parameter information may further include the type of the first event and the duration of the subscribed periodic update timer of the UE.

That is, the user data management function network element also sends the type of the first event and the duration of the subscribed periodic update timer of the UE while sending the type of the second event and the duration of the second timer. The type of the first event is associated with the duration of the subscribed periodic update timer of the UE.

Optionally, if the first case is met, the duration of the second timer may be equal to the second time parameter. In this case, the mobile reachable timer and the first timer are started at the same time. Alternatively, the duration of the first timer may be an absolute value of a difference between the duration of the subscribed periodic update timer of the UE and the second time parameter. In this case, the first timer is started while the mobile reachable timer expires.

In a second case, the second time parameter is equal to the duration of the subscribed periodic update timer of the UE.

In this case, the monitoring management operation includes sending, by the user data management network element, event parameter information to the mobility management function network element. The event parameter information includes the type of the second event.

In addition, the user data management network element may further send indication information to the mobility management function network element. The indication information is used to indicate that the subscription to the second event is associated with the mobile reachable timer or used to indicate that the mobile reachable timer is further used for subscribing to the second event. Alternatively, if the user data management network element does not send any time parameter, the mobility management function network element considers, by default, that the subscription to the second event is associated with the mobile reachable timer. If the type of the first event is the loss of connectivity event, the subscription to the first event is also associated with the mobile reachable timer.

Further, if the type of the second event type is loss of connectivity, and the second time parameter is equal to the duration of the subscribed periodic update timer of the UE, the subscribed periodic update timer of the UE does not need to be reset. The user data management function network element may send only the type of the second event and may not send the duration of the subscribed periodic update timer of the UE to the mobility management function network element. If the user data management function network element does not send, when sending the type of the second event, a parameter used to set the duration of the subscribed periodic update timer of the UE, the mobility management function network element does not change existing duration of the subscribed periodic update timer of the UE by default. After receiving the type of the second event, the mobility management function network element may determine that the subscribed periodic update timer of the UE does not need to be reset. Correspondingly, the mobile reachable timer does not need to be reset, either. The mobility management function network element may monitor the second event using the mobile reachable timer. If the type of the first event is also loss of connectivity, the mobility management function network element may monitor the first event using the mobile reachable timer.

Optionally, the event parameter information may further include the duration of the subscribed periodic update timer of the UE, or may further include the type of the first event.

That is, the user data management function network element also sends the duration of the subscribed periodic update timer of the UE or the type of the first event while sending the type of the second event. The type of the second event is associated with the duration of the subscribed periodic update timer of the UE.

In a third case, the second time parameter is less than the duration of the subscribed periodic update timer of the UE.

In this case, the monitoring management operation includes determining, by the user data management network element, updated duration of the subscribed periodic update timer of the UE based on the second time parameter, and sending event parameter information to the mobility management function network element.

The event parameter information includes the updated duration of the subscribed periodic update timer of the UE and the type of the second event. The updated duration of the subscribed periodic update timer of the UE is used for subscribing to the second event, or the updated duration of the subscribed periodic update timer of the UE is associated with the type of the second event.

Further, if the third case is met and the type of the first event is the loss of connectivity event, the monitoring management operation further includes determining, by the user data management network element, the duration of the first timer. The subscription to the first event is associated with the duration of the first timer, the duration of the first timer is further used for subscribing to the first event, or the duration of the first timer is associated with the type of the first event.

Further, if the type of the second event is a loss of connectivity event, the second time parameter is less than the duration of the subscribed periodic update timer of the UE, and the type of the first event is UE reachability, the subscribed periodic update timer of the UE needs to be reset based on the second time parameter. After determining the updated duration of the subscribed periodic update timer of the UE based on the second time parameter, the user data management function network element sends the type of the second event and the updated duration of the subscribed periodic update timer of the UE to the mobility management function network element. After receiving the updated duration of the subscribed periodic update timer of the UE, based on the updated duration of the subscribed periodic update timer of the UE, the mobility management function network element updates the subscribed periodic update timer of the UE, and correspondingly updates the mobile reachable timer. In this case, the mobility management function network element has only an updated mobile reachable timer. The mobility management function network element may monitor the second event using the updated mobile reachable timer.

If the type of the second event is the loss of connectivity event, the second time parameter is less than the current duration of the subscribed periodic update timer of the UE, and the type of the first event is loss of connectivity, the subscribed periodic update timer of the UE needs to be reset based on the second time parameter, and the first timer of the mobility management function network element further needs to be set. After determining the updated duration of the subscribed periodic update timer of the UE and the duration of the first timer based on the second time parameter, the user data management function network element sends the type of the second event, the updated duration of the subscribed periodic update timer of the UE, and the duration of the first timer to the mobility management function network element. After receiving the updated duration of the subscribed periodic update timer of the UE, based on the updated duration of the subscribed periodic update timer of the UE, the mobility management function network element updates the subscribed periodic update timer of the UE, and correspondingly updates the mobile reachable timer. In addition, the mobility management function network element sets the first timer based on the duration of the first timer. In this case, the mobility management function network element has two timers: an updated mobile reachable timer and the first timer. The first timer is a timer newly added to the mobility management function network element. The mobility management function network element may monitor the second event using the mobile reachable timer, and monitor the first event using the first timer.

Optionally, if the third case is met and the type of the first event is loss of connectivity, the event parameter information may further include the type of the first event. The type of the first event is associated with the duration of the first timer.

Optionally, if the third case is met, the updated duration of the subscribed periodic update timer of the UE is equal to the second time parameter. Alternatively, the updated duration of the subscribed periodic update timer of the UE is a difference between the second time parameter and preset duration. The preset duration may be, for example, four minutes. However, this is not limited in this embodiment of this application.

Further, if the third case is met and the type of the first event is loss of connectivity, the duration of the second timer may be equal to the duration of the subscribed periodic update timer of the UE. In this case, the mobile reachable timer and the first timer are started at the same time. Alternatively, the duration of the first timer may be an absolute value of a difference between the duration of the subscribed periodic update timer of the UE and the second time parameter. In this case, the second timer is started while the mobile reachable timer expires.

In this embodiment of this application, when the type of the second event is loss of connectivity, and when the second time parameter is compared with the duration of the subscribed periodic update timer of the UE, the difference between the second time parameter and the preset duration may be compared with the duration of the subscribed periodic update timer of the UE, and the operation in the foregoing corresponding case is performed based on a result of comparison between the duration of the subscribed periodic update timer of the UE and the difference between the second time parameter and the preset duration.

B: The event type of the second event is UE reachability.

The user data management network element 110 is configured to receive a first message, where the first message is used for subscribing to a first event, the first message includes a first time parameter and a type of the first event, and the type of the first event is used to indicate an event type of the first event, determine duration of a subscribed periodic update timer of UE based on a first time parameter, send the duration of the subscribed periodic update timer of the UE and the type of the first event to the mobility management function network element, receive a second message, where the second message is used for subscribing to the second event, the request message for subscribing to the second event includes a type of the second event, and the type of the second event is used to indicate the event type of the second event, and if the type of the second event is a UE reachability event, send event parameter information to the mobility management function network element, where the event parameter information includes the type of the second event.

Optionally, the second message includes a second time parameter. If the second time parameter is less than the duration of the subscribed periodic update timer of the UE, before the user data management network element sends the event parameter information to the mobility management function network element, the user data management network element further determines updated duration of the subscribed periodic update timer of the UE based on the second time parameter. The event parameter information further includes the updated duration of the subscribed periodic update timer of the UE. It should be understood that the updated duration of the subscribed periodic update timer of the UE is used for subscribing to the second event.

Further, if the type of the first event is a loss of connectivity event, the user data management network element determines both the updated duration of the subscribed periodic update timer of the UE and duration of a first timer based on the second time parameter. The event parameter information further includes the duration of the first timer, and the duration of the first timer is used for subscribing to the first event.

Further, if the type of the second event is the UE reachability event, and the second time parameter is less than or equal to the duration of the subscribed periodic update timer of the UE, the subscribed periodic update timer of the UE and a mobile reachable timer of the mobility management function network element do not need to be reset. When the user data management network element sends the event parameter information including the type of the second event to the mobility management function network element, the second event parameter information may further carry the type of the first event.

If the type of the second event is the UE reachability event, the second time parameter is less than the duration of the subscribed periodic update timer of the UE, and the type of the first event is a UE reachability event, the subscribed periodic update timer of the UE needs to be reset based on the second time parameter. After determining the updated duration of the subscribed periodic update timer of the UE based on the second time parameter, the user data management function network element sends the type of the second event and the updated duration of the subscribed periodic update timer of the UE to the mobility management function network element. In addition, the mobility management function network element may further send the type of the first event at the same time. After receiving the updated duration of the subscribed periodic update timer of the UE, based on the updated duration of the subscribed periodic update timer of the UE, the mobility management function network element updates the subscribed periodic update timer of the UE, and correspondingly updates the mobile reachable timer. In this case, the mobility management function network element has only an updated mobile reachable timer.

If the type of the second event is the UE reachability event, the second time parameter is less than the duration of the subscribed periodic update timer of the UE, and the type of the first event is loss of connectivity, the subscribed periodic update timer of the UE needs to be reset based on the second time parameter, and the first timer of the mobility management function network element further needs to be set. In addition, the mobility management function network element may further send the type of the first event at the same time. After determining the updated duration of the subscribed periodic update timer of the UE and the duration of the first timer based on the second time parameter, the user data management function network element sends the type of the second event, the updated duration of the subscribed periodic update timer of the UE, and the duration of the first timer to the mobility management function network element. After receiving the updated duration of the subscribed periodic update timer of the UE, based on the updated duration of the subscribed periodic update timer of the UE, the mobility management function network element updates the subscribed periodic update timer of the UE, and correspondingly updates the mobile reachable timer. In addition, the mobility management function network element sets the first timer based on the duration of the first timer. In this case, the mobility management function network element has two timers: an updated mobile reachable timer and the first timer. The first timer is a timer newly added to the mobility management function network element. The mobility management function network element may monitor the first event using the first timer.

Optionally, if the type of the second event is UE reachability, the updated duration of the subscribed periodic update timer of the UE may be equal to the second time parameter, and duration of the updated mobile reachable timer is equal to a sum of the first time parameter and preset duration. The preset duration may be, for example, four minutes. However, this is not limited in this embodiment of this application.

Further, the duration of the first timer is the duration of the subscribed periodic update timer of the UE, or is a sum of the duration of the subscribed periodic update timer of the UE and the preset duration. In this case, the second timer and the mobile reachable timer are started at the same time. Alternatively, the duration of the first timer is an absolute value of a difference between the duration of the subscribed periodic update timer of the UE and the second time parameter. In this case, the first timer is started while the mobile reachable timer expires.

Optionally, in an embodiment of this application, if the type of the second event is UE reachability, the second message may further include a second maximum response time, and if the second maximum response time is greater than a first maximum response time, the event parameter information further includes the second maximum response time, and/or if the second message further includes a second suggested quantity of downlink packets, and the second suggested quantity of downlink packets is greater than a first suggested quantity of downlink packets, the event parameter information further includes the second suggested quantity of downlink packets.

A maximum response time is used to indicate a time in which the UE is in a reachable state. The first maximum response time is a maximum value in maximum response times included in all event subscription request messages for the UE. A suggested quantity of downlink packets is used to indicate a quantity of packets buffered by a network element when the UE is unreachable. The first suggested quantity of downlink packets is a maximum value in suggested quantities, of downlink packets, included in all the event subscription request messages for the UE. That is, the first maximum response time is the maximum value in all the maximum response times included in all the event subscription request messages for the UE. The first suggested quantity of downlink packets is the maximum value in all the suggested quantities, of downlink packets, included in all the event subscription request messages for the UE.

It should be understood that, in this application, assuming that the second message received by the user data management function network element is sent by the second capability exposure function network element, regardless of whether the type of the second event is loss of connectivity or UE reachability, the event parameter information sent by the user data management function network element to the mobility management function network element further includes an identifier of the second capability exposure function network element and a reference identifier that is allocated by the second capability exposure function network element for the subscription to the second event. When the second event occurs, the mobility management function network element may send a report on the second event to the second capability exposure function network element based on the identifier of the second capability exposure function network element and the reference identifier that is allocated by the second capability exposure function network element for the subscription to the second event. Assuming that the subscription to the first event or the first message is sent by the first capability exposure function network element, regardless of whether the type of the first event is loss of connectivity or UE reachability, when sending the duration of the subscribed periodic update timer of the UE to the mobility management function network element, the user data management function network element further sends an identifier of the first capability exposure function network element and a reference identifier that is allocated by the first capability exposure function network element for the subscription to the first event. When the first event occurs, the mobility management function network element may send a report on the first event to the first capability exposure function network element based on the identifier of the first capability exposure function network element and the reference identifier that is allocated by the first capability exposure function network element for the subscription to the first event.

In another possible implementation, the system 100 may implement a communication method in this application.

The user data management network element 110 is configured to receive a second message, where the second message includes a second time parameter, if the second time parameter is less than duration of a subscribed periodic update timer of UE, determine updated duration of the subscribed periodic update timer of the UE based on the second time parameter, where the updated duration of the subscribed periodic update timer of the UE is used to update the subscribed periodic update timer of the UE, and the duration of the subscribed periodic update timer of the UE is determined based on a first time parameter in a first message received by the user data management network element, and send the updated duration of the subscribed periodic update timer of the UE to the mobility management function network element.

Optionally, the second time parameter may be a maximum latency, or may be a maximum detection time. This is not limited in this embodiment of this application.

Further, the updated duration of the subscribed periodic update timer of the UE may be equal to the maximum latency, or may be equal to or slightly less than the maximum detection time (for example, may be four minutes less than the maximum detection time).

Further, the user data management network element first sets the duration of the subscribed periodic update timer of the UE based on the first time parameter in the first message. After receiving the second message, the user data management network element compares the second time parameter in the second message with the duration that is of the subscribed periodic update timer of the UE and that is stored in the user data management network element. If the second time parameter is less than the duration of the subscribed periodic update timer of the UE, the user data management network element determines the updated duration of the subscribed periodic update timer of the UE based on the second time parameter, and sends the updated duration of the subscribed periodic update timer of the UE to the mobility management function network element. After receiving the updated duration of the subscribed periodic update timer of the UE, the mobility management function network element may update the subscribed periodic update timer of the UE and a mobile reachable timer of the mobility management function network element based on the updated duration of the subscribed periodic update timer of the UE.

Therefore, the user data management network element in this embodiment of this application sets the subscribed periodic update timer of the UE based on a smaller value between the currently received second time parameter and the duration that is of the subscribed periodic update timer of the UE and that is stored in the user data management network element. In this way, the UE can also meet a current parameter configuration when meeting a previous parameter configuration. For example, the duration that is of the subscribed periodic update timer of the UE and that is stored in the user data management network element is two hours, that is, a maximum latency that is of the UE and that is configured in the previous parameter configuration is two hours, or is a difference between two hours and preset duration (for example, four minutes), and the current parameter configuration, that is, a maximum latency that is of the UE and that is configured using the second message, is one hour. The UE definitely meets that the maximum latency is two hours, provided that the UE meets that the maximum latency is one hour.

Optionally, the first message includes a type of a first event. The user data management network element is further configured to send the type of the first event to the mobility management function network element. The type of the first event is used to indicate an event type of the first event.

That is, the first message is used for subscribing to the first event. When subscribing to the first event, the user data management network element further needs to send the event type of the first event, that is, the type of the first event, to the mobility management function network element.

In addition, it should be understood that, if the first event needs to be reported when the first event occurs, the mobility management function network element further needs to notify the mobility management function network element of parameter information required for reporting the first event. For example, if the first message is sent by the first capability exposure function network element, the user data management function network element needs to notify the mobility management function network element of an identifier of the first capability exposure function network element and a reference identifier that is allocated by the first capability exposure function network element for the subscription to the first event. When the first event occurs, the mobility management function network element may send a report on the first event to the first capability exposure function network element based on the identifier of the first capability exposure function network element and the reference identifier that is allocated by the first capability exposure function network element for the subscription to the first event.

Further, if the type of the first event is a UE loss of connectivity event, the user data management network element is further configured to determine duration of a first timer based on the second time parameter and/or a duration parameter of the subscribed periodic update timer of the UE, and further send the duration of the first timer to the mobility management function network element when sending the updated duration of the subscribed periodic update timer of the UE to the mobility management function network element, where the duration of the first timer is used to set the first timer of the mobility management function network element, and the first timer is used for subscribing to the first event.

That is, if the second time parameter is less than the duration of the subscribed periodic update timer of the UE and the type of the first event is the UE loss of connectivity event, the user data management network element needs to re-determine a time parameter used to set the subscribed periodic update timer of the UE, that is, the updated duration of the subscribed periodic update timer of the UE, and further needs to determine duration of a timer (that is, the first timer) newly added to the mobility management function network element. The mobility management function network element may update the subscribed periodic update timer of the UE and the mobile reachable timer of the mobility management function network element based on the updated duration of the subscribed periodic update timer of the UE, and set the first timer based on the duration of the first timer.

Optionally, the duration of the first timer is the duration of the subscribed periodic update timer of the UE. Alternatively, the duration of the first timer is an absolute value of a difference between the duration of the subscribed periodic update timer of the UE and the second time parameter.

Optionally, the second message may further include a second maximum response time, and if the second maximum response time is greater than a first maximum response time, the user data management network element is further configured to send the second maximum response time to the mobility management function network element, and/or the second message may further include a second suggested quantity of downlink packets, and if the second suggested quantity of downlink packets is greater than a first suggested quantity of downlink packets, the user data management network element is further configured to send the second suggested quantity of downlink packets to the mobility management function network element.

A maximum response time is used to indicate a time in which the UE is in a reachable state. The first maximum response time is a maximum value in maximum response times included in all event subscription request messages for the UE. A suggested quantity of downlink packets is used to indicate a quantity of packets buffered by a network element when the UE is unreachable. The first suggested quantity of downlink packets is a maximum value in suggested quantities, of downlink packets, included in all the event subscription request messages for the UE.

In a possible implementation, the mobility management function network element 120 is configured to receive the duration of the subscribed periodic update timer of the UE, the type of the first event, and a type of a second event, where the type of the first event is used to indicate the event type of the first event, the type of the second event is used to indicate an event type of the second event, the type of the first event is the loss of connectivity event or a UE reachability event, and type of the second event is the loss of connectivity event or the UE reachability event, and set the mobile reachable timer of the mobility management function network element based on the duration of the subscribed periodic update timer of the UE, and monitor the first event and the second event.

It should be understood that the type of the first event and the type of the second event may be simultaneously received by the mobility management function network element, or may not be simultaneously received by the mobility management function network element.

It should be further understood that the duration of the subscribed periodic update timer of the UE herein may be the duration of the subscribed periodic update timer of the UE, or may be the updated duration of the subscribed periodic update timer of the UE in the foregoing descriptions of the user data management network element 110. In summary, the duration of the subscribed periodic update timer of the UE herein is finally used duration of the subscribed periodic update timer of the UE.

The mobility management function network element in this embodiment of this application can simultaneously monitor the first event and the second event. This can improve system performance.

It should be understood that the mobility management function network element 120 in this embodiment of this application may correspond to the second case in the foregoing descriptions of the user data management network element 110.

It should be understood that, when receiving an event type, the mobility management function network element in this specification further receives parameter information associated with the event type. For example, when receiving the type of the first event, the mobility management function network element further receives the identifier of the first capability exposure function network element that allocates the reference identifier for the subscription to the first event, and the reference identifier that is allocated by the first capability exposure function network element for the subscription to the first event. When the first event occurs, the mobility management function network element may report the first event to the first capability exposure function network element based on the identifier of the first capability exposure function network element and the reference identifier that is allocated by the first capability exposure function network element for the subscription to the first event.

When receiving the type of the second event, the mobility management function network element further receives an identifier of the second capability exposure function network element that allocates a reference identifier for a subscription to the second event, and the reference identifier that is allocated by the second capability exposure function network element for the subscription to the second event. When the second event occurs, the mobility management function network element may report the second event to the second capability exposure function network element based on the identifier of the second capability exposure function network element and the reference identifier that is allocated by the second capability exposure function network element for the subscription to the second event.

Optionally, if the type of the first event is the loss of connectivity event, the mobility management function network element 120 is further configured to report the first event when the first event is associated with the mobile reachable timer and the mobile reachable timer expires.

Further, when the first event is the loss of connectivity event, if the mobility management function network element detects that the mobile reachable timer expires, it indicates that the UE is unreachable. In this case, the mobility management function network element reports the first event or sends a report on the first event. For example, the mobility management function network element may report the first event to the first capability exposure function network element.

Optionally, if the type of the first event is the UE reachability event, the mobility management function network element 120 is further configured to report the first event when detecting that the UE changes to a connected mode or the UE can be paged.

Optionally, the mobility management function network element 120 is further configured to receive the duration of the first timer, set the first timer based on the duration of the first timer, where the first timer is associated with the first event, and report, by the mobility management function network element, the first event when the first timer expires.

Further, when the first event is the loss of connectivity event, if the mobility management function network element detects that the first timer expires, it indicates that the UE is unreachable. In this case, the mobility management function network element reports the first event.

Optionally, if the type of the second event is the loss of connectivity event, the mobility management function network element 120 is further configured to report the second event when the second event is associated with the mobile reachable timer and the mobile reachable timer expires.

Optionally, the mobility management function network element 120 is further configured to receive the duration of the first timer, set the first timer based on the duration of the first timer, where the first timer is associated with the second event, and report the second event when the first timer expires.

Optionally, if the type of the second event is the UE reachability event, the mobility management function network element 120 is further configured to report, by the mobility management function network element, the second event when detecting that the UE changes to the connected mode or the UE can be paged.

The mobility management function network element 120 may implement the event subscription method and the communication method in the foregoing embodiments. For related operations performed by the mobility management function network element 120 to implement the event subscription method and the communication method in the foregoing embodiments, refer to the foregoing descriptions of the user data management network element 110. Details are not described herein again.

In the other approaches, when an SCS/AS subscribes to an event, if a subscription to another event for same UE already exists, an HSS/UDM network element needs to determine, according to a network policy, to reject or accept a new event subscription request. If the HSS/UDM accepts the new event subscription request, an existing event subscription request is canceled. In this way, if a currently effective event subscription request is deleted, an originally rejected event subscription request cannot take effect, either. It can be learned that a current event subscription mechanism is not flexible enough.

In view of this, this application provides another event subscription method. The event subscription method provides a flexible event subscription mechanism. In the event subscription mechanism, when a new event subscription request is accepted, an existing event subscription request is not canceled but is deactivated, to enable the existing event subscription request to be in an ineffective state, or when a new event subscription request is not accepted, the new event subscription request is stored and is enabled to be in an ineffective state. Based on the flexible event subscription mechanism, after a currently effective event subscription request is deleted, an originally ineffective event subscription request can be activated. This can improve system performance.

Figure 2:
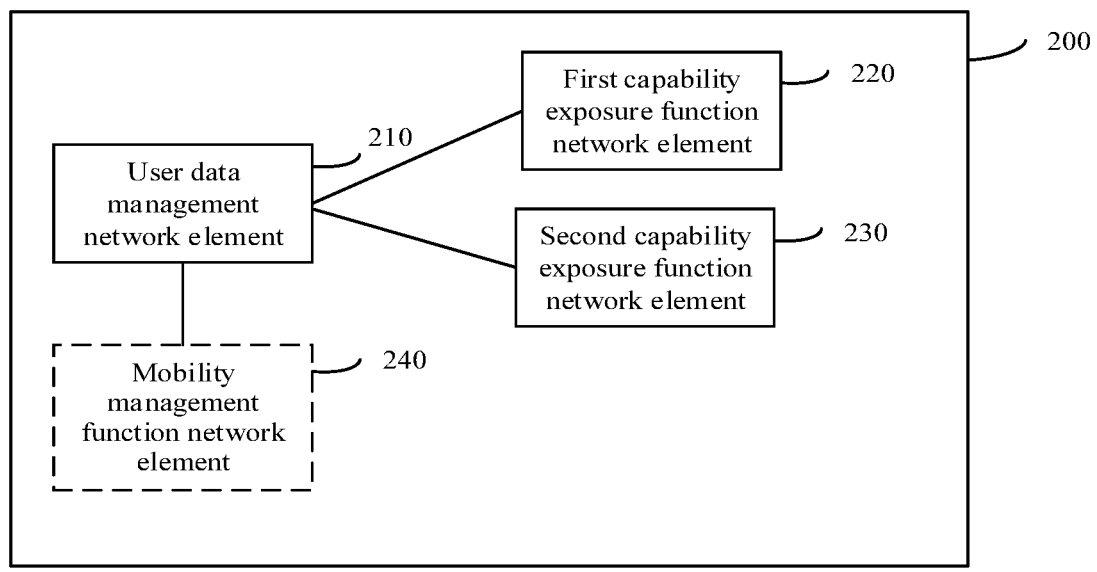
FIG. 2 is a schematic block diagram of another system applicable to this application.

FIG. 2 is a schematic block diagram of a system 200 applicable to this application. As shown in FIG. 2, the system 200 includes a user data management network element 210, a first capability exposure function network element 220, and a second capability exposure function network element 230. Optionally, the system may further include a mobility management function network element 240. Optionally, the system may further include UE 250 that is not shown. Optionally, the user data management network element 210 is an HSS or a UDM function network element. Optionally, the mobility management function network element 240 is an SGSN, a mobility management unit, or an access control and mobility management function network element.

The system 200 may further implement another event subscription method provided in this application.

When the system 200 implements the other event subscription method provided in this application, the user data management network element 210 is configured to receive a first message from the first capability exposure function network element, where the first message is used for subscribing to a first event, determine, by the user data management network element, whether to activate the subscription to the first event, and if the user data management network element determines to activate the subscription to the first event, send first activation indication information to the first capability exposure function network element, and send first deactivation indication information to the second capability exposure function network element, or if the user data management network element determines not to activate the subscription to the first event, send, by the user data management network element, first non-activation indication information to the first capability exposure function network element. The first non-activation indication information is used to indicate that the subscription to the first event is not activated. The first activation indication information is used to indicate that the subscription to the first event is activated, and the first deactivation indication information is used to indicate that a currently activated subscription to a second event is deactivated. The subscription to the first event and the subscription to the second event are event subscriptions for same user equipment UE. It should be understood that a deactivated event subscription and a non-activated event subscription are in a to-be-activated state, and an event subscription in the to-be-activated state can be activated.

An event type of the first event herein may be a loss of connectivity event, or may be a UE reachability event. An event type of the second event in the following may be a loss of connectivity event, or may be a UE reachability event. This is not limited in this embodiment of this application.

Optionally, the user data management network element may determine, based on a priority of the subscription to the first event, whether to activate the subscription to the first event. The priority of the subscription to the first event may be carried in the first message. Alternatively, an event priority may be specified in a protocol or preconfigured by a system based on an event type or an event subscription type. For example, a priority of the loss of connectivity event is higher than a priority of the UE reachability event, or a priority of the loss of connectivity event is lower than a priority of the UE reachability event. Which information or mechanism used by the user data management network element to determine whether to activate a currently configured event subscription, that is, the subscription to the first event, and a manner in which the user data management network element learns of the event priority are not limited in this embodiment of this application.

Further, before receiving the first message, the user data management network element has received a request for subscribing to the second event and has activated the subscription to the second event. To be specific, the user data management network element has configured or set a subscribed periodic update timer of the UE based on the subscription to the second event, and the subscription to the second event is currently in an effective state. For example, if the event type of the second event is the loss of connectivity event and the request for subscribing to the second event carries a maximum detection time, the user data management network element sets the subscribed periodic update timer of the UE based on the maximum detection time. If the event type of the second event is the UE reachability event and the request for subscribing to the second event carries a maximum latency, the user data management network element sets the subscribed periodic update timer of the UE based on the maximum latency. After receiving the first message for the same UE, the user data management network element needs to determine whether to activate the subscription to the first event. For example, the user data management network element may determine, based on the priority of the subscription to the first event and a subscription to another event (for example, the subscription to the second event), whether to activate the subscription to the first event. If the user data management network element determines to activate the subscription to the first event, the user data management network element may reset the subscribed periodic update timer of the UE based on the subscription to the first event, and deactivate the currently activated subscription to the second event. If the user data management network element determines not to activate the subscription to the first event, the user data management network element remains an active state of the currently activated subscription to the second event, and does not reset the subscribed periodic update timer of the UE, to make the subscribed periodic update timer of the UE unchanged. Regardless of whether the subscription to the first event is activated, the user data management network element stores the currently activated subscription to the second event and the subscription to the first event, that is, stores related information of the currently activated subscription to the second event and related information of the subscription to the first event, for example, information such as an identifier of the second event, the event type of the second event, an identifier of the first event, and the event type of the first event.

If the user data management network element determines to activate the subscription to the first event, the user data management network element resets the subscribed periodic update timer of the UE based on the subscription to the first event, and sends the first activation indication information to the first capability exposure function network element, to notify the first capability exposure function network element that the subscription to the first event is activated, that is, that the subscribed periodic update timer of the UE has been reset based on the subscription to the first event. In addition, the user data management network element sends the first deactivation indication information to the second capability exposure function network element, to notify the second capability exposure function network element that the second event is deactivated, that is, that the user data management network element currently no longer monitors the second event. After receiving the first activation indication information, the first capability exposure function network element can determine that the user data management network element has stored the subscription to the first event or the related information of the subscription to the first event, and that the subscription to the first event has been activated, that is, the subscription to the first event has taken effect. After receiving the first deactivation indication information, the second capability exposure function network element can determine that the user data management network element has stored the subscription to the second event or the related information of the subscription to the second event, and that the subscription to the second event has been deactivated, that is, the subscription to the second event is currently in an ineffective state.

When the user data management network element determines not to activate the subscription to the first event, the user data management network element remains the active state of the currently activated subscription to the second event. In addition, the first non-activation indication information is sent to the first capability exposure function network element, to notify the first capability exposure function network element that the subscription to the first event is not activated, that is, that the subscription to the first event is ineffective. After receiving the first non-activation indication information, the first capability exposure function network element can determine that the user data management network element has stored the subscription to the first event or the related information of the subscription to the first event, and that the subscription to the first event is still not activated and is currently in the ineffective state but may be activated in the future.

Based on the foregoing descriptions, only one event subscription can be activated for the same UE. However, the user data management network element has stored a currently effective event subscription (for example, the subscription to the second event) and currently ineffective event subscription (for example, the subscription to the first event), that is, has stored related information of the currently effective event subscription and related information of the currently ineffective event subscription. Therefore, the user data management network element can still activate the currently ineffective event subscription based on the stored event subscriptions or the stored related information of the event subscriptions even if the currently effective event subscription is subsequently deleted.

In this way, compared with a other approaches event subscription mechanism in which another event subscription is canceled while one event subscription is accepted, an event subscription mechanism in this embodiment of this application allows the user data management network element to make, when accepting a new event subscription request and by deactivating instead of canceling an existing event subscription request, the existing event subscription request be in the ineffective state, or to make, when not accepting a new event subscription request, the new event subscription request be in the ineffective state. Based on the flexible event subscription mechanism, after a currently effective event subscription request is deleted, an originally ineffective event subscription request can be activated. This can improve system performance.

Optionally, in an embodiment of this application, if the user data management network element determines to activate the subscription to the first event, the user data management network element 210 is further configured to receive an event subscription deletion request message from the first capability exposure function network element, where the event subscription deletion request message is used to delete the subscription to the first event, and delete the subscription to the first event or the related information of the subscription to the first event based on the event subscription deletion request message, and determine to activate the subscription to the second event in at least one event subscription that is currently in the to-be-activated state, and send second activation indication information to the second capability exposure function network element, where the second activation indication information is used to indicate that the subscription to the second event is activated.

Further, after the user data management network element activates the subscription to the first event and deactivates the subscription to the second event, if the first capability exposure function network element sends the event subscription deletion request message to the user data management network element, to indicate the user data management network element to delete the subscription to the first event or the related information of the subscription to the first event, the user data management network element deletes the subscription to the first event or the related information of the subscription to the first event. In this case, if the user data management network element stores other currently ineffective event subscriptions, for example, originally deactivated or non-activated event subscriptions, the user data management network element may determine to activate one of the currently ineffective event subscriptions. For example, the user data management network element may determine, based on priorities of the currently ineffective event subscriptions, to activate the subscription to the second event in the currently ineffective event subscriptions. If the user data management network element determines to activate the subscription to the second event, the user data management network element resets the subscribed periodic update timer of the UE based on the subscription to the second event. Further, after activating the subscription to the second event, the user data management network element may send the second activation indication information to the second capability exposure function network element, to indicate, to the second capability exposure function network element, that the subscription to the second event is activated.

Therefore, the user data management network element in this embodiment of this application may activate, after deleting a currently effective event subscription request, an originally ineffective event subscription request. This can improve system performance.

Optionally, in another embodiment of this application, if the user data management network element determines not to activate the subscription to the first event, the user data management network element 210 is further configured to receive an event subscription deletion request message from the second capability exposure function network element, where the event subscription deletion request message is used to delete the subscription to the second event, delete the subscription to the second event based on the event subscription deletion request message, and determine to activate the subscription to the first event in at least one event subscription that is currently in the to-be-activated state, and send third activation indication information to the first capability exposure function network element, where the third activation indication information is used to indicate that the subscription to the first event is activated.

Further, if the user data management network element keeps the subscription to the second event in an activated state, if the second capability exposure function network element sends the event subscription deletion request message to the user data management network element, to indicate the user data management network element to delete the subscription to the second event or the related information of the subscription to the second event, the user data management network element deletes the subscription to the second event or the related information of the subscription to the second event. In this case, if the user data management network element stores other currently ineffective event subscriptions, for example, originally deactivated or non-activated event subscriptions, the user data management network element may determine to activate one of the currently ineffective event subscriptions. For example, the user data management network element may determine, based on priorities of the currently ineffective event subscriptions, to activate the subscription to the first event in the currently ineffective event subscriptions. If the user data management network element determines to activate the subscription to the first event, the user data management network element resets the subscribed periodic update timer of the UE based on the subscription to the first event. Further, after activating the subscription to the first event, the user data management network element may send the third activation indication information to the first capability exposure function network element, to indicate, to the first capability exposure function network element, that the subscription to the first event is activated.

Therefore, the user data management network element in this embodiment of this application may activate, after deleting a currently effective event subscription request, an originally ineffective event subscription request. This can improve system performance.

In the embodiments provided in this application, the first capability exposure function network element and the second capability exposure function network element may be a same capability exposure network element or different capability exposure network elements.

In the other approaches, if the first capability exposure function network element and the second capability exposure function network element are two different capability exposure network elements, because the user data management network element cancels the subscription to the second event after accepting the subscription to the first event, that is, the user data management network element deletes the related information of the subscription to the second event, including an address and the like of the second capability exposure network element, even if the user data management network element subsequently deletes the subscription to the first event, the second capability exposure network element does not learn that the user data management network element has deleted the subscription to the first event, and does not immediately re-subscribe to the second event. However, when accepting the subscription to the first event, the user data management network element in this embodiment of this application only deactivates instead of deleting the subscription to the second event. Therefore, the user data management network element can immediately activate the subscription to the second event after deleting the subscription to the first event. This can improve event subscription efficiency, and can reduce signaling overheads because the second capability exposure network element does not need to send a second message to the user data management network element when needing to re-subscribe to the second event.

If the first capability exposure function network element and the second capability exposure function network element are two different capability exposure network elements, a same technical effect may also be achieved if the user data management network element determines to activate the subscription to the second event and then deletes the subscription to the second event. For details, refer to the foregoing descriptions. Details are not described herein again.

The technical solutions in the embodiments of this application may be applied to various communications systems, such as a Global System for Mobile Communications (GSM) system, a code-division multiple access (CDMA) system, a wideband CDMA (WCDMA) system, a GPRS, a Long-Term Evolution (LTE) system, an LTE frequency division duplex (FDD) system, an LTE time division duplex (TDD) system, a Universal Mobile Telecommunications System (UMTS), a Worldwide Interoperability for Microwave Access (WIMAX) communications system, a future 5G system, or a New Radio (NR) system.

The UE in the embodiments of this application may be a terminal, an access terminal, a terminal in a vehicle-to-everything (V2X) communication, a subscriber unit, a subscriber station, a mobile station, a mobile console, a remote station, a remote terminal, a mobile device, a user terminal, a terminal device, a wireless communications device, a user agent, a user apparatus, or the like. The terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G system, or a terminal device in a future evolved Public Land Mobile Network (PLMN). This is not limited in the embodiments of this application. Further, the terminal may be an internet of things terminal that has application features of low costs, simple functions, low power consumption, and non-frequent user data transmission.

Figure 3:
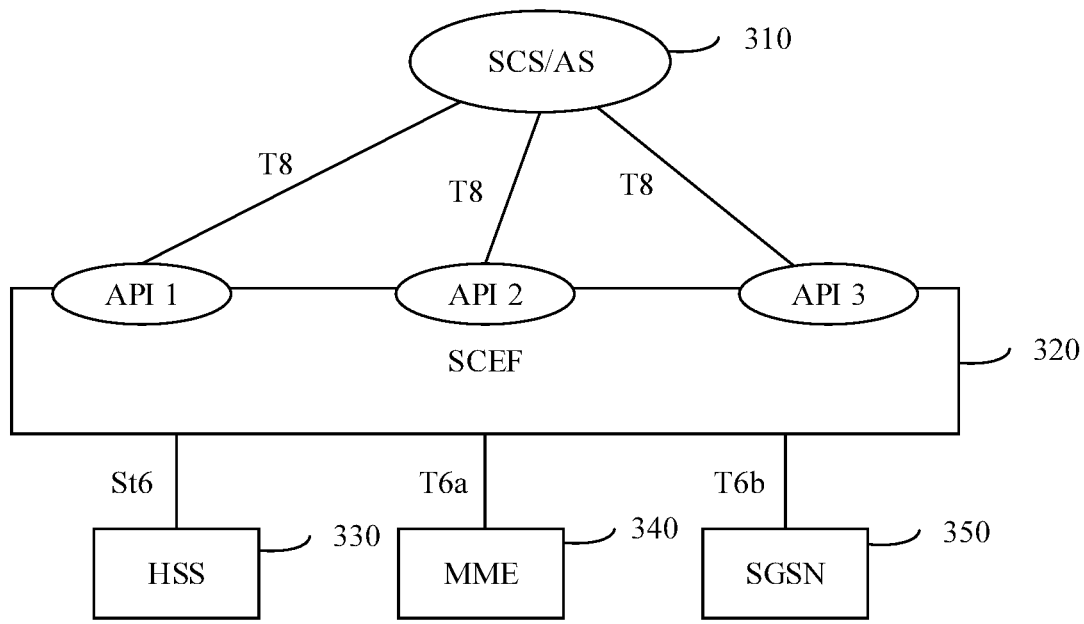
FIG. 3 is a diagram of a service capability exposure architecture in a fourth generation (4G) network according to this application.
Figure 4:
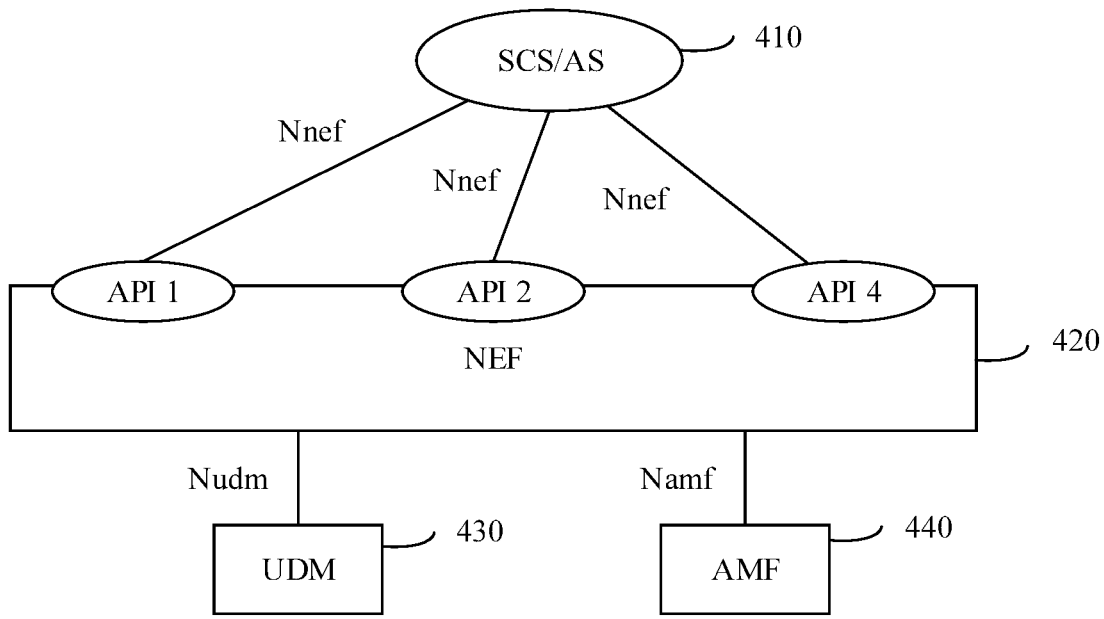
FIG. 4 is a diagram of a service capability exposure architecture in a fifth generation (5G) network according to this application.

The system 100 and the system 200 described in this application may correspond to a service capability exposure architecture in a 4G network shown in FIG. 3 or a service capability exposure architecture in a 5G network shown in FIG. 4.

FIG. 3 is a diagram of a service capability exposure architecture that is in a 4G network and that may be applied to this application. Based on the architecture, a 3GPP network can securely provide a service and a capability for a third-party service provider, that is, an SCS/AS. The architecture diagram includes an SCS/AS 310, a service capability exposure function (SCEF) 320, an HSS 330, an MME 340, and an SGSN 350. Optionally, the architecture diagram may further include UE that is not shown in the figure.

Further, the SCEF network element 320 is a core network element in the architecture, and enables the 3GPP network to securely provide the service and the capability for the third-party service provider SCS/AS. The HSS 330 is a home (or homing) subscriber server, and stores subscription information of a subscriber. The MME 340 and the SGSN 350 are network elements responsible for performing mobility management on the UE. The SCS/AS 310 invokes, using a T8 application programming interface (API) interface, the service and the capability that are provided by the SCEF.

The user data management network element, the mobility management function network element, and the capability exposure function network elements (for example, the first capability exposure function network element and the second capability exposure function network element) in the systems shown in FIG. 1 and FIG. 2 may be respectively the HSS, the MME/SGSN, and the SCEF in the architecture diagram shown in FIG. 3. The HSS, the MME/SGSN, and the SCEF are respectively configured to implement functions of the user data management network element, the mobility management function network element, and the capability exposure function network element described above. If the first capability exposure function network element and the second capability exposure function network element are different capability exposure network elements, the architecture diagram shown in FIG. 3 may further include another SCEF. It should be understood that the architecture diagram shown in FIG. 3 may further include other network elements that are not shown one by one herein.

FIG. 4 is a diagram of a service capability exposure architecture that is in a 5G network and that may be applied to this application. The architecture diagram shown in FIG. 4 includes an SCS/AS 410, a network exposure function (NEF) 420, a UDM function 430, a core AMF 440, and a session management function (SMF) 450. Optionally, the architecture diagram may further include UE that is not shown in the figure.

A 5G system is a service-based architecture. Therefore, the NEF network element (which has a function similar to that of the SCEF) develops, for the SCS/AS using an Nnef service, a service and a capability supported by a 3GPP network. The UDM network element (which has functions similar to some mobility management functions of an HSS) provides a supported service and capability for the NEF using an Nudm service. The AMF network element (which has a function similar to that of an MME) provides a supported service and capability for the NEF using an Namf service. The SMF network element (which has functions similar to some session management functions of the MME) provides a supported service and capability for the NEF using an Nsmf service. The user data management network element, the mobility management function network element, and the capability exposure function network elements (for example, the first capability exposure function network element and the second capability exposure function network element) in the systems shown in FIG. 1 and FIG. 2 may be respectively the UDM, the AMF, and the NEF in the architecture diagram shown in FIG. 3. The UDM, the AMF, and the NEF are respectively configured to implement functions of the user data management network element, the mobility management function network element, and the capability exposure function network element described above. If the first capability exposure function network element and the second capability exposure function network element are different capability exposure network elements, the architecture diagram shown in FIG. 3 may further include another NEF. It should be understood that the architecture diagram shown in FIG. 4 may further include other network elements that are not shown one by one herein.

Figure 5:
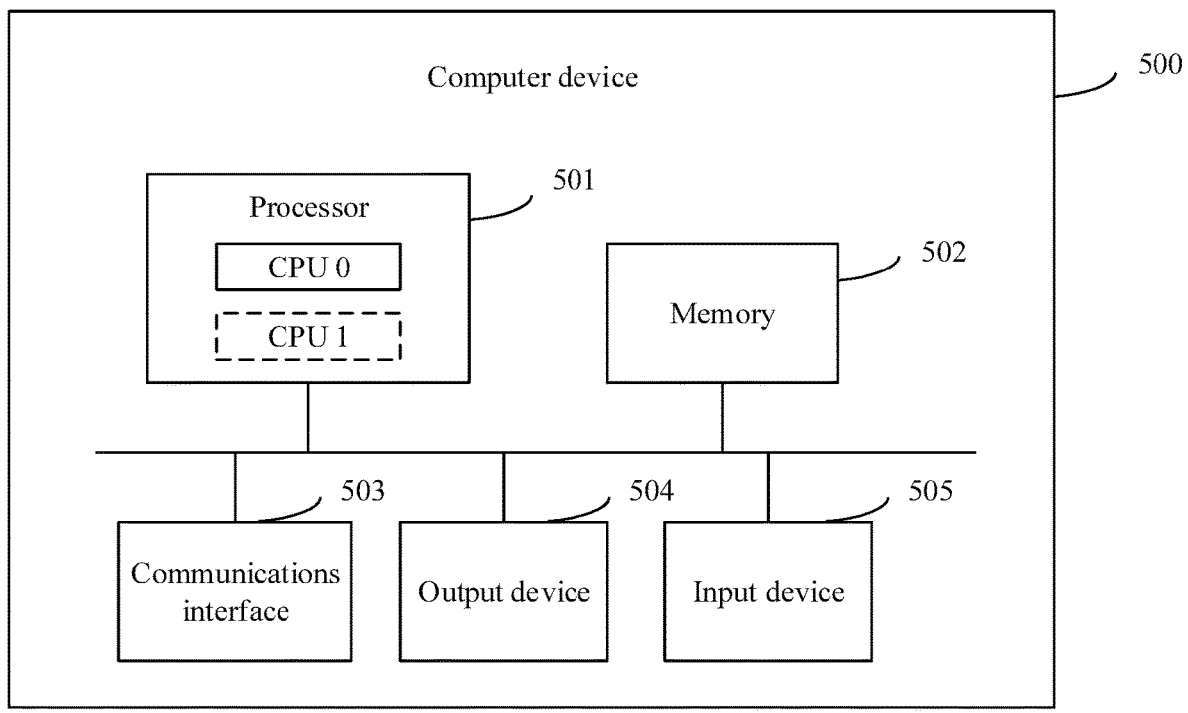
FIG. 5 is a schematic diagram of a computer device according to an embodiment of this application.

The user data management network element, the mobility management function network element, and the capability exposure function network element in the systems shown in FIG. 1 and FIG. 2 may be implemented using a computer device (or system) 500 shown in FIG. 5.

FIG. 5 is a schematic diagram of a computer device (or system) 500 according to an embodiment of this application. The computer device 500 includes at least one processor 501, a memory 502, and at least one communications interface 503.

The processor 501 may be a central processing unit (CPU), a microprocessor, an application-specific integrated circuit (ASIC), or one or more integrated circuits configured to control program execution in the solutions of the present disclosure.

The memory 502 may be a read-only memory (ROM) or another type of static storage device that can store static information and instructions, or a random-access memory (RAM) or another type of dynamic storage device that can store information and instructions, or may be an electrically erasable programmable ROM (EEPROM), a compact disc (CD) ROM (CD-ROM) or another compact disc storage device, an optical disc storage device (including a SD, a laser disc, an optical disc, a digital versatile disc (DVD), a BLU-RAY DISC, or the like), a magnetic disk storage medium or another magnetic storage device, or any other medium that can be used to carry or store expected program code in a form of an instruction or a data structure and that can be accessed by a computer, but is not limited thereto. The memory may exist independently and is connected to the processor through a connection cable (for example, a system bus). The memory may alternatively be integrated with the processor.

The memory 502 is configured to store application program code for executing the solutions of the present disclosure, and the processor 501 is configured to execute the application program code stored in the memory 502. The processor may be a CPU. The processor may alternatively be another general-purpose processor, a digital signal processor (DSP), an ASIC, a field-programmable gate array (FPGA) or another programmable logic device, a discrete gate or transistor logic device, a discrete hardware component, or the like. The general-purpose processor may be a microprocessor, or the processor may be any conventional processor or the like.

In specific implementation, in an embodiment, the processor 501 may include one or more CPUs, for example, a CPU 0 and a CPU 1 shown in FIG. 5.

In specific implementation, in an embodiment, the computer device 500 may include a plurality of processors, and each processor may be a single-core (single-CPU) processor, or may be a multi-core (multi-CPU) processor. The processor herein may be one or more devices, circuits, and/or processing cores for processing data (for example, a computer program instruction).

In specific implementation, in an embodiment, the computer device 500 may further include an output device 504 and an input device 505. The output device 504 communicates with the processor 501, and may display information in a plurality of manners. For example, the output device 504 may be a liquid-crystal display (LCD), a light-emitting diode (LED) display device, a cathode-ray tube (CRT) display device, or a projector. The input device 505 communicates with the processor 501, and may accept user input in a plurality of manners. For example, the input device may be a mouse, a keyboard, a touchscreen device, or a sensing device.

The computer device 500 may be a general-purpose computer device or a special-purpose computer device. In specific implementation, the computer device 500 may be a desktop computer, a portable computer, a network server, a PDA, a mobile phone, a tablet computer, a wireless terminal device, a communications device, an embedded device, or a device with a structure similar to that in FIG. 5. A type of the computer device 500 is not limited in this embodiment of the present disclosure.

In addition, the network architecture and the service scenario described in the embodiments of this application are intended to describe the technical solutions in the embodiments of this application more clearly, and do not constitute a limitation on the technical solutions provided in the embodiments of this application. A person of ordinary skill in the art may know that, with the evolution of the network architecture and the emergence of new service scenarios, the technical solutions provided in the embodiments of this application are also applicable to similar technical problems.

To make a person skilled in the art better understand this application, the following separately describes in detail an event subscription method in an embodiment of the present disclosure with reference to the architecture diagrams shown in FIG. 3 and FIG. 4.

Figure 6A:
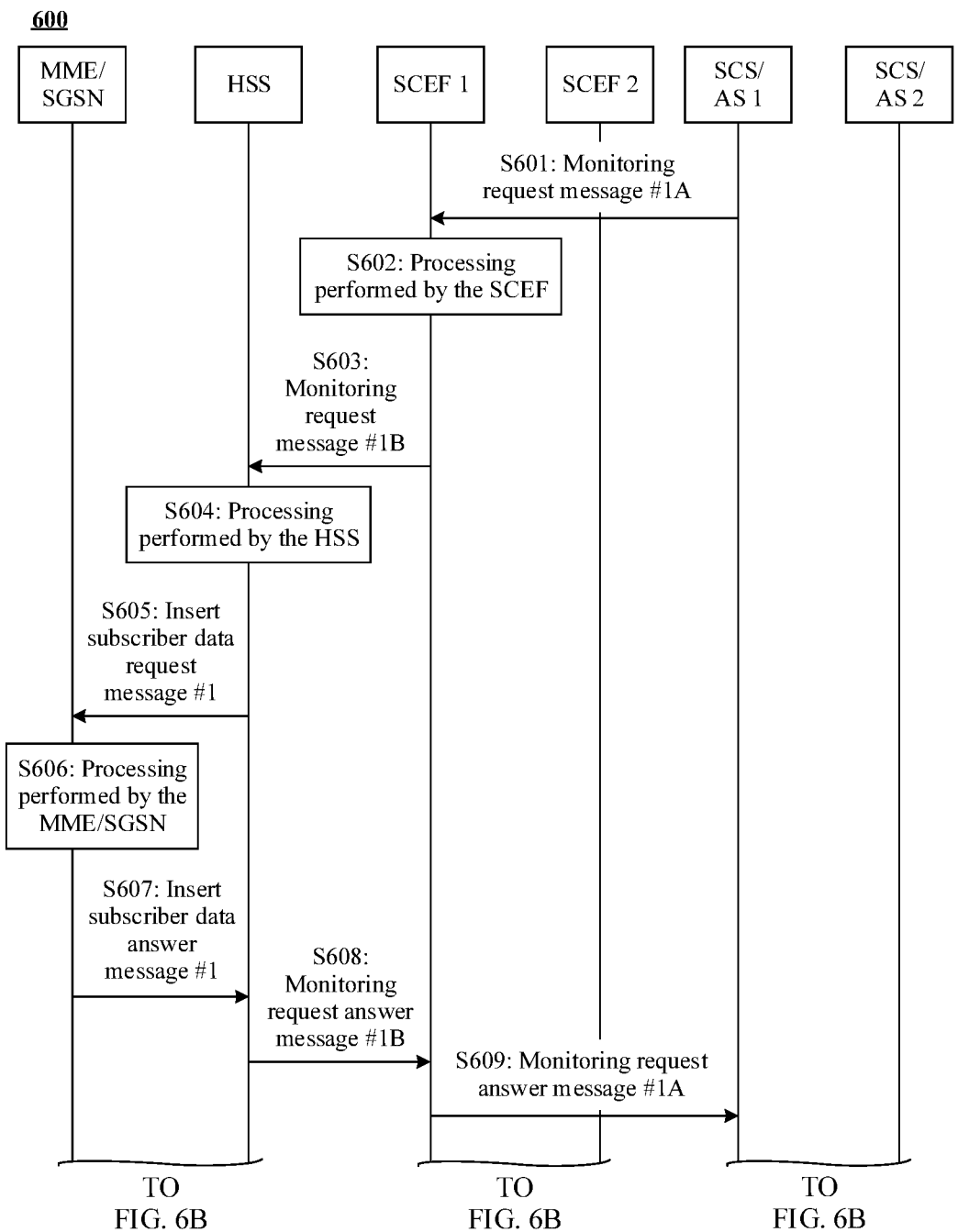
FIG. 6A and FIG. 6B are an example flowchart of an event subscription method according to an embodiment of this application.
Figure 6B:
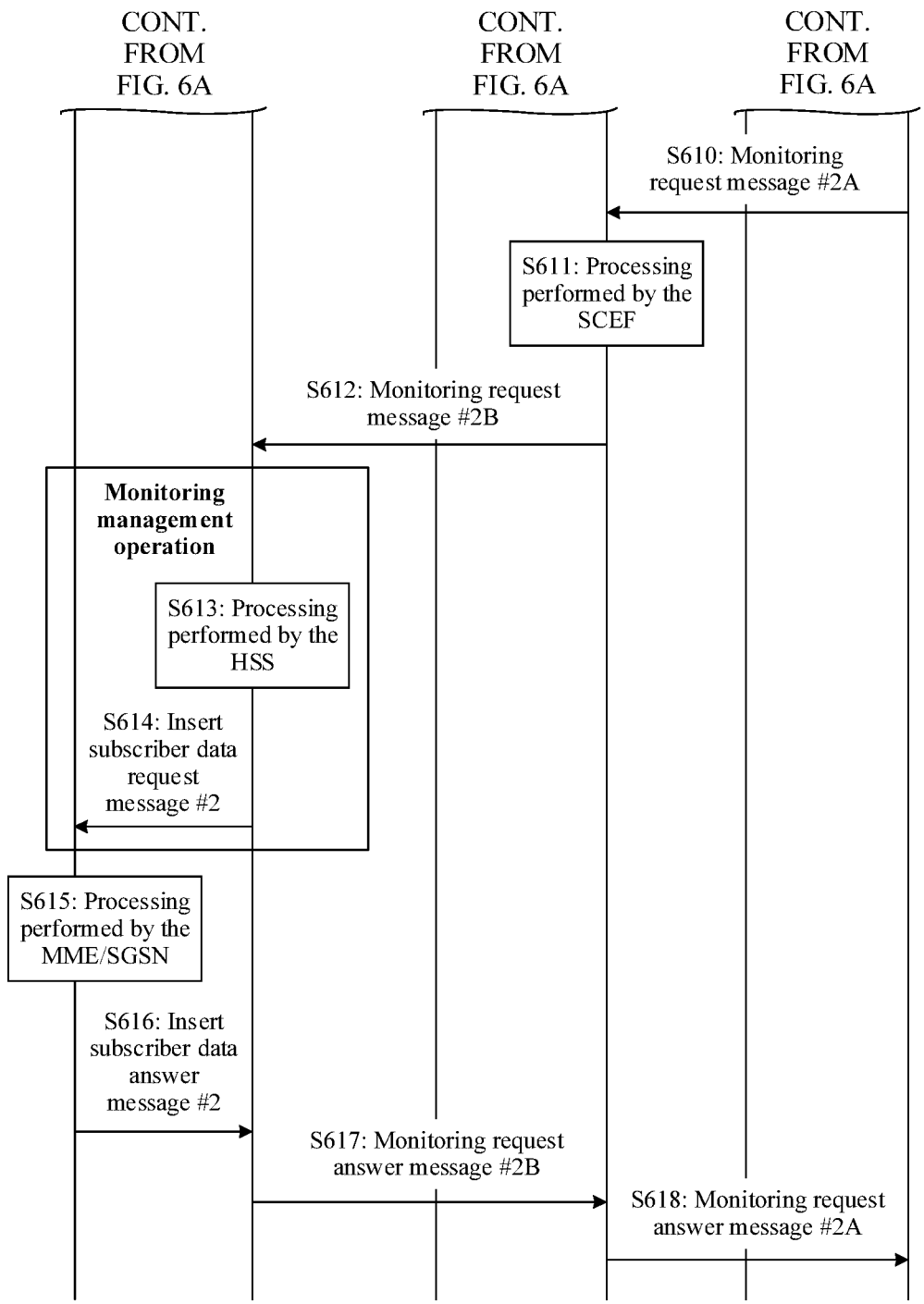

FIG. 6A and FIG. 6B are an example flowchart of an event subscription method according to an embodiment of this application. The embodiment shown in FIG. 6A and FIG. 6B may be applied to the system or the architecture diagram shown in FIG. 1 or FIG. 3. It should be understood that FIG. 6A and FIG. 6B show detailed steps or operations of the method 600. However, these steps or operations are merely an example. In this embodiment of this application, another operation may be further performed or only some of the operations in FIG. 6A and FIG. 6B may be performed.

S601: An SCS/AS 1 sends a monitoring request message #1A to an SCEF 1. Correspondingly, the SCEF 1 receives the monitoring request message #1A sent by the SCS/AS 1.

The monitoring request message #1A is used to request a subscription to a first event (which may also be referred to as configuration for a first monitoring event). The monitoring request message #1A may carry an SCS/AS identifier #1, a T8 destination address #1, an event type #1, and a T8 longterm interaction reference identification (TLTRI) #1. The SCS/AS identifier #1 is used to identify the SCS/AS 1, the T8 destination address #1 is an address of the SCS/AS 1, the event type #1 is used to indicate an event type of the first event, and the TLTRI #1 is used to indicate the subscription to the first event.

When the monitoring request message #1A is used to perform monitoring event configuration or event subscription configuration for single UE, the monitoring request message #1A further carries an external identifier (External Id) or a mobile subscriber international Integrated Services Digital Network (ISDN)/public switched telephone network (PSTN) number (MSISDN). When the monitoring request message #1A is used to perform monitoring event configuration for a group of UEs, the monitoring request message #1A further carries an external group identifier (External Group Id). The event type #1 is a loss of connectivity event or a UE reachability event.

In addition, when the event type #1 is the loss of connectivity event, the monitoring request message #1A further carries a maximum detection time that is denoted as MDT #1 herein. The maximum detection time is used to indicate a maximum time period in which a network and the UE do not communicate with each other. After this time period, the network needs to notify the SCS/SA 1 that the UE is unreachable. When the event type #1 is the UE reachability event, the monitoring request message #1A may further carry a maximum latency that is denoted as ML #1 herein.

Optionally, the monitoring request message #1A may further carry a maximum response time and/or a suggested quantity of downlink packets.

The maximum response time (MRT) indicates a time in which the UE stays in a reachable state to allow an SCS/AS (for example, the SCS/AS 1 herein) to reliably transmit required downlink data. The maximum response time is denoted as MRT #1 herein.

The suggested quantity of downlink packets (Suggested number of downlink packets) indicates a quantity of packets buffered on a serving gateway (S-GW) when the UE is unreachable. The suggested quantity of downlink packets is denoted as SNDP #1 herein.

S602: The SCEF 1 stores the SCS/AS identifier #1, the T8 destination address #1, the event type #1, the TLTRI #1, and the MDT #1 or the ML #1, and authorizes monitoring event configuration according to a local policy. After the authorization is successful, the SCEF 1 allocates an SCEF reference identifier (Reference ID) #1, and stores a correspondence between the SCEF reference identifier #1 and the TLTRI #1. The SCEF reference identifier #1 is used to identify the subscription to the first event in a core network.

Further, for S602, refer to the descriptions in the other approaches. Details are not described herein.

Optionally, the SCEF 1 may determine a priority of the subscription to the first event based on a service-level agreement (SLA) with the SCS/AS 1, and the priority is represented as a priority #1 herein.

S603: The SCEF 1 sends a monitoring request message (which may also be referred to as a monitoring event configuration request message) #1B to an HSS. Correspondingly, the HSS receives the monitoring request message #1B sent by the SCEF 1.

The monitoring request message #1B carries the external identifier or the MSISDN or the external group identifier, an SCEF 1 identifier, the SCEF reference identifier #1, the event type #1, and the MDT #1 or the ML #1. In addition, the monitoring request message #1B may further carry the optional parameters in S601.

Optionally, the monitoring request message #1B may further carry the priority #1.

S604: The HSS checks the monitoring request message #1B, and after the check is successful, the HSS stores the received parameters.

If the event type #1 is the loss of connectivity event, and the monitoring request message #1B carries the MDT #1, the HSS sets duration of a subscribed periodic update timer of the UE for the UE based on the MDT #1. Usually, the set duration of the subscribed periodic update timer of the UE is equal to the MDT #1, or is slightly less than the MDT #1 (that is, the duration of the subscribed periodic update timer of the UE is obtained by subtracting a fixed value (for example, 4 minutes) from the MDT #1).

If the event type #1 is the UE reachability event, and the monitoring request message #1B carries the ML #1, the HSS sets duration of a subscribed periodic update timer of the UE for the UE based on the ML #1. Usually, the set duration of the subscribed periodic update timer of the UE is equal to the ML #1. However, this is not limited in this embodiment of this application.

S605: The HSS sends an insert subscriber data request message #1 to an MME/SGSN for each UE (the HSS stores a correspondence between the external identifier and a subscriber identifier) or each group member UE (the HSS stores a correspondence between the external group identifier and a subscriber identifier of each group member). Correspondingly, the MME/SGSN receives the insert subscriber data request message #1 sent by the HSS.

The insert subscriber data request message #1 carries the event type #1, the subscribed periodic update timer of the UE or the duration of the subscribed periodic update timer of the UE (herein, the subscribed periodic update timer of the UE is an RAU/TAU timer), the SCEF 1 identifier, and the SCEF reference identifier #1.

If the monitoring request message #1B is for the group of UEs, the insert subscriber data request message #1 carries an external identifier or an MSISDN, and the HSS sends the insert subscriber data request message #1 to all MMEs/SGSNs serving the group.

In addition, if the event type #1 is UE reachability, and the monitoring request message #1B further provides the MRT #1 and/or the SNPD #1, the insert subscriber data request message #1 may further carry the MRT #1 and/or the SNPD #1.

Further, for S605, refer to the other approaches. Details are not described herein.

S606: The MME/SGSN stores the received parameters.

In a subsequent RAU/TAU procedure, the MME/SGSN allocates the received subscribed periodic update timer of the UE to the UE as a periodic RAU/TAU timer. That is, the MME/SGSN sends the received duration of the subscribed periodic update timer of the UE to the UE. After receiving the duration, the UE uses the duration as the duration of the subscribed periodic update timer of the UE. If the event type #1 is the loss of connectivity event, the MME/SGSN starts to monitor whether a mobile reachable timer expires. The mobile reachable timer is set based on the subscribed periodic update timer of the UE. Generally, if the duration of the subscribed periodic update timer of the UE is set based on the MDT #1, duration of the mobile reachable timer is equal to that of the subscribed periodic update timer of the UE, or is slightly greater than that of the subscribed periodic update timer of the UE (that is, the duration of the mobile reachable timer is obtained by adding up the fixed value (for example, 4 minutes) and the duration of the subscribed periodic update timer of the UE, and in this way, the duration of the mobile reachable timer is equal to the MDT #1). However, this is not limited in this embodiment of this application. If the event type #1 is UE reachability, the MME/SGSN starts to monitor whether the UE enters a connected mode. If the MRT #1 is provided, the MME/SGSN provides the MRT #1 to the UE, and the UE determines, based on the MRT #1, a time in which a state of being reachable for paging is kept. If the SNPD #1 is provided, the MME/SGSN provides the SNPD #1 to the S-GW, and the S-GW buffers data based on the SNPD #1.

S607: The MME/SGSN sends an insert subscriber data answer message #1 to the HSS. Correspondingly, the HSS receives the insert subscriber data answer message #1 sent by the MME/SGSN.

The subscriber data answer message #1 carries acceptance indication information #1A, and the acceptance indication information #1A is used to indicate that the MME/SGSN accepts the subscription to the first event.

S608: The HSS sends a monitoring request answer message #1B to the SCEF 1. Correspondingly, the SCEF 1 receives the monitoring request answer message #1B sent by the HSS.

The monitoring request answer message #1B carries the SCEF reference identifier #1 and acceptance indication information #1B, and the acceptance indication information #1B is used to indicate that the HSS accepts the subscription to the first event.

S609: The SCEF 1 sends a monitoring request answer message #1A to the SCS/AS 1. Correspondingly, the SCS/AS 1 receives the monitoring request answer message #1A sent by the SCEF 1.

The monitoring request answer message #1A carries the TLTRI #1 and acceptance indication information #1C, and the acceptance indication information #1C is used to indicate that the SCEF 1 accepts the subscription to the first event.

S610: An SCS/AS 2 sends a monitoring request message #2A to an SCEF 2 at a time point. Correspondingly, the SCEF 2 receives the monitoring request message #2A sent by the SCS/AS 2.

The monitoring request message #2A is used to request a subscription to a second event. The monitoring request message #2A may carry an SCS/AS identifier #2, a T8 destination address #2, an event type #2, and a TLTRI #2. The SCS/AS identifier #2 is used to identify the SCS/AS 2, the T8 destination address #2 is an address of the SCS/AS 2, the event type #2 is used to indicate an event type of the second event, and the TLTRI #2 is used to indicate the subscription to the second event.

When monitoring event configuration is performed for single UE, the monitoring request message #2A further carries an external identifier or an MSISDN. When monitoring event configuration is performed for a group of UEs, the monitoring request message #2A further carries an external group identifier. The UE indicated by the MSISDN or the external identifier herein is the same UE as the UE in the step S601. The subscriber group indicated by the external group identifier herein is the same subscriber group as the subscriber group in the step S601. The event type #2 is loss of connectivity or UE reachability.

When the event type #2 is a loss of connectivity event, the monitoring request message #2A may further carry a maximum detection time that is denoted as MDT #2 herein.

When the event type #2 is a UE reachability event, the monitoring request message #2A may further carry a maximum latency that is denoted as ML #2 herein.

Optionally, the monitoring request message #1A may further carry a maximum response time (which is denoted as MRT #2 herein) and/or a suggested quantity of downlink packets (which is denoted as SNDP #2 herein).

S611: The SCEF 2 stores the SCS/AS identifier #2, the T8 destination address #2, the event type #2, the TLTRI #2, and the MDT #2 or the ML #2, and authorizes monitoring event configuration according to a local policy. After the authorization is successful, the SCEF 2 allocates an SCEF reference identifier #2, and stores a correspondence between the reference identifier #2 and the TLTRI #2.

Optionally, the SCEF 2 may determine a priority of the subscription to the second event based on a service-level agreement with the SCS/AS 2, and the priority is represented as a priority #2 herein.

S612: The SCEF 2 sends a monitoring request message #2B to the HSS. Correspondingly, the HSS receives the monitoring request message #2B sent by the SCEF 2.

It should be understood that the monitoring request message #2B corresponds to the second message in the foregoing descriptions of that the system 100 monitors two subscription events.

The monitoring request message #2B carries the external identifier or the MSISDN or the external group identifier, an SCEF 2 identifier, the SCEF reference identifier #2, the event type #2, and the MDT #2 or the ML #2. In addition, the monitoring request message #2B may further carry the optional parameters in S610.

Optionally, the monitoring request message #2B may further carry the priority #2.

S613: The HSS performs related processing based on the event type and a time parameter that are in each of the monitoring request message #2B and the monitoring request message #1B.

The HSS compares the time parameter (that is, the MDT #2 or the ML #2) carried in the monitoring request message #2B with a value of the duration that is of the subscribed periodic update timer of the UE and that is in the insert subscriber data request message #1 sent to the MME/SGSN in the step S605, determines whether the duration of the subscribed periodic update timer of the UE needs to be reset, and if the duration of the subscribed periodic update timer of the UE needs to be reset, determines updated duration of the subscribed periodic update timer of the UE. In addition, whether a timer (that is, a first timer) newly added to the MME/SGSN needs to be set may be further determined based on the event type #1 and/or the event type #2. If the first timer needs to be set, duration of the first timer is determined.

If the duration of the subscribed periodic update timer of the UE is set based on the MDT #1 in the step S605, and the value of the duration of the subscribed periodic update timer of the UE is obtained by subtracting the fixed value from the MDT #1, the MDT #2 may be compared with the duration of the subscribed periodic update timer of the UE plus the fixed value. Moreover, the duration of the first timer may also be calculated based on the duration of the subscribed periodic update timer of the UE plus the fixed value. If the HSS needs to determine the updated duration of the subscribed periodic update timer of the UE based on the MDT #2, the updated duration of the subscribed periodic update timer of the UE is equal to the MDT #2, or is slightly less than the MDT #2 (that is, the updated duration of the subscribed periodic update timer of the UE is obtained by subtracting the fixed value (for example, 4 minutes) from the MDT #2). Further, refer to the foregoing descriptions of related content. Details are not described herein again.

S614: The HSS sends an insert subscriber data request message #2 to the MME/SGSN for each UE (the HSS stores the correspondence between the external identifier and the subscriber identifier) or each group member UE (the HSS stores the correspondence between the external group identifier and the subscriber identifier of each group member). Correspondingly, the MME/SGSN receives the insert subscriber data request message #2 sent by the HSS.

If the monitoring request message #2B is for the group of UEs, the insert subscriber data request message #2 carries an external identifier or an MSISDN, and the HSS sends the insert subscriber data request message #2 to all MMEs/SGSNs serving the group. The insert subscriber data request message #2 carries the event type #2, the SCEF 2 identifier, and the SCEF reference identifier #2. In addition, if the subscribed periodic update timer of the UE needs to be reset, the insert subscriber data request message #2 further carries the updated duration of the subscribed periodic update timer of the UE. If the first timer of the MME/SGSN needs to be reset, the insert subscriber data request message #2 further carries the duration of the first timer.

In addition, if the event type #2 is UE reachability, the monitoring request message #2B further provides the MRT #2, and MRT #2>MRT #1, the insert subscriber data request message #2 may further carry the MRT #2 (the MRT #2 is a maximum value in MRTs carried in all event subscriptions for the UE). If the monitoring request message #2B further provides the SNPD #2, and SNPD #2>SNPD #1, the insert subscriber data request message #2 may further carry the SNPD #2 (the SNPD #2 is a maximum value in SNPDs carried in all the event subscriptions for the UE.

It should be understood that the operations described in the steps S613 and S614 correspond to the monitoring management operation described above.

S615: The MME/SGSN stores the received parameters.

In a subsequent RAU/TAU procedure, the MME/SGSN allocates, to the UE as the periodic RAU/TAU timer, the subscribed periodic update timer that is of the UE and that is stored in S606. Alternatively, if the insert subscriber data request message #2 carries the updated duration of the subscribed periodic update timer of the UE, the updated duration of the subscribed periodic update timer of the UE is allocated to the UE and used as duration of the periodic RAU/TAU timer. If the insert subscriber data request message #2 further carries the duration of the first timer, the duration of the first timer is used as duration of a first timer of the MME/SGSN.

If the event type #2 is loss of connectivity, the MME/SGSN starts to monitor whether the mobile reachable timer or the first timer that is associated with the event type #2 expires. If the event type #1 is loss of connectivity, the MME/SGSN starts to monitor whether the mobile reachable timer or the first timer that is associated with the event type #1 expires. If the event type #2 is UE reachability, the MME/SGSN starts to monitor whether the UE enters a connected mode. If the event type #1 is UE reachability, the MME/SGSN starts to monitor whether the UE enters the connected mode. If the MRT #2 is provided, the MME/SGSN provides the MRT #2 to the UE, and the UE determines, based on the MRT #2, a time in which a state of being reachable for paging is kept. If the SNPD #2 is provided, the MME/SGSN provides the SNPD #2 to the S-GW, and the S-GW buffers data based on the SNPD #2.

S616: The MME/SGSN sends an insert subscriber data answer message #2 to the HSS. Correspondingly, the HSS receives acceptance indication information #2A sent by the MME/SGSN.

The subscriber data answer message #2 carries the acceptance indication information #2A, and the acceptance indication information #2A is used to indicate that the MME/SGSN accepts the subscription to the second event.

S617: The HSS sends a monitoring request answer message #2B to the SCEF 2. Correspondingly, the SCEF 2 receives the monitoring request answer message #2B sent by the HSS.

The monitoring request answer message #2B carries the SCEF reference identifier #2 and acceptance indication information #2B, and the acceptance indication information #2B is used to indicate that the HSS accepts the subscription to the second event.

S618: The SCEF 2 sends a monitoring request answer message #2A to the SCS/AS 2. Correspondingly, the SCS/AS 2 receives the monitoring request answer message #2A sent by the SCEF 2.

The monitoring request answer message #2A carries the TLTRI #2 and acceptance indication information #2A, and the acceptance indication information #2A is used to indicate that the SCEF 2 accepts the subscription to the second event.

In conclusion, according to the event subscription method in this embodiment of this application, when accepting a new event subscription, the HSS does not cancel an existing event subscription, but accepts a plurality of event subscriptions at the same time. This can improve system performance.

It should be understood that the SCS/AS 1 and the SCS/AS 2 shown in FIG. 6A and FIG. 6B may be a same SCS/AS, and the SCEF 1 and the SCEF 2 may also be a same SCEF. This is not limited in this embodiment of this application.

It should be understood that, for a part that is not described in detail in S601 to S612, refer to the other approaches. Details are not described herein.

Figure 7:
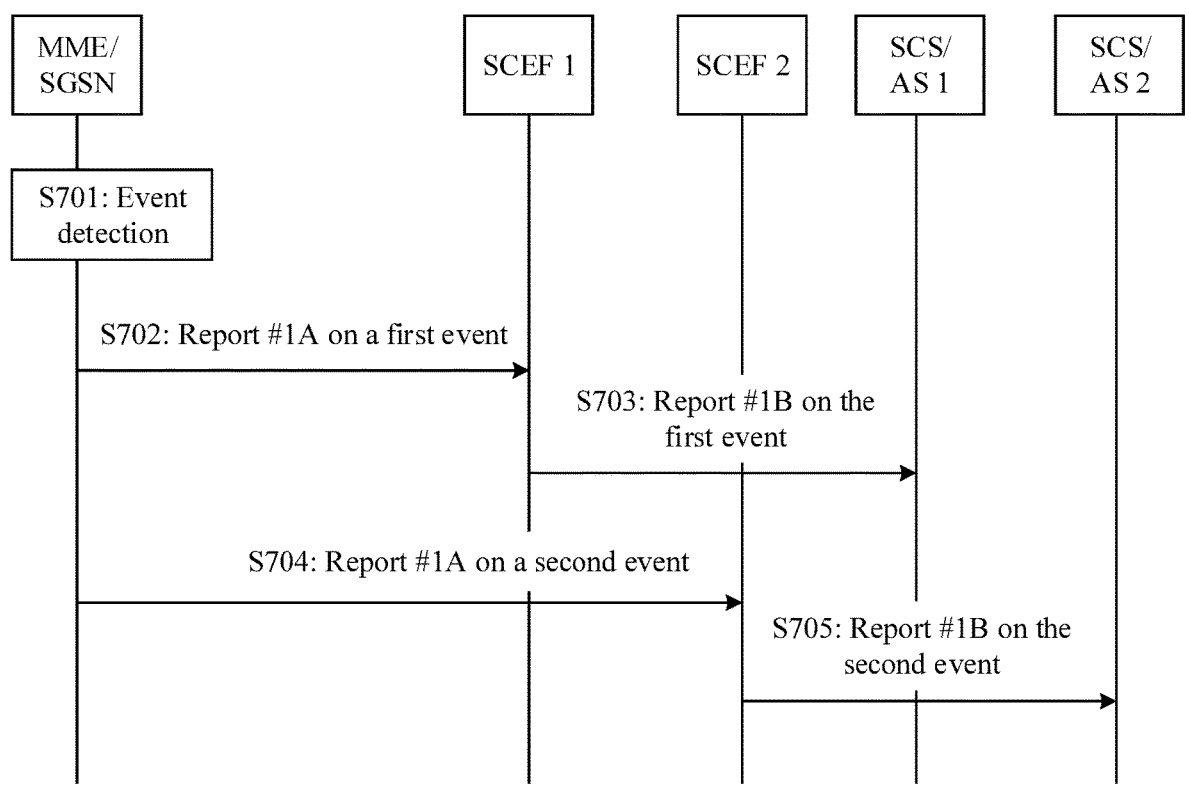
FIG. 7 is an example flowchart of an event subscription method according to an embodiment of this application.

FIG. 7 is an example flowchart of an event subscription method according to an embodiment of this application. FIG. 6A and FIG. 6B show an event reporting procedure performed after a corresponding network element performs the monitoring management operation shown in FIG. 6A and FIG. 6B. In the event reporting procedure described in FIG. 7, both the type of the first event and the type of the second event are UE reachability events.

S701: The MME/SGSN performs event monitoring based on the parameters delivered in the steps S614 and S605 in FIG. 6A and FIG. 6B, and detects that the UE changes to the connected mode.

S702: The MME/SGSN sends a report #1A on the first event to the SCEF 1. Correspondingly, the SCEF 1 receives the report #1A that is on the first event and that is sent by the MME/SGSN.

The report #1A on the first event carries the event type #1 and the SCEF reference identifier #1.

S703: The SCEF 1 sends a report #1B on the first event to the SCS/AS 1. Correspondingly, the SCS/AS 1 receives the report #1B that is on the first event and that is sent by the SCEF 1.

The report #1B on the first event carries the event type #1 and the TLTRI #1.

S704: The MME/SGSN sends a report #1A on the second event to the SCEF 2. Correspondingly, the SCEF 2 receives the report #1A that is on the second event and that is sent by the MME/SGSN.

The report #1A on the second event carries the event type #2 and the SCEF reference identifier #2.

S705: The SCEF 2 sends a report #1B on the second event to the SCS/AS 2. Correspondingly, the SCS/AS 2 receives the report #1B that is on the second event and that is sent by the SCEF 2.

The report #1B on the second event carries the event type #2 and the TLTRI #2.

Figure 8:
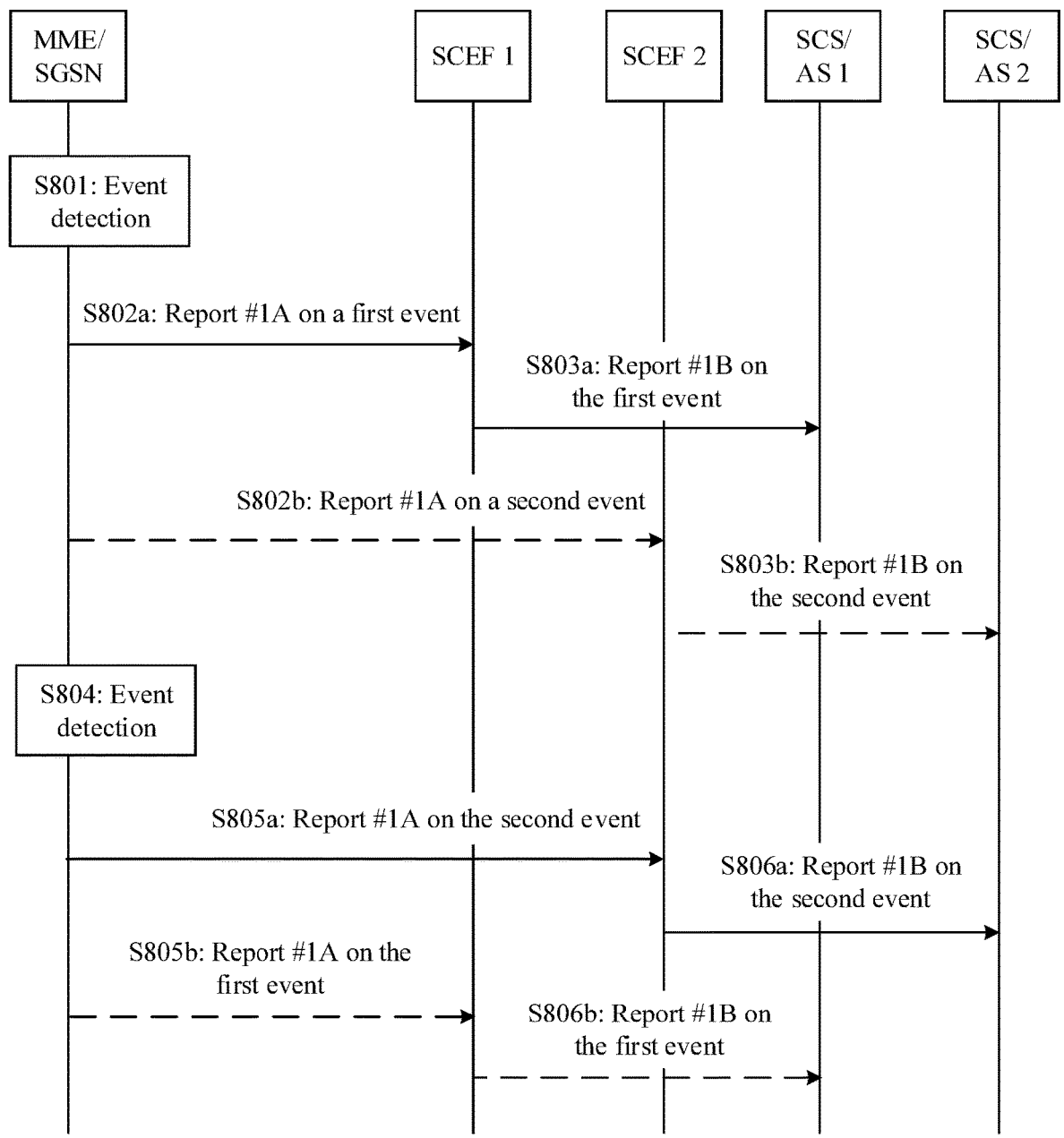
FIG. 8 is an example flowchart of an event subscription method according to an embodiment of this application.

FIG. 8 is an example flowchart of an event subscription method according to an embodiment of this application. FIG. 8 shows an event reporting procedure performed after a corresponding network element performs the monitoring management operation shown in FIG. 6A and FIG. 6B. In the event reporting procedure described in FIG. 8, both the type of the first event and the type of the second event are loss of connectivity events. When the mobile reachable timer expires, the MME/SGSN reports a detected event to an associated SCEF. Further, when the first timer expires, the MME/SGSN reports a detected event to an associated SCEF.

S801: The MME/SGSN performs event monitoring based on the parameters delivered in the steps S614 and S605 in FIG. 6A and FIG. 6B, and detects that the mobile reachable timer expires.

If the mobile reachable timer is used for subscribing to the first event, the method includes steps S802a and S803a. If the mobile reachable timer is used for subscribing to the second event, the method includes steps S802b and S803b.

S802a: The MME/SGSN sends a report #1A on the first event to the SCEF 1. Correspondingly, the SCEF 1 receives the report #1A that is on the first event and that is sent by the MME/SGSN.

The report #1A on the first event carries the event type #1 and the SCEF reference identifier #1.

S803a: The SCEF 1 sends a report #1B on the first event to the SCS/AS 1. Correspondingly, the SCS/AS 1 receives the report #1B that is on the first event and that is sent by the SCEF 1.

The report #1B on the first event carries the event type #1 and the TLTRI #1.

S802b: The MME/SGSN sends a report #1A on the second event to the SCEF 2. Correspondingly, the SCEF 2 receives the report #1A that is on the second event and that is sent by the MME/SGSN.

The report #1A on the second event carries the event type #2 and the SCEF reference identifier #2.

S803b: The SCEF 2 sends a report #1B on the second event to the SCS/AS 2. Correspondingly, the SCS/AS 2 receives the report #1B that is on the second event and that is sent by the SCEF 2.

The report #1B on the second event carries the event type #2 and the TLTRI #2.

S804: The MME/SGSN detects that the first timer expires.

If the first timer is used for subscribing to the second event, the method includes steps S805a and S806a. If the first timer is used for subscribing to the first event, the method includes steps S805b and S806b.

S805a: The MME/SGSN sends the report #1A on the second event to the SCEF 2. Correspondingly, the SCEF 2 receives the report #1A that is on the second event and that is sent by the MME/SGSN.

The report #1A on the second event carries the event type #2 and the SCEF reference identifier #2.

S806a: The SCEF 2 sends the report #1B on the second event to the SCS/AS 2. Correspondingly, the SCS/AS 2 receives the report #1B that is on the second event and that is sent by the SCEF 2.

The report #1B on the second event carries the event type #2 and the TLTRI #2.

S805b: The MME/SGSN sends the report #1A on the first event to the SCEF 1. Correspondingly, the SCEF 1 receives the report #1A that is on the first event and that is sent by the MME/SGSN.

The report #1A on the first event carries the event type #1 and the SCEF reference identifier #1.

S806b: The SCEF 1 sends the report #1B on the first event to the SCS/AS 1. Correspondingly, the SCS/AS 1 receives the report #1B that is on the first event and that is sent by the SCEF 1.

The report #1B on the first event carries the event type #1 and the TLTRI #1.

It should be understood that, that the MME/SGSN sends the report on the first event may also be described as that the MME/SGSN reports the first event. Correspondingly, that the MME/SGSN sends the report on the second event may also be described as that the MME/SGSN reports the second event.

Figure 9A:
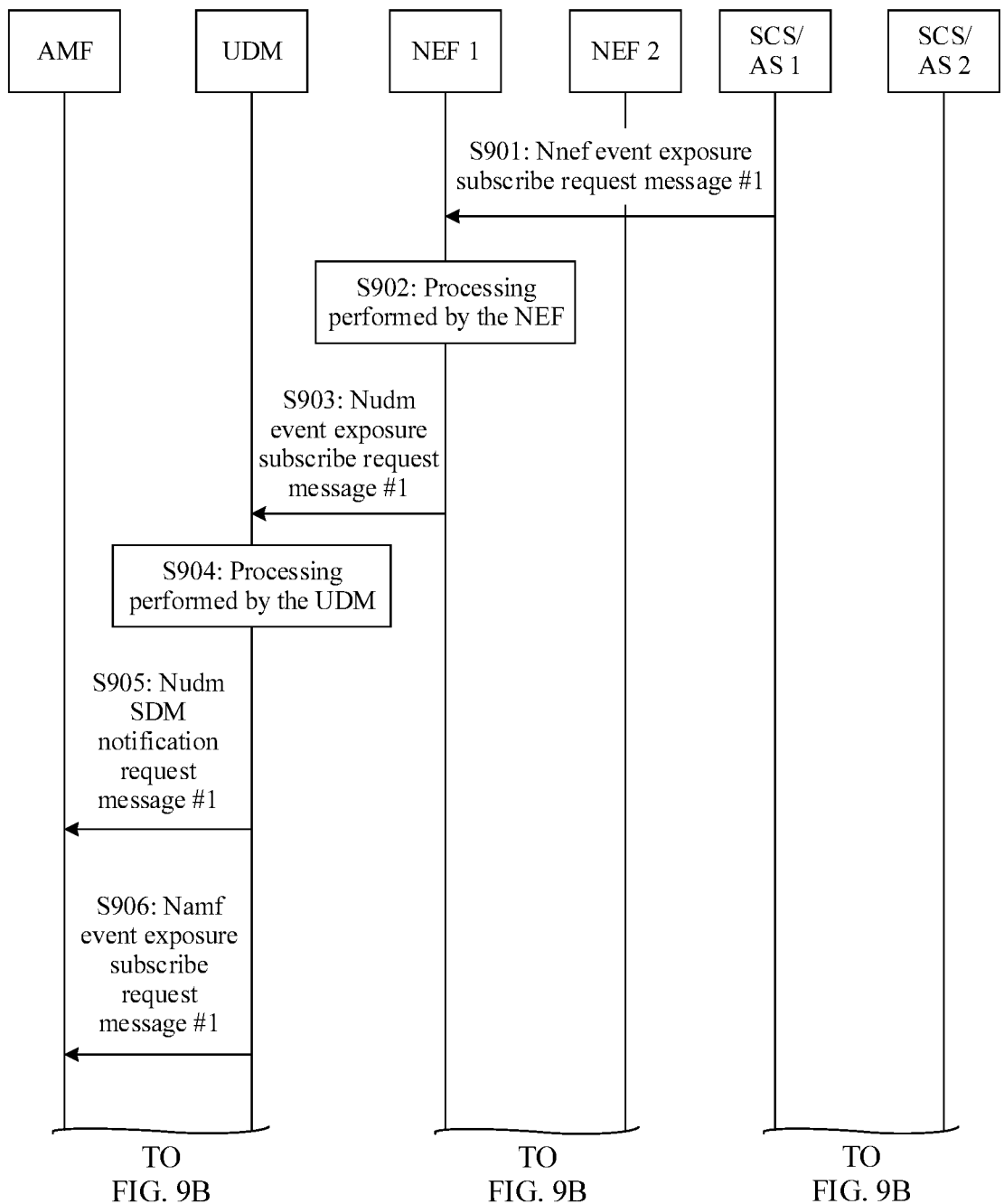
FIG. 9A, FIG. 9B, and FIG. 9C are an example flowchart of an event subscription method according to another embodiment of this application.
Figure 9B:
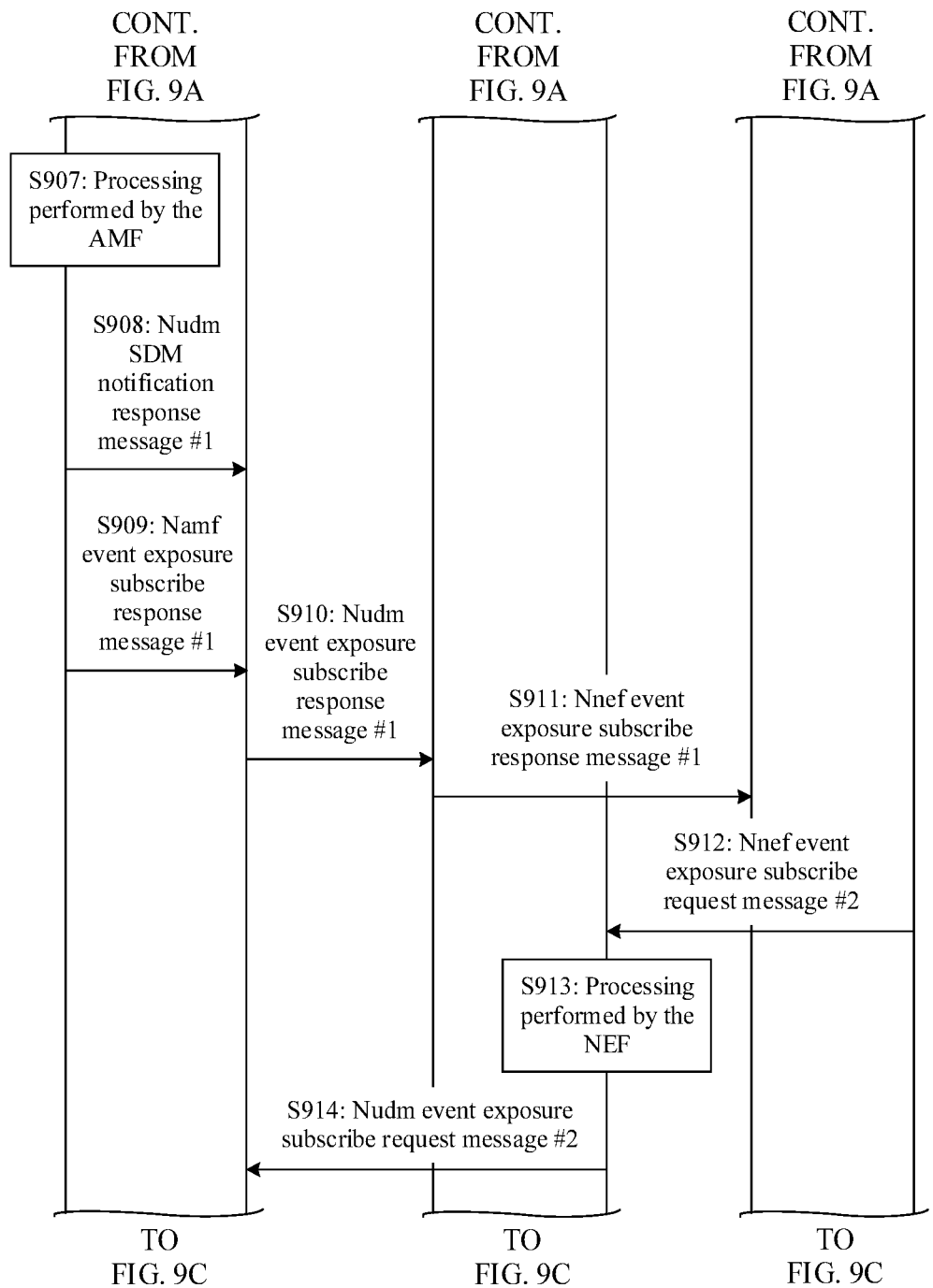
Figure 9C:
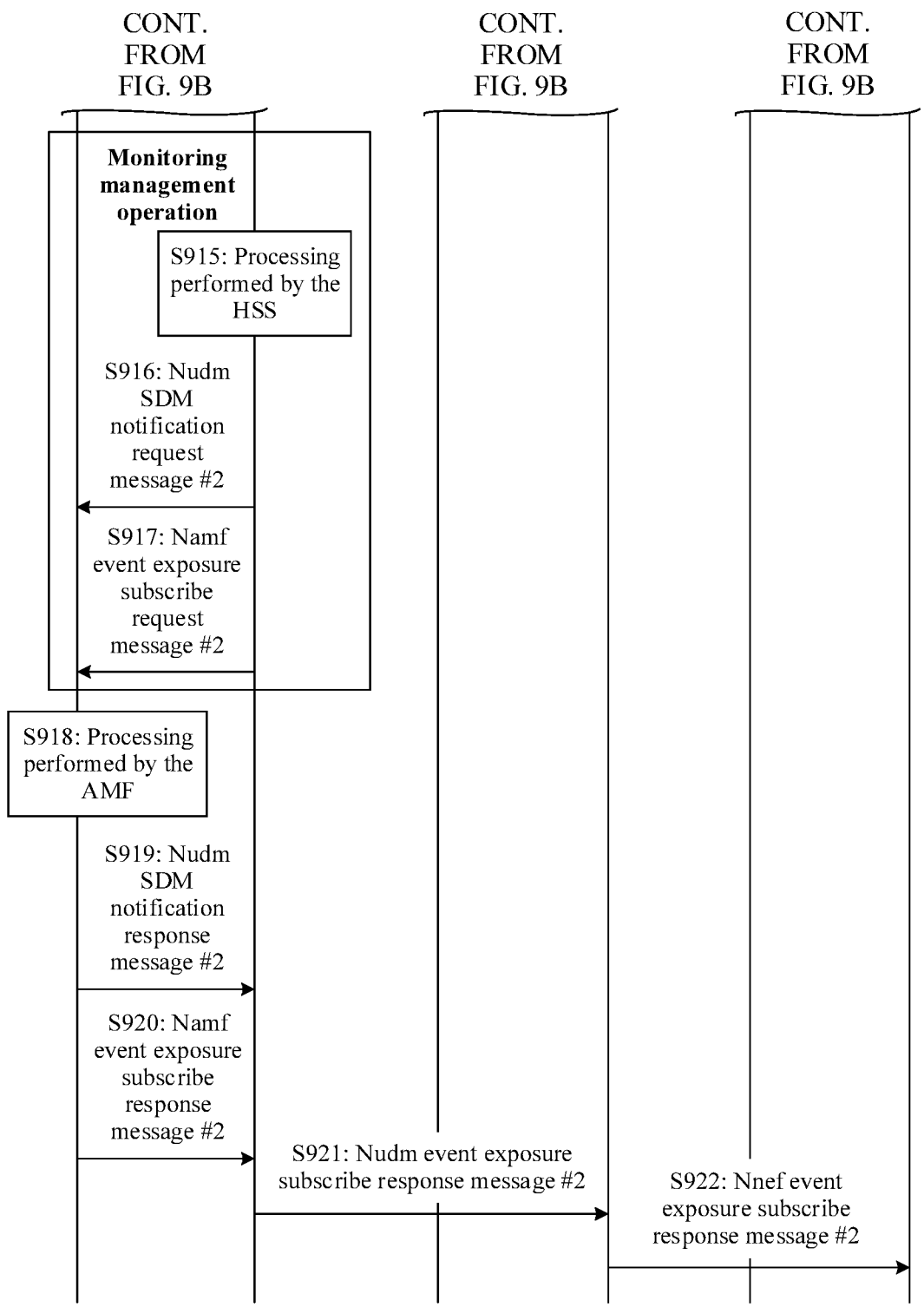

FIG. 9A, FIG. 9B, and FIG. 9C are an example flowchart of an event subscription method according to another embodiment of this application. The embodiment shown in FIG. 9A, FIG. 9B, and FIG. 9C may be applied to the system or the architecture diagram shown in FIG. 2 or FIG. 4. It should be understood that FIG. 9A, FIG. 9B, and FIG. 9C show detailed steps or operations of the method 900. However, these steps or operations are merely an example. In this embodiment of this application, another operation may be further performed or only some of the operations in FIG. 9A, FIG. 9B, and FIG. 9C may be performed.

S901: An SCS/AS 1 sends an Nnef event exposure subscribe request (Nnef_EventExposure_Subscribe request) message #1 to an NEF 1. Correspondingly, the NEF 1 receives the Nnef event exposure subscribe request message #1 sent by the SCS/AS 1.

The Nnef event exposure subscribe request message #1 is used to request a subscription to a first event. The Nnef event exposure subscribe request message #1 carries an SCS/AS identifier #1 and an event type #1. For the SCS/AS identifier #1 and the event type #1, refer to the descriptions of the step S601 in the method 600 described above. When monitoring event subscription is performed for single UE, the Nnef event exposure subscribe request message #1 further carries an external identifier or an MSISDN. When monitoring event configuration is performed for a group of UEs, the Nnef event exposure subscribe request message #1 further carries an external group identifier.

When the event type #1 is a loss of connectivity event, the Nnef event exposure subscribe request message #1 may further carry a maximum detection time that is denoted as MDT #1 herein.

When the event type #1 is a UE reachability event, the Nnef event exposure subscribe request message #1 may further carry a maximum latency that is denoted as ML #1 herein. In addition, the Nnef event exposure subscribe request message #1 may further carry one or more of the following parameters: a maximum response time, which is denoted as MRT #1 herein, and a suggested quantity of downlink packets, which is denoted as SNDP #1.

S902: The NEF 1 stores the SCS/AS identifier #1, the event type #1, and the MDT #1 or the ML #1, and allocates an NEF reference identifier #1. The NEF reference identifier #1 is used to identify the subscription to the first event. The NEF 1 authorizes a configuration request according to a local policy.

Further, for S902, refer to the other approaches. Details are not described herein.

Optionally, the NEF 1 may determine a priority of the subscription to the first event based on a service-level agreement with the SCS/AS 1, and the priority is represented as a priority #1 herein.

S903: The NEF 1 sends an Nudm event exposure subscribe request (Nudm_EventExposure_Subscribe request) message #1 to a UDM. Correspondingly, the UDM receives the Nudm event exposure subscribe request message #1 sent by the NEF 1.

The Nudm event exposure subscribe request message #1 carries the external identifier or the MSISDN or the external group identifier, the event type #1, an NEF 1 identifier, the NEF reference identifier #1, and the MDT #1 or the ML #1. In addition, the Nudm event exposure subscribe request message #1 may further carry the optional parameters in S901.

Optionally, the Nudm event exposure subscribe request message #1 may further carry the priority #1.

S904: The UDM checks the Nudm event exposure subscribe request message #1. After the check is successful, the UDM stores the received parameters. The UDM stores a correspondence between the external identifier and a UE subscriber identifier, and a correspondence between the external group identifier and a UE subscriber identifier of a group member.

If the event type #1 is the loss of connectivity event, and the Nudm event exposure subscribe request message #1 carries the MDT #1, an HSS sets duration of a subscribed periodic update timer of the UE for the UE based on the MDT #1. Usually, the set duration of the subscribed periodic update timer of the UE is equal to the MDT #1, or is slightly less than the MDT #1 (that is, the duration of the subscribed periodic update timer of the UE is obtained by subtracting a fixed value (for example, 4 minutes) from the MDT #1).

If the event type #1 is the UE reachability event, and the Nudm event exposure subscribe request message #1 carries the ML #1, an HSS sets duration of a subscribed periodic update timer of the UE for the UE based on the ML #1. Usually, the set duration of the subscribed periodic update timer of the UE is equal to the ML #1.

S905: The UDM sends an Nudm SDM notification request (Nudm_SDM_Notification Request) message #1 to an AMF for the UE or each group member UE. Correspondingly, the AMF receives the Nudm SDM notification request message #1 sent by the UDM.

The Nudm SDM notification request message #1 carries the subscribed periodic update timer of the UE or the duration of the subscribed periodic update timer of the UE. Herein, the subscribed periodic update timer of the UE is a periodic registration area (Registration Area) update timer. If the Nudm SDM notification request message #1 is for the group of UEs, the Nudm SDM notification request message #1 carries an external identifier or an MSISDN, and the UDM sends the Nudm SDM notification request message #1 to all AMFs serving the group.

In addition, if the event type #1 is UE reachability, the Nudm SDM notification request message #1 may further carry the MRT #1 (if provided) and the SNPD #1 (if provided).

S906: The UDM sends an Namf event exposure subscribe request (Namf_EventExposure_Subscribe Request) message #1 to the AMF for the UE or each group member UE. Correspondingly, the AMF receives the Namf event exposure subscribe request message #1 sent by the UDM.

The Namf event exposure subscribe request message #1 carries the event type #1, the NEF 1 identifier, and the NEF reference identifier #1.

S907: The AMF stores the received parameters.

In a subsequent registration area update procedure, the AMF allocates the received subscribed periodic update timer of the UE to the UE as the periodic registration area update timer. Correspondingly, the UE receives the subscribed periodic update timer allocated by the AMF, that is, the duration of the subscribed periodic update timer of the UE.

If the event type #1 is the loss of connectivity event, the AMF starts to monitor whether a mobile reachable timer expires. The mobile reachable timer is set based on the subscribed periodic update timer of the UE. Generally, if the duration of the subscribed periodic update timer is set based on the MDT #1, a value of the mobile reachable timer is equal to that of the subscribed periodic update timer of the UE, or is slightly greater than that of the subscribed periodic update timer of the UE, that is, the duration of the mobile reachable timer is obtained by adding up the fixed value (for example, 4 minutes) and the duration of the subscribed periodic update timer of the UE. In this way, the duration of the mobile reachable timer is equal to the MDT #1.

If the event type #1 is the UE reachability event, the AMF starts to monitor whether the UE enters a connected mode. If the MRT #1 is provided, the AMF provides the MRT #1 to the UE, and the UE determines, based on the MRT #1, a time in which a state of being reachable for paging is kept.

If the SNPD #1 is provided, the AMF provides the SNPD #1 to a session management function (SMF). If the SMF receives the SNPD #1, the SMF buffers data based on the SNPD #1 (the data is buffered in the SMF), or sends the SNPD #1 to a user plane function (UPF), where the UPF buffers data based on the SNPD #1 (the data is buffered in the UPF).

S908: The AMF sends an Nudm SDM notification response (Nudm_SDM_Notification Response) message #1 to the UDM. Correspondingly, the UDM receives the Nudm SDM notification response message #1 sent by the AMF.

The Nudm SDM notification response message #1 carries acceptance indication information #1A, and the acceptance indication information #1A is used to indicate that the AMF accepts data insertion.

S909: The AMF allocates an AMF subscription (Subscription) identifier #1, and returns an Namf event exposure subscribe response (Namf_EventExposure_Subscribe Response) message #1 to the UDM. Correspondingly, the UDM receives the Namf event exposure subscribe response message #1 sent by the AMF.

The Namf event exposure subscribe response message #1 carries the AMF subscription identifier #1 and acceptance indication information #1B, and the acceptance indication information 1B is used to indicate that the AMF accepts the subscription to the first event.

S910: The UDM allocates a UDM subscription (Subscription) identifier #1, and stores a correspondence between the AMF subscription identifier #1 and the UDM subscription identifier #1. The UDM sends an Nudm event exposure subscribe response (Nudm_EventExposure_Subscribe Response) message #1 to the NEF 1. Correspondingly, the NEF 1 receives the Nudm event exposure subscribe response message #1 sent by the UDM.

The Nudm event exposure subscribe response message #1 carries the UDM subscription identifier #1 and acceptance indication information #1C, and the acceptance indication information #1C is used to indicate that the UDM accepts the subscription to the first event.

S911: The NEF 1 allocates an NEF 1 subscription identifier, and stores a correspondence between the UDM subscription identifier #1 and the NEF 1 subscription identifier. The NEF 1 sends an Nnef event exposure subscribe response (Nnef_EventExposure_Subscribe Response) message #1 to the SCS/AS 1. Correspondingly, the SCS/AS 1 receives the Nnef event exposure subscribe response message #1 sent by the NEF 1.

The Nnef event exposure subscribe response message #1 carries the NEF 1 subscription identifier and acceptance indication information #1D, and the acceptance indication information #1D is used to indicate that the NEF 1 accepts the subscription to the first event.

S912: An SCS/AS 1 sends an Nnef event exposure subscribe request message #2 to an NEF 2 at a time point. Correspondingly, the NEF 2 receives the Nnef event exposure subscribe request message #2 sent by the SCS/AS 1.

The Nnef event exposure subscribe request message #2 is used to request a subscription to a second event. The Nnef event exposure subscribe request message #2 carries an SCS/AS identifier #2 and an event type #2. When monitoring event subscription is performed for single UE, the Nnef event exposure subscribe request message #2 further carries an external identifier or an MSISDN. When monitoring event configuration is performed for a group of UEs, the Nnef event exposure subscribe request message #2 further carries an external group identifier. The UE indicated by the external identifier or the MSISDN herein is the same UE as the UE in S901. The subscriber group indicated by the external group identifier herein is the same subscriber group as the subscriber group in S901.

When the event type #2 is a loss of connectivity event, the Nnef event exposure subscribe request message #2 may further carry a maximum detection time that is denoted as MDT #2 herein.

When the event type #2 is a UE reachability event, the Nnef event exposure subscribe request message #2 may further carry a maximum latency that is denoted as ML #2 herein. In addition, the Nnef event exposure subscribe request message #2 may further carry one or more of the following parameters: a maximum response time, which is denoted as MRT #2 herein, and a suggested quantity of downlink packets, which is denoted as SNDP #2 herein.

S913: The NEF 2 stores the SCS/AS identifier #2, and the MDT #2 or the ML #2, and allocates an NEF reference identifier #2. The NEF 2 authorizes a configuration request according to a local policy.

Further, for S913, refer to the other approaches. Details are not described herein.

Optionally, the NEF 2 may determine a priority of the subscription to the second event based on a service-level agreement with the SCS/AS 2, and the priority is represented as a priority #2 herein.

S914: The NEF 2 sends an Nudm event exposure subscribe request message #2 to the UDM. Correspondingly, the UDM receives the Nudm event exposure subscribe request message #2 sent by the NEF 2.

It should be understood that the Nudm event exposure subscribe request message #2 corresponds to the second message in the foregoing descriptions of that the system 100 monitors two subscription events.

The Nudm event exposure subscribe request message #2 carries the external identifier or the MSISDN or the external group identifier, the event type #2, an NEF 2 identifier, the NEF reference identifier #2, and the MDT #2 or the ML #2. In addition, the Nudm event exposure subscribe request message #2 may further carry the optional parameters in S912.

Optionally, the Nudm event exposure subscribe request message #2 may further carry the priority #2.

S915: The UDM performs related processing based on the event type and a time parameter that are in each of the Nudm event exposure subscribe request message #2 and the Nudm event exposure subscribe request message #1.

The UDM compares the time parameter (that is, the MDT #2 or the ML #2) carried in the Nudm event exposure subscribe request message #2 with a value of the duration that is of the subscribed periodic update timer of the UE and that is in the Nudm SDM notification request message #1 sent to the AMF in the step S905, determines whether the subscribed periodic update timer of the UE needs to be reset, and if the subscribed periodic update timer of the UE needs to be reset, determines updated duration of the subscribed periodic update timer of the UE. In addition, whether a timer (that is, a first timer) newly added to the AMF needs to be set may be further determined based on the event type #1 and/or the event type #2. If the first timer needs to be set, duration of the first timer is determined.

If the duration of the subscribed periodic update timer of the UE is set based on the MDT #1 in the step S905, and the value of the duration of the subscribed periodic update timer of the UE is obtained by subtracting the fixed value from the MDT #1, the MDT #2 may be compared with the duration of the subscribed periodic update timer of the UE plus the fixed value. Moreover, the duration of the first timer may also be calculated based on the duration of the subscribed periodic update timer of the UE plus the fixed value. If the HSS needs to determine the updated duration of the subscribed periodic update timer of the UE based on the MDT #2, the updated duration of the subscribed periodic update timer of the UE is equal to the MDT #2, or is slightly less than the MDT #2 (that is, the updated duration of the subscribed periodic update timer of the UE is obtained by subtracting the fixed value (for example, 4 minutes) from the MDT #2). Further, refer to the foregoing descriptions of related content. Details are not described herein again.

S916: The UDM sends an Nudm SDM notification request message #2 to the AMF for each UE (the UDM stores the correspondence between the external identifier and the subscriber identifier) or each group member UE (the UDM stores the correspondence between the external group identifier and the subscriber identifier of each group member). Correspondingly, the AMF receives the Nudm SDM notification request message #2 sent by the UDM.

If the Nudm event exposure subscribe request message #2 is for the group of UEs, the Nudm SDM notification request message #2 carries an external identifier or an MSISDN, and the UDM sends the Nudm SDM notification request message #2 to all AMFs serving the group. In addition, if the subscribed periodic update timer of the UE needs to be reset, the Nudm SDM notification request message #2 further carries the updated duration of the subscribed periodic update timer of the UE. If the first timer of the AMF needs to be set, the Nudm SDM notification request message #2 further carries the duration of the first timer.

In addition, if the event type #2 is the UE reachability event, the Nudm event exposure subscribe request message #2 further provides the MRT #2, and MRT #2>MRT #1, the Nudm SDM notification request message #2 further carries the MRT #2 (the MRT #2 is a maximum value in MRTs carried in all event subscriptions for the UE). In addition, if the Nudm event exposure subscribe request message #2 further provides the SNPD #2, and SNPD #2>SNPD #1, the Nudm SDM notification request message #2 may further carry the SNPD #2 (the MAT #2 is a maximum value in SNDPs carried in all the event subscriptions for the UE).

S917: The UDM sends an Namf event exposure subscribe request (Namf_EventExposure_Subscribe Request) message #2 to the AMF for the UE or each group member UE. Correspondingly, the AMF receives the Namf event exposure subscribe request message #2 sent by the UDM.

The Namf event exposure subscribe request message #2 carries the event type #2, the NEF 2 identifier, and the NEF reference identifier #2.

S918: The AMF stores the received parameters.

In a subsequent registration area update procedure, the AMF allocates, to the UE as the periodic registration area update timer, the subscribed periodic update timer that is of the UE and that is stored in S907. Alternatively, if the Nudm SDM notification request message #2 carries the updated duration of the subscribed periodic update timer of the UE, the updated duration of the subscribed periodic update timer of the UE is allocated to the UE and used as duration of the periodic registration area update timer. If the Nudm SDM notification request message #2 carries the duration of the first timer, the duration of the first timer is used as the duration of the first timer of the AMF.

If the event type #2 is the loss of connectivity event, the AMF starts to monitor whether the mobile reachable timer or the first timer that is associated with the event type #2 expires. If the event type #1 is the loss of connectivity event, the AMF starts to monitor whether the mobile reachable timer or the first timer that is associated with the event type #1 expires. If the event type #2 is the UE reachability event, the AMF starts to monitor whether the UE enters the connected mode. If the event type #1 is UE reachability, the AMF starts to monitor whether the UE enters the connected mode. If the MRT #2 is provided, the AMF provides the MRT #2 to the UE, and the UE determines, based on the MRT #2, a time in which a state of being reachable for paging is kept. If the AMF provides the SNPD #2 to the SMF, the SMF buffers data based on the SNPD #2 (the data is buffered in the SMF), or sends the SNPD #2 to the UPF, where the UPF buffers data based on the SNPD #2 (the data is buffered in the UPF).

S919: The AMF sends an Nudm SDM notification response message #1 to the UDM. Correspondingly, the UDM receives the Nudm SDM notification response message #1 sent by the AMF.

The Nudm SDM notification response message #1 carries acceptance indication information #2A, and the acceptance indication information #2A is used to indicate that the AMF accepts data insertion.

S920: The AMF allocates an AMF subscription identifier #2, and returns an Namf event exposure subscribe response message #2 to the UDM. Correspondingly, the UDM receives the Namf event exposure subscribe response message #2 sent by the AMF.

The Namf event exposure subscribe response message #2 carries the AMF subscription identifier #2 and acceptance indication information #2B, and the acceptance indication information 2B is used to indicate that the AMF accepts the subscription to the second event.

S921: The UDM allocates a UDM subscription identifier #2, and stores a correspondence between the AMF subscription identifier #2 and the UDM subscription identifier #2. The UDM sends an Nudm event exposure subscribe response message #2 to the NEF 2. Correspondingly, the NEF 2 receives the Nudm event exposure subscribe response message #2 sent by the UDM.

The Nudm event exposure subscribe response message #2 carries the UDM subscription identifier #2 and acceptance indication information #2C, and the acceptance indication information #2C is used to indicate that the UDM accepts the subscription to the second event.

S922: The NEF 2 allocates an NEF 2 subscription identifier, and stores a correspondence between the UDM subscription identifier #2 and the NEF 2 subscription identifier. The NEF 2 sends an Nnef event exposure subscribe response message #2 to the SCS/AS 2. Correspondingly, the SCS/AS 2 receives the Nnef event exposure subscribe response message #2 sent by the NEF 2.

The Nnef event exposure subscribe response message #2 carries the NEF 2 subscription identifier and acceptance indication information #2D, and the acceptance indication information #2D is used to indicate that the NEF accepts the subscription to the second event.

In conclusion, according to the event subscription method in this embodiment of this application, when accepting a new event subscription, the UDM does not cancel an existing event subscription, but accepts a plurality of event subscriptions at the same time. This can improve system performance.

It should be understood that the SCS/AS 1 and the SCS/AS 2 shown in FIG. 9A, FIG. 9B, and FIG. 9C may be a same SCS/AS, and the NEF 1 and the NEF 2 may also be a same NEF. This is not limited in this embodiment of this application.

It should be understood that, for a part that is not described in detail in S901 to S914, refer to the other approaches. Details are not described herein.

Figure 10:
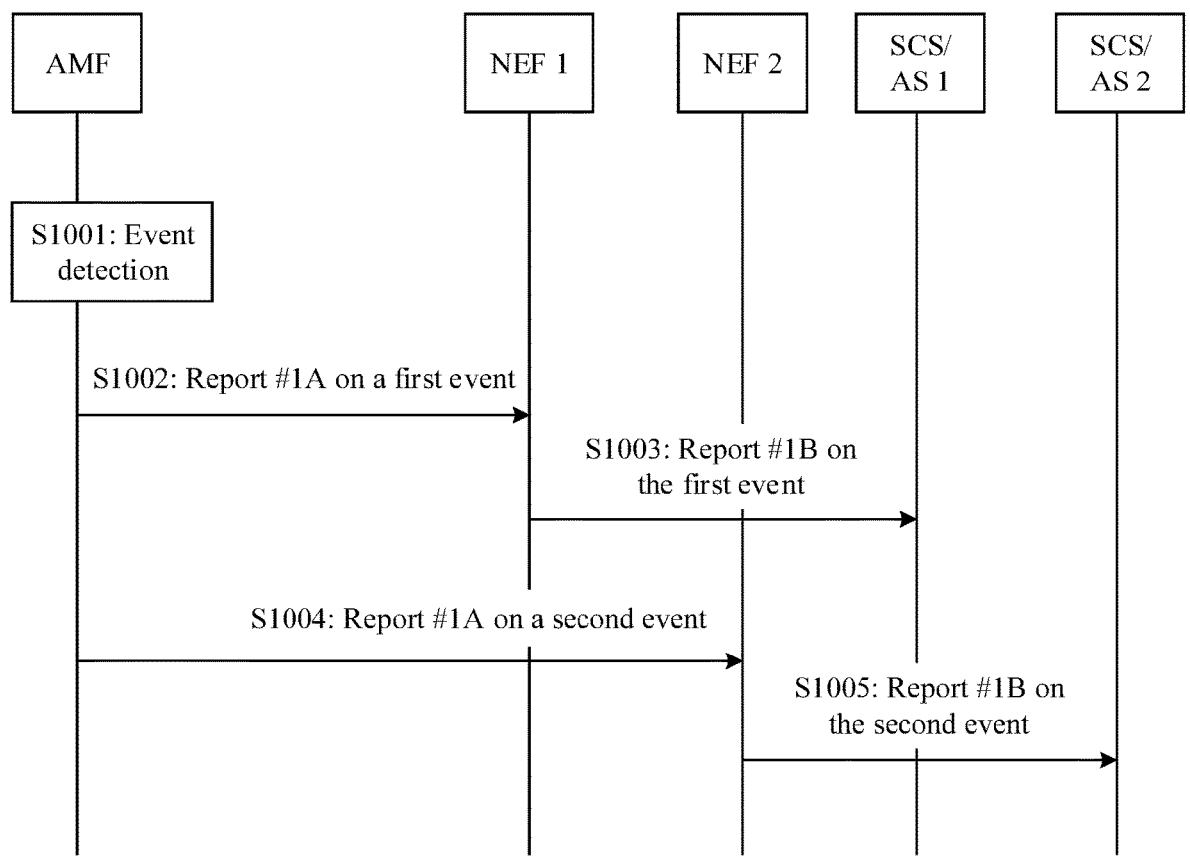
FIG. 10 is an example flowchart of an event subscription method according to an embodiment of this application.

FIG. 10 is an example flowchart of an event subscription method according to an embodiment of this application. FIG. 10 shows an event reporting procedure performed after a corresponding network element performs the monitoring management operation shown in FIG. 9A, FIG. 9B, and FIG. 9C. In the event reporting procedure described in FIG. 10, both the type of the first event and the type of the second event are UE reachability events.

S1001: The AMF performs event monitoring based on the parameters delivered in the steps S905, S906, S916, and S917 in FIG. 9A, FIG. 9B, and FIG. 9C, and detects that the UE changes to the connected mode.

S1002: The AMF sends a report #1A on the first event to the NEF 1. Correspondingly, the NEF 1 receives the report #1A that is on the first event and that is sent by the AMF.

The report #1A on the first event carries the event type #1 and the NEF reference identifier #1.

S1003: The NEF 1 sends a report #1B on the first event to the SCS/AS 1. Correspondingly, the SCS/AS 1 receives the report #1B that is on the first event and that is sent by the NEF 1.

The report #1B on the first event carries the event type #1 and the NEF 1 subscription identifier.

S1004: The AMF sends a report #1A on the second event to the NEF 2. Correspondingly, the NEF 2 receives the report #2A that is on the second event and that is sent by the AMF.

The report #1A on the second event carries the event type #2 and the NEF reference identifier #2.

S1005: The NEF 2 sends a report #1B on the second event to the SCS/AS 2. Correspondingly, the SCS/AS 2 receives the report #1B that is on the second event and that is sent by the NEF 2.

The report #1B on the second event carries the event type #2 and the NEF 2 subscription identifier.

Figure 11:
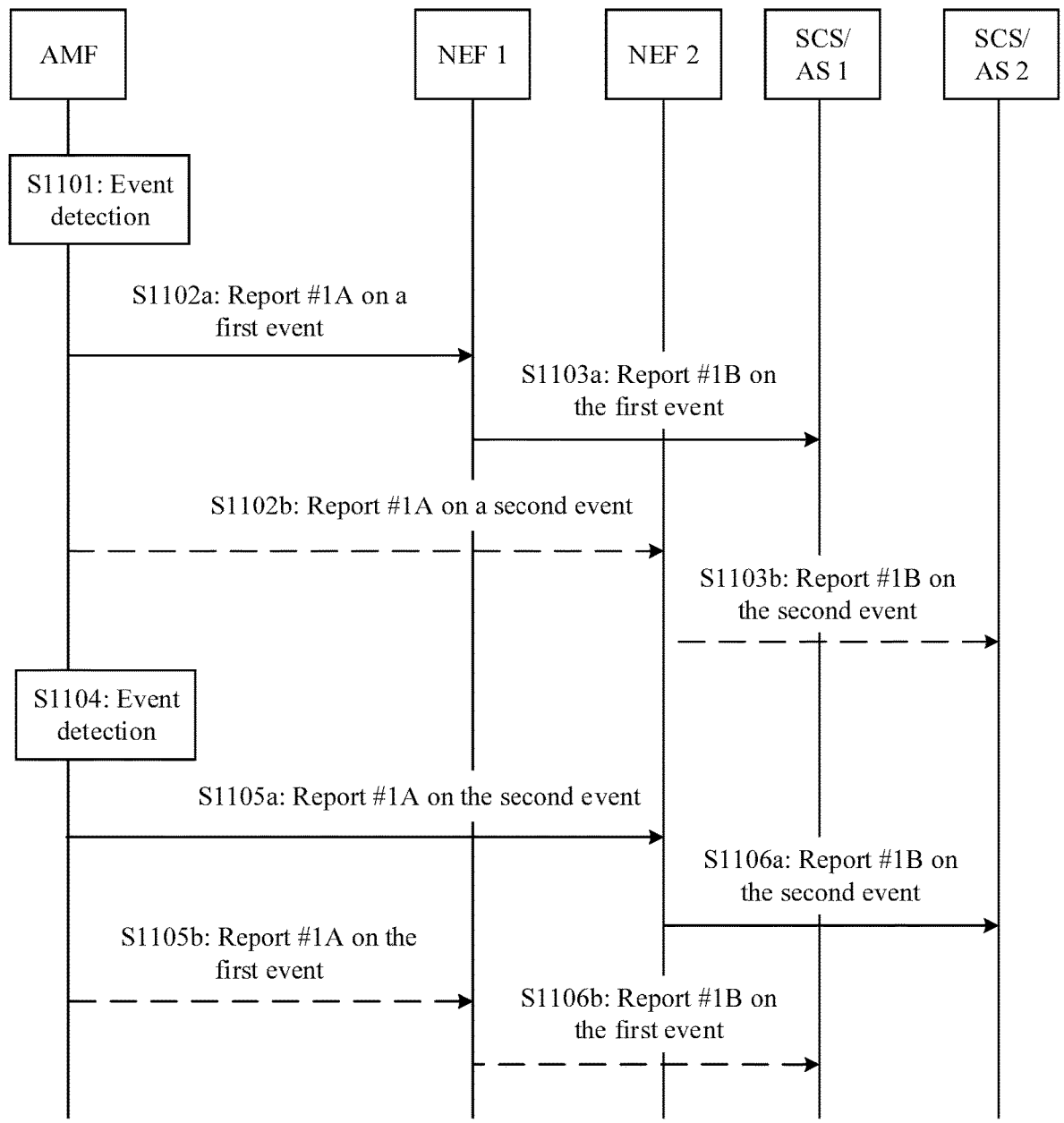
FIG. 11 is an example flowchart of an event subscription method according to an embodiment of this application.

FIG. 11 is an example flowchart of an event subscription method according to an embodiment of this application. FIG. 11 shows an event reporting procedure performed after a corresponding network element performs the monitoring management operation shown in FIG. 9A, FIG. 9B, and FIG. 9C. In the event reporting procedure described in FIG. 11, both the type of the first event and the type of the second event are loss of connectivity events. When the mobile reachable timer expires, the AMF reports a detected event to an associated SCEF. Further, when the first timer expires, the AMF reports a detected event to an associated NEF.

S1101: The AMF performs event monitoring based on the parameters delivered in the steps S905, S906, S916, and S917 in FIG. 9A, FIG. 9B, and FIG. 9C, and detects that the mobile reachable timer expires.

If the mobile reachable timer is used for subscribing to the first event, the method includes steps S1102a and S1103a. If the mobile reachable timer is used for subscribing to the second event, the method includes steps S1102b and S1103b.

S1102a: The AMF sends a report #1A on the first event to the NEF 1. Correspondingly, the NEF 1 receives the report #1A that is on the first event and that is sent by the AMF.

The report #1A on the first event carries the event type #1 and the NEF reference identifier #1.

S1103a: The NEF 1 sends a report #1B on the first event to the SCS/AS 1. Correspondingly, the SCS/AS 1 receives the report #1B that is on the first event and that is sent by the NEF 1.

The report #1B on the first event carries the event type #1 and the NEF 1 subscription identifier.

S1102b: The AMF sends a report #1A on the second event to the NEF 2. Correspondingly, the NEF 2 receives the report #1A that is on the second event and that is sent by the AMF.

The report #1A on the second event carries the event type #2 and the NEF reference identifier #2.

S1103b: The NEF 2 sends a report #1B on the second event to the SCS/AS 2. Correspondingly, the SCS/AS 2 receives the report #1B that is on the second event and that is sent by the NEF 2.

The report #1B on the second event carries the event type #2 and the NEF 2 subscription identifier.

S1104: The AMF detects that the first timer expires.

If the first timer is used for subscribing to the second event, the method includes steps S1105a and S1106a. If the first timer is used for subscribing to the first event, the method includes steps S1105b and S1106b.

S1105a: The AMF sends the report #1A on the second event to the NEF 2. Correspondingly, the NEF 2 receives the report #1A that is on the second event and that is sent by the AMF.

The report #1A on the second event carries the event type #2 and the NEF reference identifier #2.

S1106a: The NEF 2 sends a report #1B on the second event to the SCS/AS 2. Correspondingly, the SCS/AS 2 receives the report #1B that is on the second event and that is sent by the NEF 2.

The report #1B on the second event carries the event type #2 and the NEF 2 subscription identifier.

S1105b: The AMF sends the report #1A on the first event to the NEF 1. Correspondingly, the NEF 1 receives the report #1A that is on the first event and that is sent by the AMF.

The report #1A on the first event carries the event type #1 and the NEF reference identifier #1.

S1106b: The NEF 1 sends the report #1B on the first event to the SCS/AS 1. Correspondingly, the SCS/AS 1 receives the report #1B that is on the first event and that is sent by the NEF 1.

The report #1B on the first event carries the event type #1 and the NEF 1 subscription identifier.

It should be understood that, that the AMF sends the report on the first event may also be described as that the AMF reports the first event. Correspondingly, that the AMF sends the report on the second event may also be described as that the AMF reports the second event.

The following separately describes in detail another event subscription method in an embodiment of the present disclosure with reference to the architecture diagrams shown in FIG. 3 and FIG. 4.

Figure 12A:
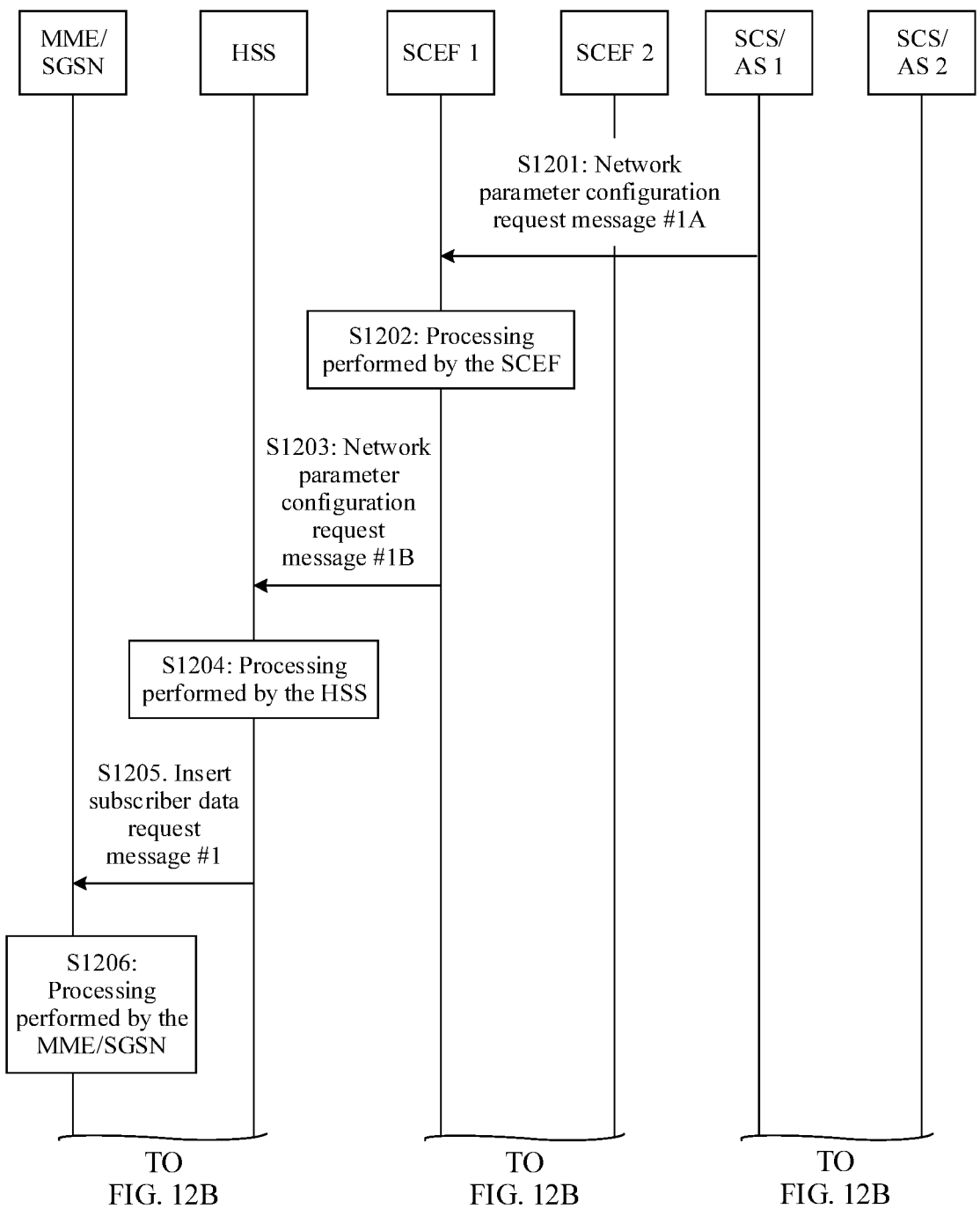
FIG. 12A, FIG. 12B, and FIG. 12C are an example flowchart of a communication method according to an embodiment of this application.
Figure 12B:
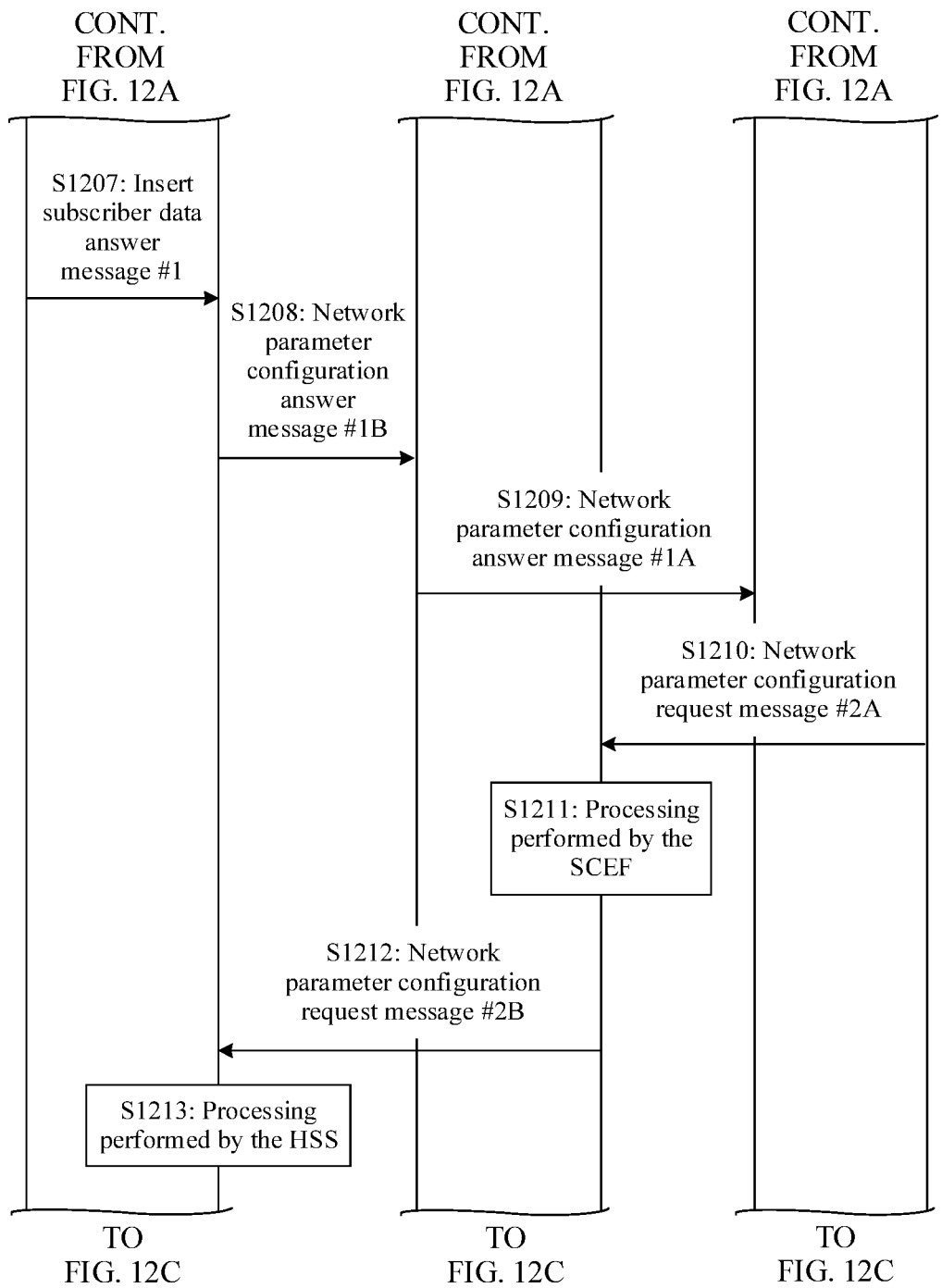
Figure 12C:
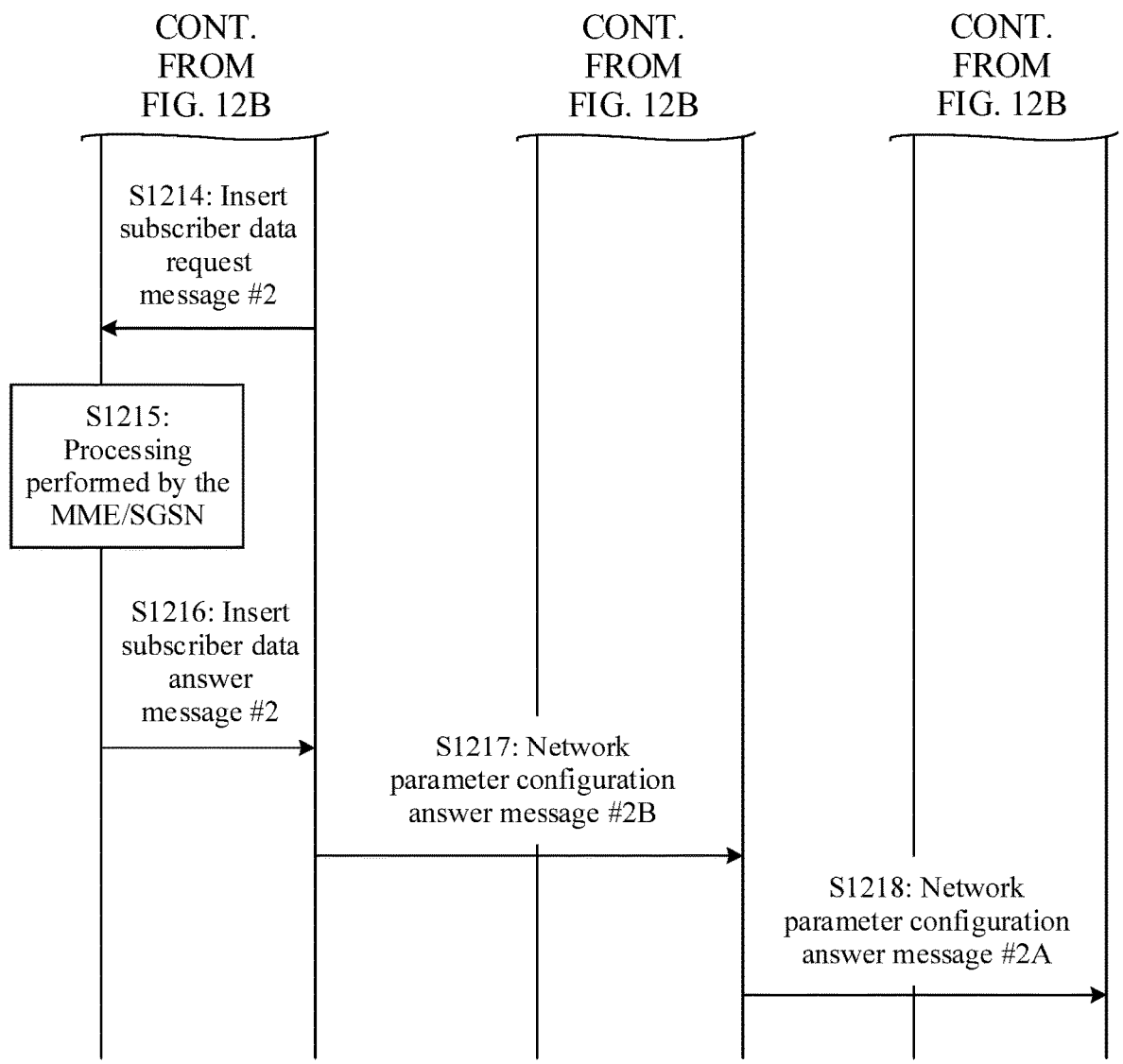

FIG. 12A, FIG. 12B, and FIG. 12C are an example flowchart of a communication method according to an embodiment of this application. The embodiment shown in FIG. 12A, FIG. 12B, and FIG. 12C may be applied to the system or the architecture diagram shown in FIG. 1 or FIG. 3. It should be understood that FIG. 12A, FIG. 12B, and FIG. 12C show detailed steps or operations of the method 1200. However, these steps or operations are merely an example. In this embodiment of this application, another operation may be further performed or only some of the operations in FIG. 12A, FIG. 12B, and FIG. 12C may be performed.

S1201 An SCS/AS 1 sends a network parameter configuration request message #1A to an SCEF 1. Correspondingly, the SCEF 1 receives the network parameter configuration request message #1A sent by the SCS/AS 1.

The network parameter configuration request message #1A is similar to the monitoring request message #1A in the method shown in FIG. 6A and FIG. 6B. Different from the monitoring request message #1A, the network parameter configuration request message #1A may be used only for network parameter configuration, but not for event subscription. In this case, the network parameter configuration request message #1A does not carry the event type #1 in the monitoring request message #1A. Except the event type #1, other parameters carried in the network parameter configuration request message #1A are the same as those carried in the monitoring request message #1A. It should be noted that a TLTRI #1 in the network parameter configuration request message #1A is used to indicate currently performed network parameter configuration (denoted as first network parameter configuration herein) instead of event subscription.

When the network parameter configuration request message #1A is used to perform network parameter configuration for single UE, the network parameter configuration request message #1A further carries an external identifier or an MSISDN. When the network parameter configuration request message #1A is used to perform network parameter configuration for a group of UEs, the network parameter configuration request message #1A further carries an external group identifier.

The network parameter configuration request message #1A may carry a maximum latency that is denoted as ML #1 herein.

Optionally, the network parameter configuration request message #1A may further carry a maximum response time and/or a suggested quantity of downlink packets, which are respectively denoted as MRT #1 and SNDP #1.

Optionally, the network parameter configuration request message #1A may carry the event type #1. In this case, the TLTRI #1 is used to indicate a subscription to a first event. The event type #1 is an event type of the first event. In this case, when the type of the first event is loss of connectivity, the network parameter configuration request message #1A may further carry a maximum detection time that is denoted as MDT #1 herein.

S1202: The SCEF 1 stores an SCS/AS identifier #1, a T8 destination address #1, the TLTRI #1, the ML #1 or the MDT #1, and the optional parameters in S1201, and authorizes network parameter configuration according to a local policy. After the authorization is successful, the SCEF 1 allocates an SCEF reference identifier #1, and stores a correspondence between the SCEF reference identifier #1 and the TLTRI #1. The SCEF reference identifier #1 is used to identify the first network parameter configuration in a core network.

Further, for S1202, refer to the descriptions in the other approaches. Details are not described herein.

S1203: The SCEF 1 sends a network parameter configuration request message #1B to an HSS. Correspondingly, the HSS receives the network parameter configuration request message #1B sent by the SCEF 1.

It should be understood that the network parameter configuration request message #1B corresponds to the first message in the communication method in this application implemented by the system 100 described above.

The network parameter configuration request message #1B carries the external identifier or the MSISDN or the external group identifier, an SCEF 1 identifier, the SCEF reference identifier #1, and the ML #1 or the MDT #1. In addition, the network parameter configuration request message #1B may further carry the optional parameters in S1201.

S1204: The HSS checks the network parameter configuration request message #1B, and after the check is successful, the HSS stores the received parameters.

The HSS sets duration of a subscribed periodic update timer of the UE for the UE based on the ML #1. Usually, the set duration of the subscribed periodic update timer of the UE is equal to the ML #1.

Alternatively, the HSS sets duration of a subscribed periodic update timer of the UE for the UE based on the MDT #1. Usually, the set duration of the subscribed periodic update timer of the UE is equal to the MDT #1, or is slightly less than the MDT #1 (for example, is four minutes less than the MDT #1).

S1205: The HSS sends an insert subscriber data request message #1 to an MME/SGSN for each UE (the HSS stores a correspondence between the external identifier and a subscriber identifier) or each group member UE (the HSS stores a correspondence between the external group identifier and a subscriber identifier of each group member). Correspondingly, the MME/SGSN receives the insert subscriber data request message #1 sent by the HSS.

The insert subscriber data request message #1 carries the subscribed periodic update timer of the UE or the duration of the subscribed periodic update timer of the UE (herein, the subscribed periodic update timer of the UE is an RAU/TAU timer), the SCEF 1 identifier, the SCEF reference identifier #1, and the event type #1. In addition, the insert subscriber data request message #1 may further carry the optional parameters in S201.

If the network parameter configuration request message #1B is for the group of UEs, the insert subscriber data request message #1 carries an external identifier or an MSISDN, and the HSS sends the insert subscriber data request message #1 to all MMEs/SGSNs serving the group.

In addition, if the network parameter configuration request message #1B further provides the MRT #1 and/or the SNPD #1, the insert subscriber data request message #1 may further carry the MRT #1 and/or the SNPD #1.

S1206: The MME/SGSN stores the received parameters.

In a subsequent RAU/TAU procedure, the MME/SGSN allocates the received subscribed periodic update timer of the UE to the UE as a periodic RAU/TAU timer, and sets a mobile reachable timer. Generally, if the duration of the subscribed periodic update timer is set based on the MDT #1, a value of the mobile reachable timer is equal to that of the subscribed periodic update timer of the UE, or is slightly greater than that of the subscribed periodic update timer of the UE, that is, the duration of the mobile reachable timer is obtained by adding up a fixed value (for example, 4 minutes) and the duration of the subscribed periodic update timer of the UE. In this way, the duration of the mobile reachable timer is equal to the MDT #1. If the MRT #1 is provided, the MME/SGSN provides the MRT #1 to the UE, and the UE determines, based on the MRT #1, a time in which a state of being reachable for paging is kept. If the SNPD #1 is provided, the MME/SGSN provides the SNPD #1 to an S-GW, and the S-GW buffers data based on the SNPD #1.

S1207: The MME/SGSN sends an insert subscriber data answer message #1 to the HSS. Correspondingly, the HSS receives the insert subscriber data answer message #1 sent by the MME/SGSN.

The subscriber data answer message #1 carries acceptance indication information #1A, and the acceptance indication information #1A is used to indicate that the MME/SGSN accepts a request for the first network parameter configuration.

S1208: The HSS sends a network parameter configuration answer message #1B to the SCEF 1. Correspondingly, the SCEF 1 receives the network parameter configuration answer message #1B sent by the HSS.

The network parameter configuration answer message #1B carries the SCEF reference identifier #1 and acceptance indication information #1B, and the acceptance indication information #1B is used to indicate that the HSS accepts the request for the first network parameter configuration.

S1209: The SCEF 1 sends a network parameter configuration answer message #1A to the SCS/AS 1. Correspondingly, the SCS/AS 1 receives the network parameter configuration answer message #1A sent by the SCEF 1.

The network parameter configuration answer message #1A carries the TLTRI #1 and acceptance indication information #1C, and the acceptance indication information #1 is used to indicate that the SCEF 1 accepts the request for the first network parameter configuration.

S1210: An SCS/AS 2 sends a network parameter configuration request message #2A to an SCEF 2 at a time point. Correspondingly, the SCEF 2 receives the network parameter configuration request message #2A sent by the SCS/AS 2.

The network parameter configuration request message #2A is similar to the monitoring request message #1A. The network parameter configuration request message #2A may carry an SCS/AS identifier #2, a T8 destination address #2, and a TLTRI #2. The TLTRI #2 is used to indicate currently performed network parameter configuration (denoted as second network parameter configuration herein) instead of event subscription.

When network parameter configuration is performed for single UE, the network parameter configuration request message #2A further carries an external identifier or an MSISDN. When monitoring event configuration is performed for a group of UEs, the network parameter configuration request message #2A further carries an external group identifier. The UE indicated by the MSISDN or the external identifier herein is the same UE as the UE in the step S1201. The subscriber group indicated by the external group identifier herein is the same subscriber group as the subscriber group in the step S1201.

The network parameter configuration request message #2A may carry a maximum latency that is denoted as ML #2 herein.

Optionally, the network parameter configuration request message #2A may further carry a maximum response time and/or a suggested quantity of downlink packets, which are respectively denoted as MRT #2 and SNDP #2.

S1211: The SCEF 2 stores the SCS/AS identifier #2, the T8 destination address #2, the TLTRI #2, the ML #2, and the optional parameters in S1210, and authorizes network parameter configuration according to a local policy. After the authorization is successful, the SCEF 2 allocates an SCEF reference identifier #2, and stores a correspondence between the reference identifier #2 and the TLTRI #2.

S1212: The SCEF 2 sends a network parameter configuration request message #2B to the HSS. Correspondingly, the HSS receives the network parameter configuration request message #2B sent by the SCEF 2.

It should be understood that the network parameter configuration request message #2B corresponds to the second message in the communication method in this application implemented by the system 100 described above.

The network parameter configuration request message #2B carries the external identifier or the MSISDN or the external group identifier, an SCEF 2 identifier, the SCEF reference identifier #2, and the ML #2. In addition, the network parameter configuration request message #2B may further carry the optional parameters in S1210.

S1213: The HSS performs related processing based on the parameters in the network parameter configuration request message #2B and the network parameter configuration request message #1B.

The HSS compares a time parameter (that is, the ML #2) carried in the network parameter configuration request message #2B with a value of the duration that is of the subscribed periodic update timer of the UE and that is in the insert subscriber data request message #1 sent to the MME/SGSN in the step S1205, determines whether the duration of the subscribed periodic update timer of the UE needs to be reset, and if the duration of the subscribed periodic update timer of the UE needs to be reset, determines updated duration of the subscribed periodic update timer of the UE. In addition, whether a timer (that is, a first timer) newly added to the MME/SGSN needs to be set may be further determined based on the event type #1. If the first timer needs to be set, duration of the first timer is determined.

If the ML #2 is less than the duration that is of the subscribed periodic update timer of the UE and that is set in S1204, the HSS determines the updated duration of the subscribed periodic update timer of the UE based on the ML #2, where the updated duration of the subscribed periodic update timer of the UE is used to update the duration of the subscribed periodic update timer of the UE. If the duration of the subscribed periodic update timer of the UE is set based on the MDT #1 in the step S1204, and the value of the duration of the subscribed periodic update timer of the UE is obtained by subtracting the fixed value from the MDT #1, the MDT #2 may be compared with the duration of the subscribed periodic update timer of the UE plus the fixed value. Moreover, the duration of the first timer may also be calculated based on the duration of the subscribed periodic update timer of the UE plus the fixed value. If the HSS needs to determine the updated duration of the subscribed periodic update timer of the UE based on the MDT #2, the updated duration of the subscribed periodic update timer of the UE is equal to the MDT #2, or is slightly less than the MDT #2 (that is, the updated duration of the subscribed periodic update timer of the UE is obtained by subtracting the fixed value (for example, 4 minutes) from the MDT #2). Further, refer to the foregoing descriptions of related content. Details are not described herein again.

Further, if the event type #1 is the UE loss of connectivity event, the HSS further determines the duration of the first timer based on the ML #2 and/or the duration that is of the subscribed periodic update timer of the UE and that is set in S1204. The duration of the first timer is associated with the first event.

Further, for S1213, refer to the foregoing related descriptions of performing, by the user data management network element, the communication method provided in this application. Details are not described herein again.

S1214: The HSS sends an insert subscriber data request message #2 to the MME/SGSN for each UE (the HSS stores the correspondence between the external identifier and the subscriber identifier) or each group member UE (the HSS stores the correspondence between the external group identifier and the subscriber identifier of each group member). Correspondingly, the MME/SGSN receives the insert subscriber data request message #2 sent by the HSS.

If the network parameter configuration request message #2B is for the group of UEs, the insert subscriber data request message #2 carries an external identifier or an MSISDN, and the HSS sends the insert subscriber data request message #2 to all MMEs/SGSNs serving the group. The insert subscriber data request message #2 carries the SCEF 2 identifier and the SCEF reference identifier #2. In addition, if the subscribed periodic update timer of the UE needs to be reset, the insert subscriber data request message #2 further carries the updated duration of the subscribed periodic update timer of the UE. If the first timer of the MME/SGSN needs to be reset, the insert subscriber data request message #2 further carries the duration of the first timer.

In addition, if the network parameter configuration request message #2B further provides the MRT #2, and MRT #2>MRT #1, the insert subscriber data request message #2 may further carry the MRT #2 (the MRT #2 is a maximum value in MRTs carried in all event subscriptions for the UE). If the network parameter configuration request message #2B further provides the SNPD #2, and SNPD #2>SNPD #1, the insert subscriber data request message #2 may further carry the SNPD #2 (the SNPD #2 is a maximum value in SNPDs carried in all the event subscriptions for the UE).

S1215: The MME/SGSN stores the received parameters.

In a subsequent RAU/TAU procedure, the MME/SGSN allocates, to the UE as the periodic RAU/TAU timer, the subscribed periodic update timer that is of the UE and that is stored in S1204. Alternatively, if the insert subscriber data request message #2 carries the updated duration of the subscribed periodic update timer of the UE, the updated duration of the subscribed periodic update timer of the UE is allocated to the UE and used as duration of the periodic RAU/TAU timer. If the insert subscriber data request message #2 further carries the duration of the first timer, the duration of the first timer is used as the duration of the first timer of the MME/SGSN.

If the event type #1 is loss of connectivity, the MME/SGSN starts to monitor whether the first timer or the mobile reachable timer that is associated with the event type #1 expires. If the event type #1 is UE reachability, the MME/SGSN starts to monitor whether the UE enters a connected mode. If the MRT #2 is provided, the MME/SGSN provides the MRT #2 to the UE, and the UE determines, based on the MRT #2, a time in which a state of being reachable for paging is kept. If the SNPD #2 is provided, the MME/SGSN provides the SNPD #2 to the S-GW, and the S-GW buffers data based on the SNPD #2.

S1216: The MME/SGSN sends an insert subscriber data answer message #2 to the HSS. Correspondingly, the HSS receives the insert subscriber data answer message #2 sent by the MME/SGSN.

The subscriber data answer message #2 carries acceptance indication information #2A, and the acceptance indication information #2A is used to indicate that the MME/SGSN accepts a request for the second network parameter configuration.

S1217: The HSS sends a network parameter configuration answer message #2B to the SCEF 2. Correspondingly, the SCEF 2 receives the network parameter configuration answer message #2B sent by the HSS.

The monitoring request answer message #2B carries the SCEF reference identifier #2 and acceptance indication information #2B, and the acceptance indication information #2B is used to indicate that the HSS accepts the request for the second network parameter configuration.

S1218: The SCEF 2 sends a network parameter configuration answer message #2A to the SCS/AS 2. Correspondingly, the SCS/AS 2 receives the network parameter configuration answer message #2A sent by the SCEF 2.

The monitoring request answer message #2A carries the TLTRI #2 and acceptance indication information #2A, and the acceptance indication information #2A is used to indicate that the SCEF 2 accepts the request for the second network parameter configuration.

In conclusion, according to the communication method in this embodiment of this application, when accepting a new network parameter configuration request, the HSS does not cancel an existing network parameter configuration request, but accepts a plurality of network parameter configuration requests at the same time. This can improve system performance.

It should be understood that the SCS/AS 1 and the SCS/AS 2 shown in FIG. 12A, FIG. 12B, and FIG. 12C may be a same SCS/AS, and the SCEF 1 and the SCEF 2 may also be a same SCEF. This is not limited in this embodiment of this application.

It should be understood that, for a part that is not described in detail in S1201 to S1212, refer to the other approaches. Details are not described herein.

Figure 13A:
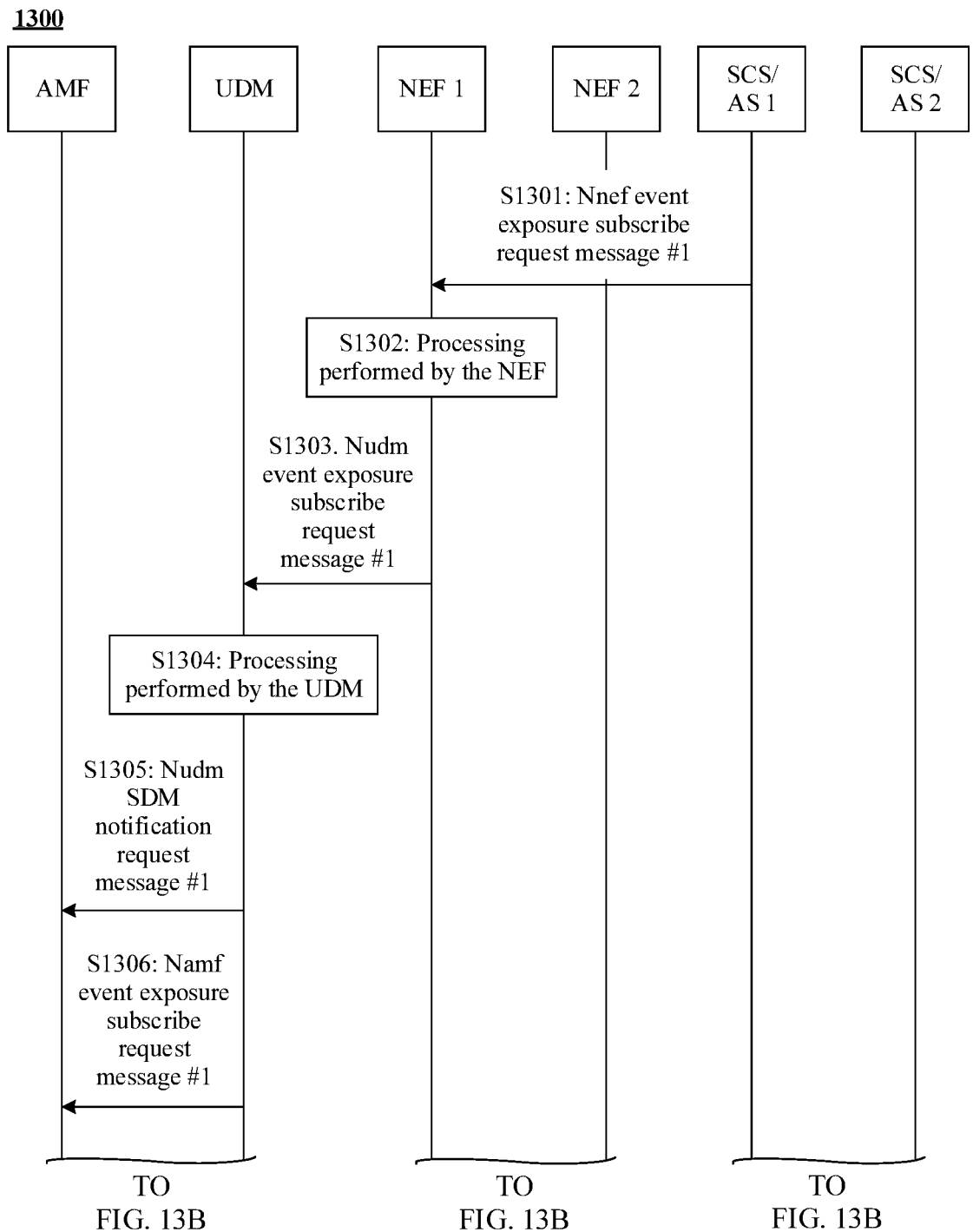
FIG. 13A, FIG. 13B, and FIG. 13C are an example flowchart of a communication method according to another embodiment of this application.
Figure 13B:
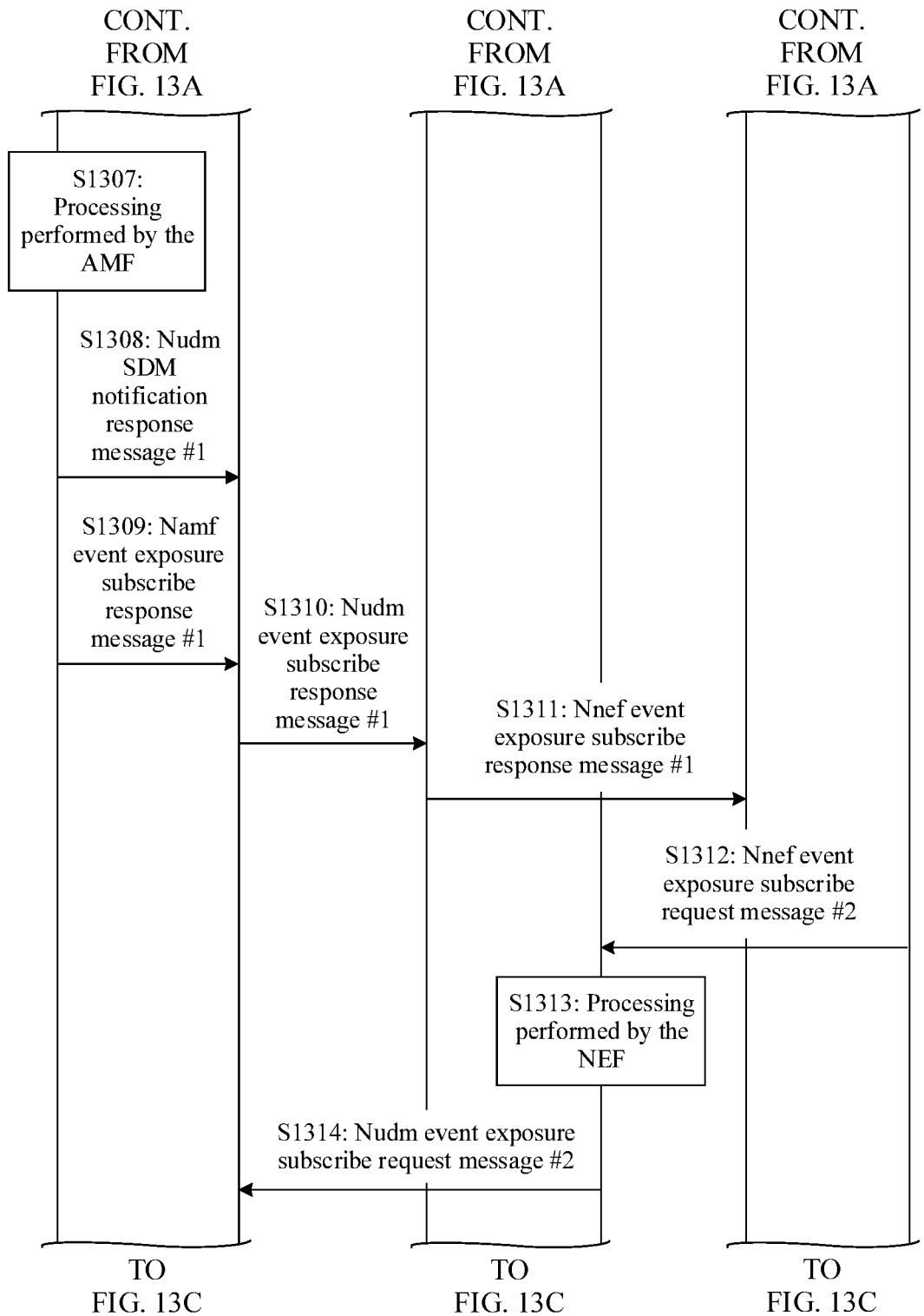
Figure 13C:
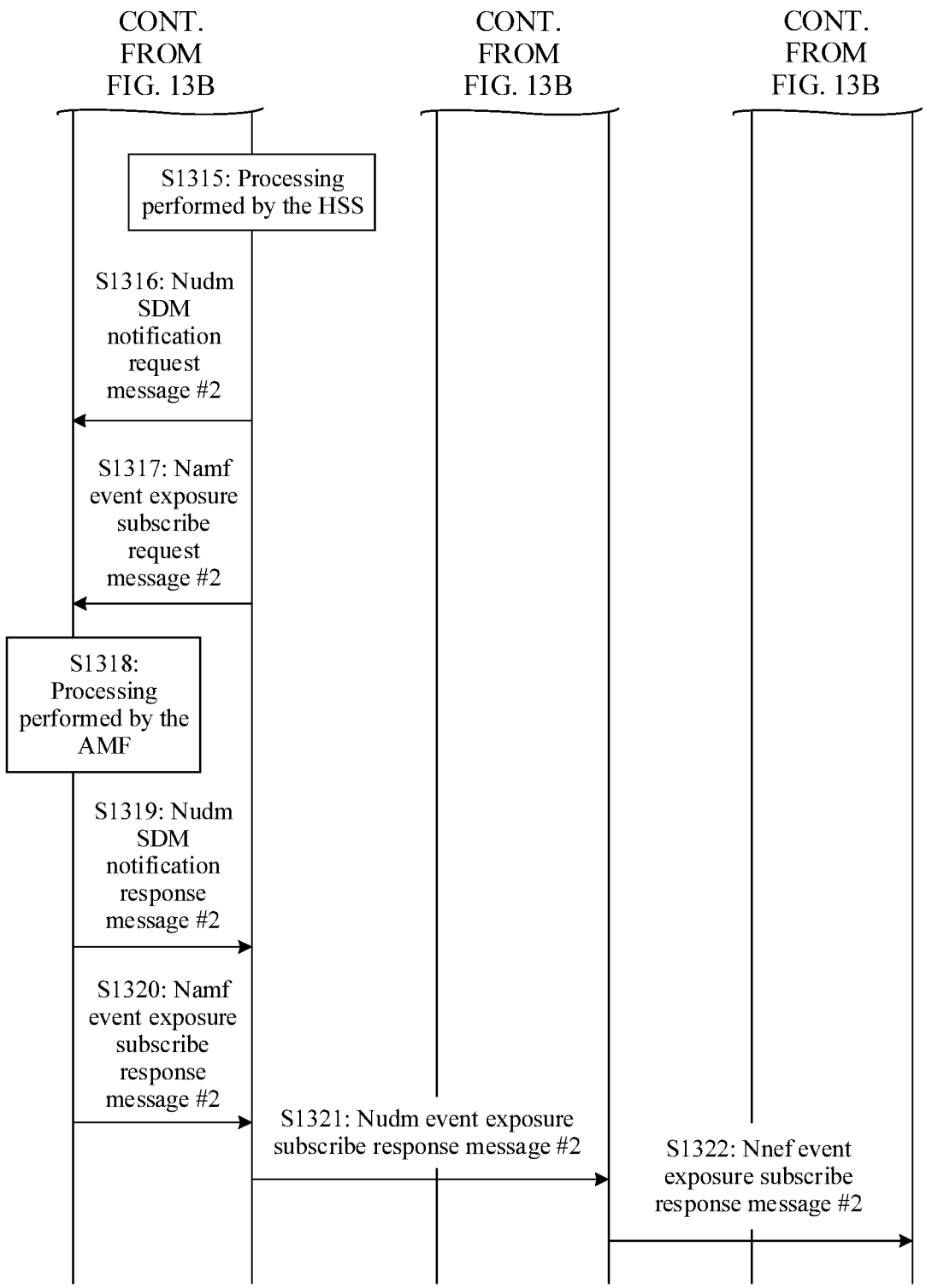

FIG. 13A, FIG. 13B, and FIG. 13C are an example flowchart of a communication method according to another embodiment of this application. The embodiment shown in FIG. 13A, FIG. 13B, and FIG. 13C may be applied to the system or the architecture diagram shown in FIG. 2 or FIG. 4. It should be understood that FIG. 13A, FIG. 13B, and FIG. 13C show detailed steps or operations of the method 1300. However, these steps or operations are merely an example. In this embodiment of this application, another operation may be further performed or only some of the operations in FIG. 13A, FIG. 13B, and FIG. 13C may be performed.

For S1301 to S1311, refer to the descriptions of the steps S901 to S911 in the method 900 shown in FIG. 9A, FIG. 9B, and FIG. 9C. A difference is that the Nnef event exposure subscribe request message #1 may not carry the event type #1. In this case, the Nnef event exposure subscribe request message #1 is used only for a network parameter configuration request (denoted as a first network parameter configuration request herein), and is not used for event subscription. If the Nnef event exposure subscribe request message #1 does not carry the event type #1, other corresponding messages do not carry the event type #1, either, and corresponding indication information is used to indicate that the first network parameter configuration request instead of the subscription to the first event is accepted.

It should be understood that the Nnef event exposure subscribe request message #1 may also carry the event type #1.

It should be understood that, in this case, the Nudm event exposure subscribe request message #1 in S1303 corresponds to the first message in the communication method in this application implemented by the system 100 described above.

S1312: An SCS/AS 2 sends an Nnef event exposure subscribe request message #2 to an NEF 2 at a time point. Correspondingly, the NEF 2 receives the Nnef event exposure subscribe request message #2 sent by the SCS/AS 2.

The Nnef event exposure subscribe request message #2 is used for a second network parameter configuration request. The Nnef event exposure subscribe request message #2 carries an SCS/AS identifier #2. When network parameter configuration is performed for single UE, the Nnef event exposure subscribe request message #2 further carries an external identifier or an MSISDN. When network parameter configuration is performed for a group of UEs, the Nnef event exposure subscribe request message #2 further carries an external group identifier. The UE indicated by the external identifier or the MSISDN herein is the same UE as the UE in S1301. The subscriber group indicated by the external group identifier herein is the same subscriber group as the subscriber group in S1301.

The Nnef event exposure subscribe request message #2 may further carry a maximum latency that is denoted as ML #2 herein. In addition, the Nnef event exposure subscribe request message #2 may further carry one or more of the following parameters: a maximum response time, which is denoted as MRT #2 herein, and a suggested quantity of downlink packets, which is denoted as SNDP #2 herein.

S1313: The NEF 2 stores the SCS/AS identifier #2 and the ML #2, and allocates an NEF reference identifier #2. The NEF 2 authorizes the configuration request according to a local policy.

Further, for S1313, refer to the other approaches. Details are not described herein.

S1314: The NEF 2 sends an Nudm event exposure subscribe request message #2 to the UDM. Correspondingly, the UDM receives the Nudm event exposure subscribe request message #2 sent by the NEF 2.

It should be understood that the Nudm event exposure subscribe request message #2 corresponds to the second message in the communication method in this application implemented by the system 100 described above.

The Nudm event exposure subscribe request message #2 carries the external identifier or the MSISDN or the external group identifier, an NEF 2 identifier, the NEF reference identifier #2, and the ML #2. In addition, the Nudm event exposure subscribe request message #2 may further carry the optional parameters in S1312.

S1315: The UDM performs related processing based on the parameters in the Nudm event exposure subscribe request message #2 and the Nudm event exposure subscribe request message #1.

The UDM compares a time parameter (that is, the ML #2) carried in the Nudm event exposure subscribe request message #2 with a value of the duration that is of the subscribed periodic update timer of the UE and that is in the Nudm SDM notification request message #1 sent to the AMF in the step S1305, determines whether the subscribed periodic update timer of the UE needs to be reset, and if the subscribed periodic update timer of the UE needs to be reset, determines updated duration of the subscribed periodic update timer of the UE. In addition, whether a timer (that is, a first timer) newly added to the AMF needs to be set may be further determined based on the event type #1. If the first timer needs to be set, duration of the first timer is determined. If the duration of the subscribed periodic update timer of the UE is set based on the MDT #1 in the step S1304, and the value of the duration of the subscribed periodic update timer of the UE is obtained by subtracting the fixed value from the MDT #1, the MDT #2 may be compared with the duration of the subscribed periodic update timer of the UE plus the fixed value. Moreover, the duration of the first timer may also be calculated based on the duration of the subscribed periodic update timer of the UE plus the fixed value. If the HSS needs to determine the updated duration of the subscribed periodic update timer of the UE based on the MDT #2, the updated duration of the subscribed periodic update timer of the UE is equal to the MDT #2, or is slightly less than the MDT #2 (that is, the updated duration of the subscribed periodic update timer of the UE is obtained by subtracting the fixed value (for example, 4 minutes) from the MDT #2). Further, refer to the foregoing descriptions of related content. Details are not described herein again.

If the ML #2 is less than the duration that is of the subscribed periodic update timer of the UE and that is set in S1305, the UDM determines the updated duration of the subscribed periodic update timer of the UE based on the ML #2, where the updated duration of the subscribed periodic update timer of the UE is used to update the duration of the subscribed periodic update timer of the UE.

Further, if the event type #1 is the UE loss of connectivity event, the UDM further determines the duration of the first timer based on the ML #2 and/or the duration that is of the subscribed periodic update timer of the UE and that is set in S1205. The duration of the first timer is associated with the first event.

Further, for S1315, refer to the foregoing related descriptions of performing, by the user data management network element, the communication method provided in this application. Details are not described herein again.

S1316: The UDM sends an Nudm SDM notification request message #2 to the AMF for each UE (the UDM stores the correspondence between the external identifier and the subscriber identifier) or each group member UE (the UDM stores the correspondence between the external group identifier and the subscriber identifier of each group member). Correspondingly, the AMF receives the Nudm SDM notification request message #2 sent by the UDM.

If the Nudm event exposure subscribe request message #2 is for the group of UEs, the Nudm SDM notification request message #2 carries an external identifier or an MSISDN, and the UDM sends the Nudm SDM notification request message #2 to all AMFs serving the group. In addition, if the subscribed periodic update timer of the UE needs to be reset, the Nudm SDM notification request message #2 further carries the updated duration of the subscribed periodic update timer of the UE. If the first timer of the AMF needs to be set, the Nudm SDM notification request message #2 further carries the duration of the first timer.

In addition, if the Nudm event exposure subscribe request message #2 further provides the MRT #2, and MRT #2>MRT #1, the Nudm SDM notification request message #2 further carries the MRT #2 (the MRT #2 is a maximum value in MRTs carried in all event subscriptions for the UE). If the Nudm event exposure subscribe request message #2 further provides the SNPD #2, and SNPD #2>SNPD #1, the Nudm SDM notification request message #2 may further carry the SNPD #2 (the MAT #2 is a maximum value in SNPDs carried in all the event subscriptions for the UE).

S1317: The UDM sends an Namf event exposure subscribe request (Namf_EventExposure_Subscribe Request) message #2 to the AMF for the UE or each group member UE. Correspondingly, the AMF receives the Namf event exposure subscribe request message #2 sent by the UDM.

The Namf event exposure subscribe request message #2 carries an event type #2, the NEF 2 identifier, and the NEF reference identifier #2.

S1318: The AMF stores the received parameters.

In a subsequent registration area update procedure, the AMF allocates, to the UE as the periodic registration area update timer, the subscribed periodic update timer that is of the UE and that is stored in S1304. Alternatively, if the Nudm SDM notification request message #2 carries the updated duration of the subscribed periodic update timer of the UE, the updated duration of the subscribed periodic update timer of the UE is allocated to the UE and used as duration of the periodic registration area update timer. If the Nudm SDM notification request message #2 carries the duration of the first timer, the duration of the first timer is used as the duration of the first timer of the AMF.

If the event type #1 is loss of connectivity, the AMF starts to monitor whether the first timer associated with the event type #1 expires. If the event type #1 is UE reachability, the AMF starts to monitor whether the UE enters the connected mode. If the MRT #2 is provided, the AMF provides the MRT #2 to the UE, and the UE determines, based on the MRT #2, a time in which a state of being reachable for paging is kept. If the AMF provides the SNPD #2 to the SMF, the SMF buffers data based on the SNPD #2 (the data is buffered in the SMF), or sends the SNPD #2 to the UPF, where the UPF buffers data based on the SNPD #2 (the data is buffered in the UPF).

S1319: The AMF sends an Nudm SDM notification response message #1 to the UDM. Correspondingly, the UDM receives the Nudm SDM notification response message #1 sent by the AMF.

The Nudm SDM notification response message #1 carries acceptance indication information #2A, and the acceptance indication information #2A is used to indicate that the AMF accepts data insertion.

S1320: The AMF allocates an AMF subscription identifier #2, and returns an Namf event exposure subscribe response message #2 to the UDM. Correspondingly, the UDM receives the Namf event exposure subscribe response message #2 sent by the AMF.

The Namf event exposure subscribe response message #2 carries the AMF subscription identifier #2 and acceptance indication information #2B, and the acceptance indication information 2B is used to indicate that the AMF accepts the second network parameter configuration request.

S1321: The UDM allocates a UDM subscription identifier #2, and stores a correspondence between the AMF subscription identifier #2 and the UDM subscription identifier #2. The UDM sends an Nudm event exposure subscribe response message #2 to the NEF 2. Correspondingly, the NEF 2 receives the Nudm event exposure subscribe response message #2 sent by the UDM.

The Nudm event exposure subscribe response message #2 carries the UDM subscription identifier #2 and acceptance indication information #2C, and the acceptance indication information #2C is used to indicate that the UDM accepts the second network parameter configuration request.

S1322: The NEF 2 allocates an NEF 2 subscription identifier, and stores a correspondence between the UDM subscription identifier #2 and the NEF 2 subscription identifier. The NEF 2 sends an Nnef event exposure subscribe response message #2 to the SCS/AS 2. Correspondingly, the SCS/AS 2 receives the Nnef event exposure subscribe response message #2 sent by the NEF 2.

The Nnef event exposure subscribe response message #2 carries the NEF 2 subscription identifier and acceptance indication information #2D, and the acceptance indication information #2D is used to indicate that the NEF accepts the second network parameter configuration request.

In conclusion, according to the communication method in this embodiment of this application, when accepting a new network parameter configuration request, the UDM does not cancel an existing network parameter configuration request, but accepts a plurality of network parameter configuration requests at the same time. This can improve system performance.

It should be understood that the SCS/AS 1 and the SCS/AS 2 shown in FIG. 13A, FIG. 13B, and FIG. 13C may be a same SCS/AS, and the NEF 1 and the NEF 2 may also be a same NEF. This is not limited in this embodiment of this application.

It should be understood that, for a part that is not described in detail in S1301 to S1314, refer to the other approaches. Details are not described herein.

The following separately describes in detail another event subscription method in an embodiment of the present disclosure with reference to the architecture diagrams shown in FIG. 3 and FIG. 4.

Figure 14A:
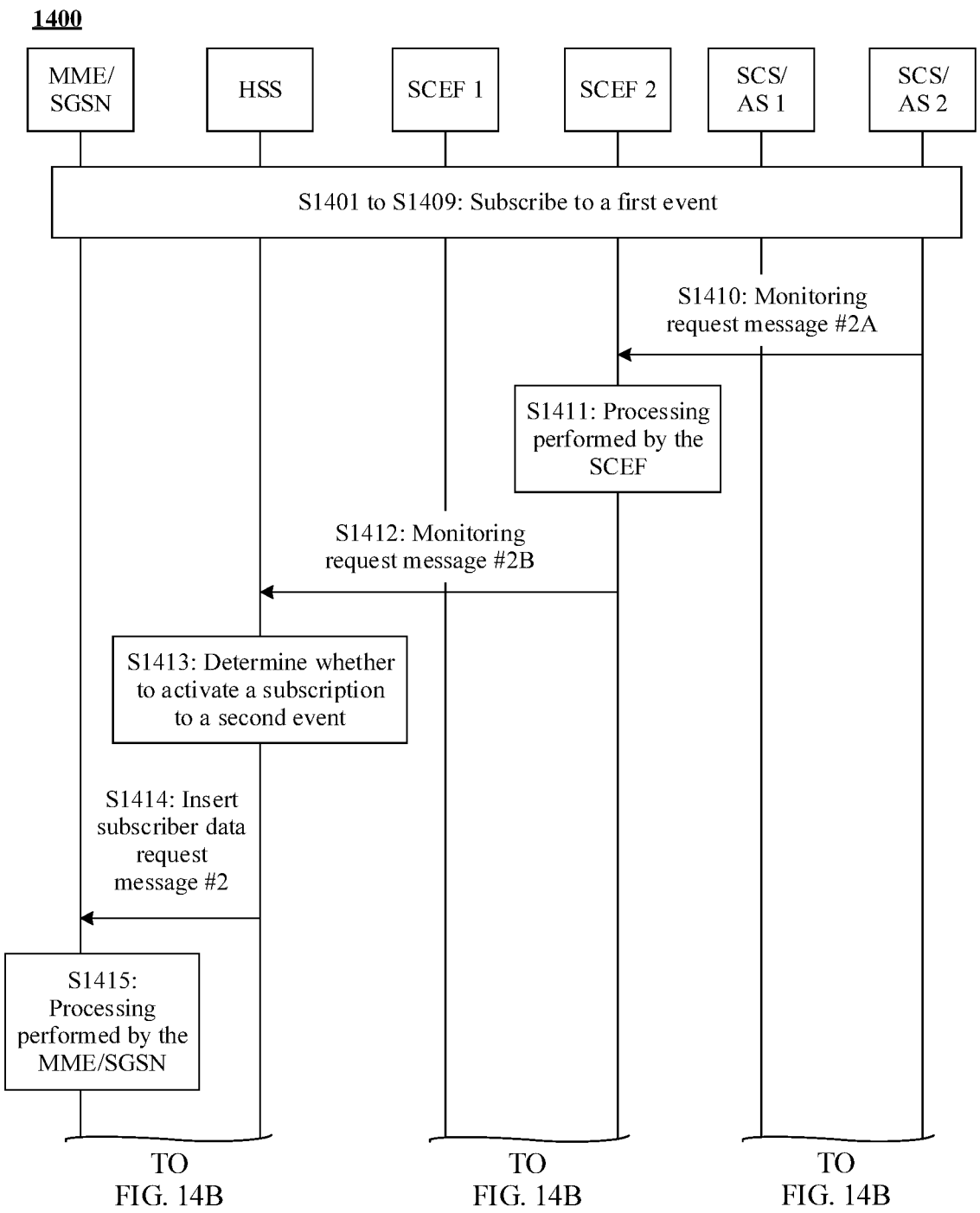
FIG. 14A and FIG. 14B are an example flowchart of an event subscription method according to an embodiment of this application.
Figure 14B:
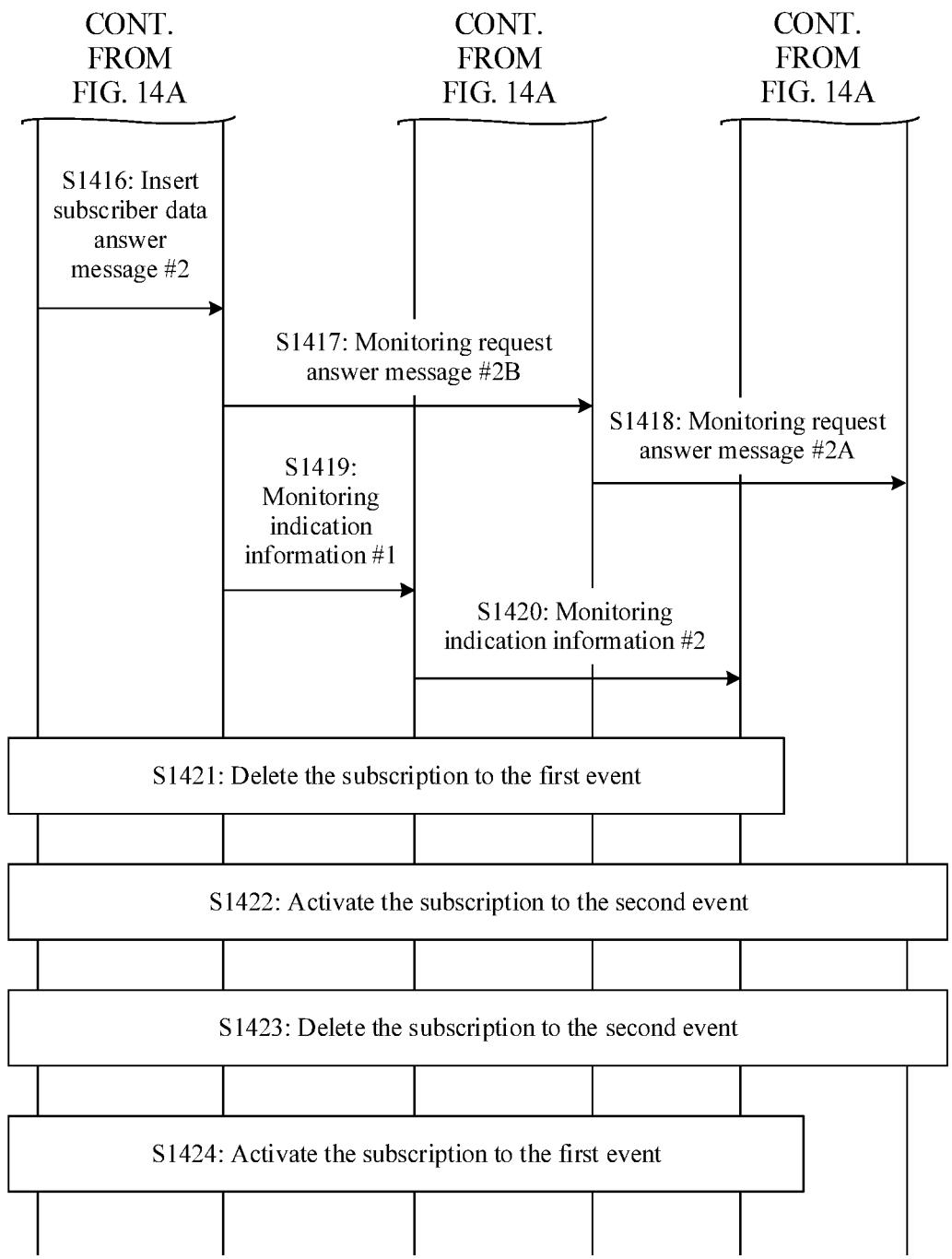

FIG. 14A and FIG. 14B are an example flowchart of an event subscription method according to an embodiment of this application. The embodiment shown in FIG. 14A and FIG. 14B may be applied to the system or the architecture diagram shown in FIG. 1 or FIG. 3. It should be understood that FIG. 14A and FIG. 14B show detailed steps or operations of the method 1400. However, these steps or operations are merely an example. In this embodiment of this application, another operation may be further performed or only some of the operations in FIG. 14A and FIG. 14B may be performed. The method described in FIG. 14A and FIG. 14B may correspond to the foregoing another event subscription method implemented by the system 100 in this application. Moreover, in FIG. 14A and FIG. 14B, a subscription to a first event and a subscription to a second event respectively correspond to the subscription to the second event and the subscription to the first event in the foregoing another event subscription method implemented by the system in this application, and an SCEF 1 and an SCEF 2 respectively correspond to the second capability exposure function network element and the first capability exposure network element in the foregoing another event subscription method implemented by the system in this application.

S1401 to S1412: After accepting, from an SCS/AS 1, a subscription request for the first event, an HSS receives, from an SCS/AS 2, a subscription request for the second event. It should be understood that an event subscription request may also be referred to as an event monitoring request.

Further, the steps S1401 to S1412 are the same as the steps S601 to S612 in the method 600. For details, refer to the descriptions of the steps S601 to S612 in the method 600. For brevity, details are not described herein again.

It should be understood that the monitoring request message #2B in S1412 corresponds to the first message sent by the first capability exposure function network element in the system 200 described above.

S1413: The HSS determines whether to activate the subscription to the second event.

For example, the HSS may determine whether to activate the subscription to the second event, based on an operator's policy, priorities of the subscription to the second event and the subscription to the first event, or an operator's policy and priorities of the subscription to the second event and the subscription to the first event. If the HSS determines to activate the subscription to the second event, the HSS suspends or deactivates the subscription to the first event.

In S1413, if the HSS determines to activate the subscription to the second event, related network elements may perform steps S1414 to S1418. If the HSS determines not to activate the subscription to the second event, steps S1414 to S1416 are skipped.

S1414: The HSS sends an insert subscriber data request message #2 to the MME/SGSN for each UE (the HSS stores the correspondence between the external identifier and the subscriber identifier) or each group member UE (the HSS stores the correspondence between the external group identifier and the subscriber identifier of each group member). Correspondingly, the MME/SGSN receives the insert subscriber data request message #2 sent by the HSS.

The insert subscriber data request message #2 carries the event type #2, the subscribed periodic update timer of the UE (or the duration of the subscribed periodic update timer of the UE), the SCEF 2 identifier, and the SCEF reference identifier #2.

If the monitoring request message #2B is for the group of UEs, the insert subscriber data request message #2 carries an external identifier or an MSISDN, and the HSS sends the insert subscriber data request message #2 to all MMEs/SGSNs serving the group.

In addition, if the event type #2 is UE reachability, and the monitoring request message #2B further provides the MRT #2 and/or the SNPD #2, the insert subscriber data request message #2 may further carry the MRT #2 and/or the SNPD #2.

S1415: The MME/SGSN stores the received parameters. In a subsequent RAU/TAU procedure, the MME/SGSN allocates the received subscribed periodic update timer of the UE to the UE as the periodic RAU/TAU timer. If the event type #2 is loss of connectivity, the MME/SGSN starts to monitor whether the mobile reachable timer expires. The mobile reachable timer is set based on the subscribed periodic update timer of the UE. If the event type #2 is UE reachability, the MME/SGSN starts to monitor whether the UE enters a connected mode. If the MRT #2 is provided, the MME/SGSN provides the MRT #2 to the UE, and the UE determines, based on the MRT #2, a time in which a state of being reachable for paging is kept. If the SNPD #2 is provided, the MME/SGSN provides the SNPD #2 to the S-GW, and the S-GW buffers data based on the SNPD #2.

S1416: The MME/SGSN sends an insert subscriber data answer message #2 to the HSS. Correspondingly, the HSS receives the insert subscriber data answer message #2 sent by the MME/SGSN.

The subscriber data answer message #2 carries activation indication information, and the activation indication information is used to indicate that the MME/SGSN accepts the subscription to the second event.

S1417: The HSS sends a monitoring request answer message #2B to the SCEF 2. Correspondingly, the SCEF 2 receives the monitoring request answer message #2B sent by the HSS.

If the HSS determines to activate the subscription to the second event in the step S1413, the monitoring request answer message #2B carries the SCEF reference identifier #2 and an activation indication. It should be understood that the monitoring request answer message #2B in this case corresponds to the foregoing first activation indication information.

If the HSS determines not to activate the subscription to the second event in the step S1413, the monitoring request answer message #2B carries the SCEF reference identifier #2 and a suspension/non-activation indication. It should be understood that the monitoring request answer message #2B in this case corresponds to the foregoing first non-activation indication information.

S1418: The SCEF 2 sends a monitoring request answer message #2A to the SCS/AS 2. Correspondingly, the SCS/AS 2 receives the monitoring request answer message #2A sent by the SCEF 2.

Based on the information in the monitoring request answer message #2B in S1417, the monitoring request answer message #2A carries the TLTRI #2, and the activation indication or the suspension/non-activation indication.

S1419: If the HSS determines to activate the subscription to the second event in the step S1413, the HSS sends monitoring indication information #1 to the SCEF 1. Correspondingly, the SCEF 1 receives the monitoring indication information #1 sent by the HSS.

The monitoring indication information #1 carries the SCEF reference identifier #1 and a suspension/deactivation indication. That is, if the HSS determines to activate the subscription to the second event in the step S1413, the HSS deactivates the subscription to the first event.

It should be understood that the monitoring indication information #1 may correspond to the foregoing first deactivation indication information.

S1420: The SCEF 1 sends monitoring indication information #2 to the SCS/AS 1. Correspondingly, the SCS/AS 1 receives the monitoring indication information #2 sent by the SCEF 1.

The monitoring indication information #2 carries the TLTRI #1 and the suspension/deactivation indication.

It should be understood that S1419 may be performed before S1414 or S1417, may be performed after S1414 or S1417, or may be simultaneously performed with S1414 or S1417. This is not limited in this embodiment of this application.

If the HSS determines not to activate the subscription to the second event in the step S1413, the method 1400 may further include steps S1421 and S1422.

S1421: When the SCS/AS 1 determines to delete the subscription to the first event, related network elements perform event subscription deletion operations. Details are as follows.

(1) The SCS/AS 1 sends monitoring deletion indication information #1A to the SCEF 1. Correspondingly, the SCEF 1 receives the monitoring deletion indication information #1A sent by the SCS/AS 1.

The monitoring deletion indication information #1A is used to indicate the SCEF 1 to delete the subscription to the first event, and the monitoring deletion indication information #1A includes the TLTRI #1.

(2) The SCEF 1 sends monitoring deletion indication information #1B to the HSS. Correspondingly, the HSS receives the monitoring deletion indication information #1B sent by the SCEF 1.

The monitoring deletion indication information #1B is used to indicate the HSS to delete the subscription to the first event, and the monitoring deletion indication information #1A includes the SCEF reference identifier #1.

It should be understood that the monitoring deletion indication information #1B corresponds to the foregoing event subscription deletion request message.

(3) The HSS deletes related parameters (that is, the parameters included in the monitoring request message #1B in the step S1403) of the subscription to the first event, and sets the subscribed RAU/TAU timer of the UE based on a parameter (that is, the MDT #2 or the ML #2 received in the step 1412) of the subscription to the second event.

S1422: Related network elements execute a procedure of activating the subscription to the second event.

Further, refer to the descriptions of the steps S1414 to S1418. Details are not described herein again.

S1423: When the SCS/AS 2 determines to delete the subscription to the second event, related network elements perform event subscription deletion operations. Details are as follows.

(1) The SCS/AS 2 sends monitoring deletion indication information #2A to the SCEF 2. Correspondingly, the SCEF 2 receives the monitoring deletion indication information #2A sent by the SCS/AS 2.

The monitoring deletion indication information #2A is used to indicate the SCEF 2 to delete the subscription to the second event, and the monitoring deletion indication information #2A includes the TLTRI #2.

(2) The SCEF 2 sends monitoring deletion indication information #2B to the HSS. Correspondingly, the HSS receives the monitoring deletion indication information #2B sent by the SCEF 2.

The monitoring deletion indication information #2B is used to indicate the HSS to delete the subscription to the second event, and the monitoring deletion indication information #2A includes the SCEF reference identifier #2.

It should be understood that the monitoring deletion indication information #2B corresponds to the foregoing another event subscription deletion request message.

(3) The HSS deletes related parameters (that is, the parameters included in the monitoring request message #2B in the step S1412) of the subscription to the second event, and sets the subscribed RAU/TAU timer of the UE based on a parameter (that is, the MDT #1 or the ML #1 received in the step S1403) of the subscription to the first event.

S1424: Related network elements execute a procedure of activating the subscription to the first event.

Further, refer to the descriptions of the steps S1405 to S1409. Details are not described herein again.

In conclusion, according to the event subscription method in this embodiment of this application, the HSS does not simply reject or accept a new event subscription request, or cancel an existing event subscription request. When the HSS receives a plurality of event subscription requests, only one event subscription request is activated or only one event subscription request remains effective, and other ineffective event subscription requests are not canceled. After an effective event subscription request is deleted, the HSS activates an ineffective event subscription request.

Figure 15A:
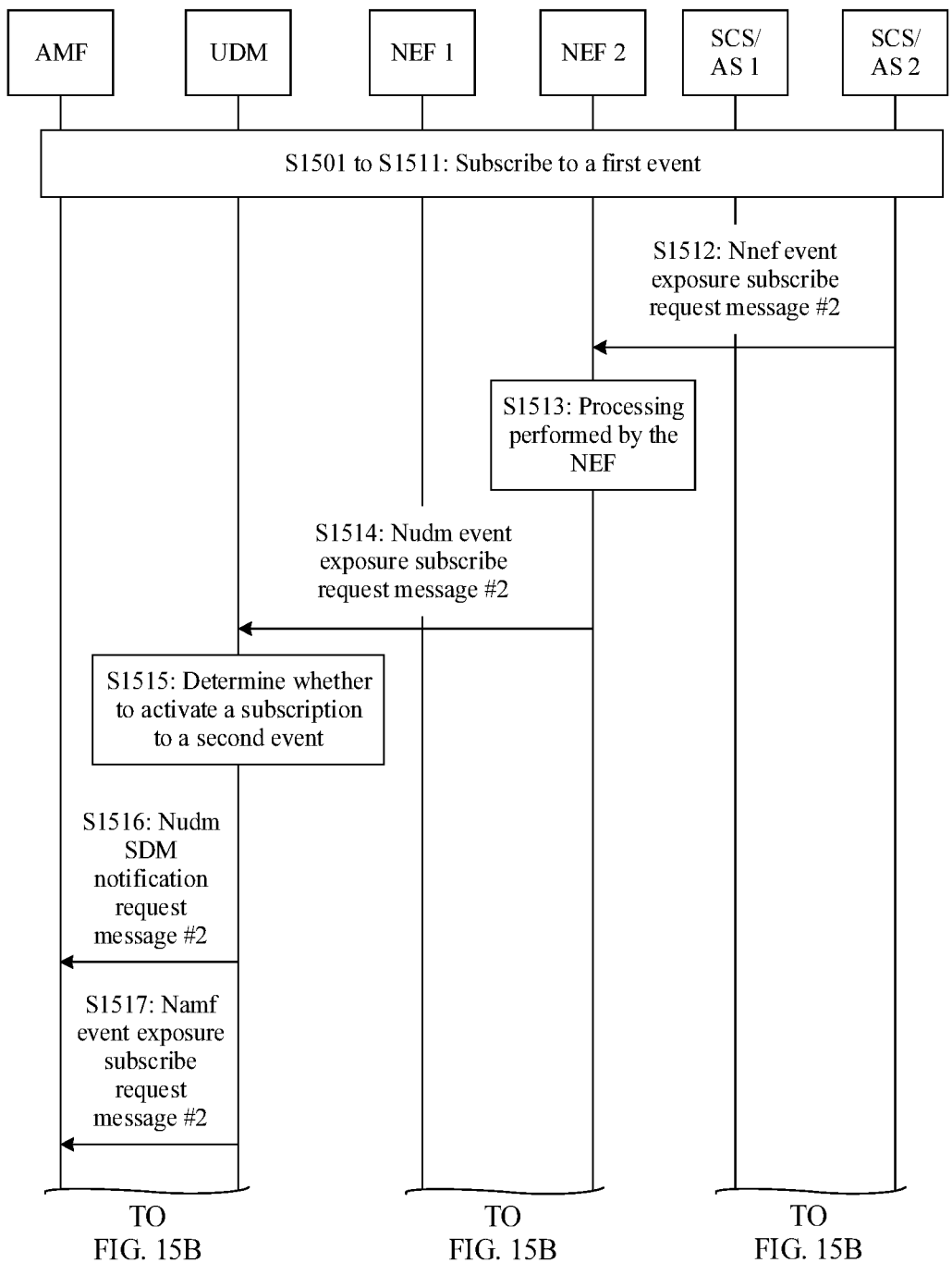
FIG. 15A and FIG. 15B are an example flowchart of an event subscription method according to an embodiment of this application.
Figure 15B:
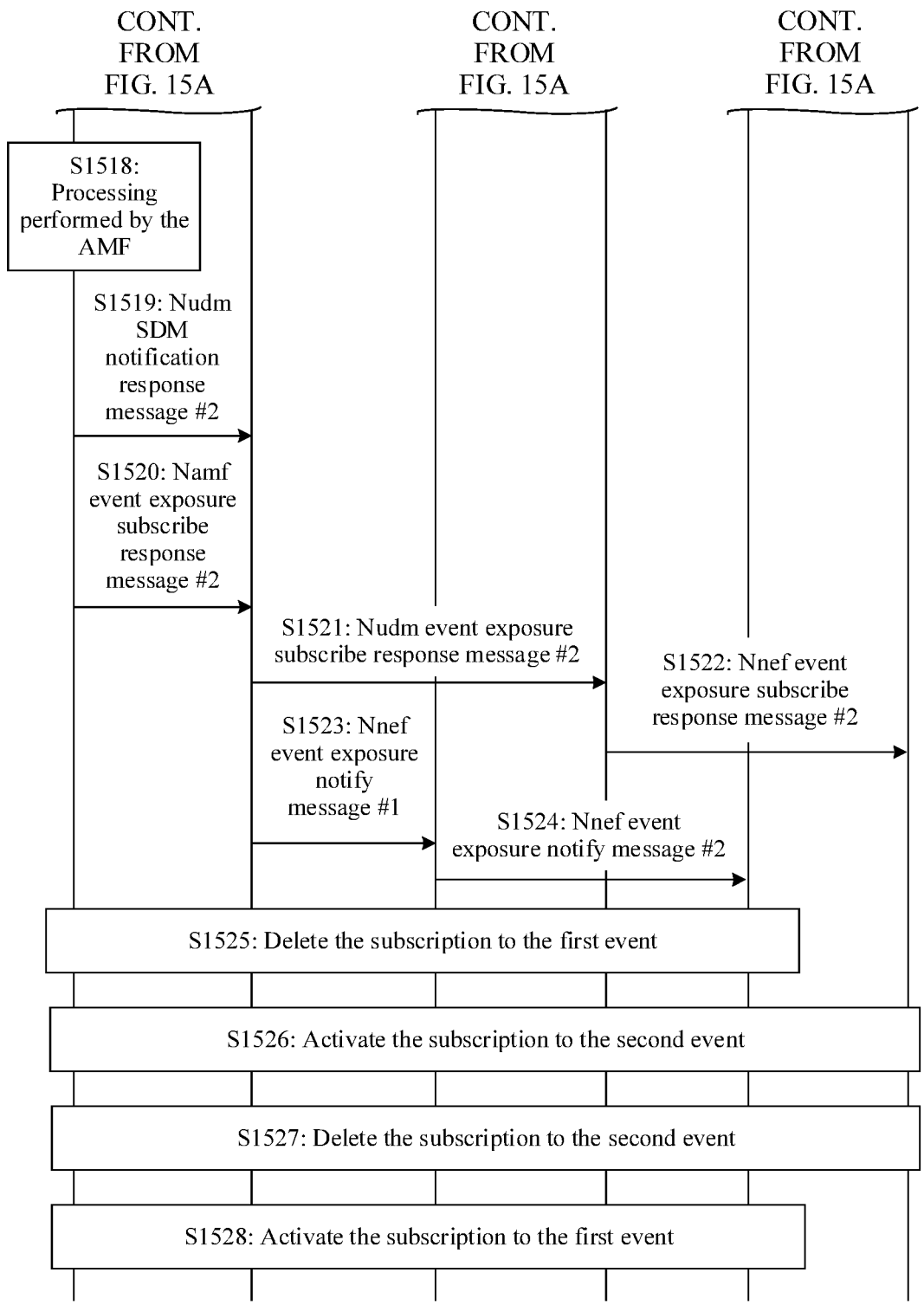

FIG. 15A and FIG. 15B are an example flowchart of an event subscription method according to an embodiment of this application. The embodiment shown in FIG. 15A and FIG. 15B may be applied to the system or the architecture diagram shown in FIG. 2 or FIG. 4. It should be understood that FIG. 15A and FIG. 15B show detailed steps or operations of the method 1500. However, these steps or operations are merely an example. In this embodiment of this application, another operation may be further performed or only some of the operations in FIG. 15A and FIG. 15B may be performed. The method described in FIG. 15A and FIG. 15B may correspond to the foregoing another event subscription method implemented by the system 100 in this application. Moreover, in FIG. 15A and FIG. 15B, a subscription to a first event and a subscription to a second event respectively correspond to the subscription to the second event and the subscription to the first event in the foregoing another event subscription method implemented by the system in this application, and an NEF 1 and an NEF 2 respectively correspond to the second capability exposure function network element and the first capability exposure network element in the foregoing another event subscription method implemented by the system in this application.

S1501 to S1514: After accepting, from an SCS/AS 1, a subscription request for the first event, a UDM receives, from an SCS/AS 2, a subscription request for the second event. It should be understood that an event subscription request may also be referred to as an event exposure subscription request.

Further, for the steps S1501 to S1514, refer to the foregoing descriptions of the steps S901 to S914 in the method 900. For brevity, details are not described herein again.

It should be understood that the Nudm event exposure subscribe request message #2 in S1412 corresponds to the first message sent by the first capability exposure function network element in the system 200 described above.

S1515: The UDM determines whether to activate the subscription to the second event.

For example, the UDM may determine whether to activate the subscription to the second event, based on an operator's policy, priorities of the subscription to the second event and the subscription to the first event, or an operator's policy and priorities of the subscription to the second event and the subscription to the first event. If the UDM determines to activate the subscription to the second event, the UDM suspends or deactivates the subscription to the first event.

In S1515, if the UDM determines to activate the subscription to the second event, related network elements may perform steps S1516 to S1524. If the UDM determines not to activate the subscription to the second event, steps S1516 to S1520 are skipped.

S1516: The UDM sends an Nudm SDM notification request message #2 to the AMF for the UE or each group member UE. Correspondingly, the AMF receives the Nudm SDM notification request message #2 sent by the UDM.

The Nudm SDM notification request message #2 carries the subscribed periodic update timer of the UE or the duration of the subscribed periodic update timer of the UE. Herein, the subscribed periodic update timer of the UE is the periodic registration area (Registration Area) update timer. If the Nudm SDM notification request message #2 is for the group of UEs, the Nudm SDM notification request message #2 carries an external identifier or an MSISDN, and the UDM sends the Nudm SDM notification request message #2 to all AMFs serving the group.

In addition, if the event type #2 is UE reachability, the Nudm SDM notification request message #2 may further carry the MRT #2 (if provided) and the SNPD #2 (if provided).

S1517: The UDM sends an Namf event exposure subscribe request message #2 to the AMF for the UE or each group member UE. Correspondingly, the AMF receives the Namf event exposure subscribe request message #2 sent by the UDM.

The Namf event exposure subscribe request message #2 carries the event type #2, the NEF 2 identifier, and the NEF reference identifier #2.

S1518: The AMF stores the received parameters. In a subsequent registration area update procedure, the AMF allocates the received subscribed periodic update timer of the UE to the UE as the periodic registration area update timer.

If the event type #2 is loss of connectivity, the AMF starts to monitor whether the mobile reachable timer expires. The mobile reachable timer is set based on the subscribed periodic update timer of the UE (the duration of the mobile reachable timer is usually greater than that of the subscribed periodic update timer of the UE).

If the event type #2 is UE reachability, the AMF starts to monitor whether the UE enters the connected mode. If the MRT #2 is provided, the AMF provides the MRT #2 to the UE, and the UE determines, based on the MRT #2, a time in which a state of being reachable for paging is kept.

If the SNPD #2 is provided, the AMF provides the SNPD #2 to the SMF. If the SMF receives the SNPD #2, the SMF buffers data based on the SNPD #2 (the data is buffered in the SMF), or sends the SNPD #2 to the UPF, where the UPF buffers data based on the SNPD #2 (the data is buffered in the UPF).

S1519: The AMF sends an Nudm SDM notification response message #2 to the UDM. Correspondingly, the UDM receives the Nudm SDM notification response message #2 sent by the AMF.

The Nudm SDM notification response message #2 carries acceptance indication information #2A, and the acceptance indication information #2A is used to indicate that the AMF accepts the subscription to the second event.

S1520: The AMF allocates an AMF subscription identifier #2, and returns an Namf event exposure subscribe response message #2 to the UDM. Correspondingly, the UDM receives the Namf event exposure subscribe response message #2 sent by the AMF.

The Namf event exposure subscribe response message #2 carries the AMF subscription identifier #2 and acceptance indication information #2B, and the acceptance indication information 2B is used to indicate that the AMF accepts the subscription to the first event.

S1521: The UDM allocates a UDM subscription identifier #2, and stores a correspondence between the AMF subscription identifier #2 and the UDM subscription identifier #2. The UDM sends an Nudm event exposure subscribe response message #2 to the NEF 2. Correspondingly, the NEF 2 receives the Nudm event exposure subscribe response message #2 sent by the UDM.

The Nudm event exposure subscribe response message #2 carries the UDM subscription identifier #2. If the UDM determines to activate the subscription to the second event in S1515, the Nudm event exposure subscribe response message #2 further carries an activation indication. It should be understood that the Nudm event exposure subscribe response message #2 in this case corresponds to the foregoing first activation indication information.

If the UDM determines not to activate the subscription to the second event in S1515, the Nudm event exposure subscribe response message #2 further carries a non-activation/suspension indication. It should be understood that the Nudm event exposure subscribe response message #2 in this case corresponds to the foregoing first non-activation indication information.

S1522: The NEF 2 allocates an NEF 2 subscription identifier, and stores a correspondence between the UDM subscription identifier #2 and the NEF 2 subscription identifier. The NEF 2 sends an Nnef event exposure subscribe response message #2 to the SCS/AS 2. Correspondingly, the SCS/AS 2 receives the Nnef event exposure subscribe response message #2 sent by the NEF 2.

The Nnef event exposure subscribe response message #2 carries the NEF 2 subscription identifier. If the Nudm event exposure subscribe response message #2 received by the NEF 2 carries the activation indication, the Nnef event exposure subscribe response message #2 carries the activation indication. If the Nudm event exposure subscribe response message #2 received by the NEF 2 carries the non-activation/suspension indication, the Nnef event exposure subscribe response message #2 carries the non-activation/suspension indication.

S1523: If the UDM activates the subscription to the second event and deactivates the subscription to first event in S1515, the UDM sends an Nudm event exposure notify (Nudm_EventExposure_Notify) message #1 to the NEF 1. Correspondingly, the NEF 1 receives the Nudm event exposure notify message #1 sent by the UDM.

The Nudm event exposure notify message #1 carries a UDM reference identifier #1 and a deactivation indication.

It should be understood that the Nudm event exposure notify message #1 may correspond to the foregoing first deactivation indication information.

S1524: The NEF 1 sends an Nnef event exposure notify (Nudm_EventExposure_Notify) message #2 to the SCS/AS 1 based on the received Nudm event exposure notify message #2. Correspondingly, the SCS/AS 1 receives the Nnef event exposure notify message #2 sent by the NEF 1.

The Nnef event exposure notify message #2 carries the NEF 1 reference identifier #1 and the deactivation indication.

It should be understood that S1523 may be performed before S1516 or S1521, may be performed after S1516 or S1521, or may be simultaneously performed with S1516 or S1521. This is not limited in this embodiment of this application.

If the UDM determines not to activate the subscription to the second event in the step S1515, the method 1500 may further include steps S1525 and S1526.

S1525: When the SCS/AS 1 determines to delete the subscription to the first event, related network elements perform event subscription deletion operations. Details are as follows.

(1) The SCS/AS 1 sends an Nnef event exposure unsubscribe request (Nnef_EventExposure_UnSubscribe request) message #1 to the NEF 1. Correspondingly, the NEF 1 receives the Nnef event exposure unsubscribe request message #1 sent by the SCS/AS 1.

The Nnef event exposure unsubscribe request #1 is used to indicate the NEF 1 to delete the subscription to the first event.

(2) The NEF 1 sends an Nudm event exposure unsubscribe request #1 to the UDM. Correspondingly, the UDM receives the Nudm event exposure unsubscribe request #1 sent by the NEF 1.

It should be understood that the Nudm event exposure unsubscribe request #1 corresponds to the foregoing event subscription deletion request message.

(3) The UDM deletes related parameters (that is, the parameters included in the Nudm event exposure subscribe request message #1 in the step S1503) of the subscription to the first event, and sets the subscribed RAU/TAU timer of the UE based on a parameter (that is, the MDT #2 or the ML #2 received in the step 1514) of the subscription to the second event.

S1526 Related network elements execute a procedure of activating the subscription to the second event.

Further, refer to the descriptions of the steps S1516 to S1522. Details are not described herein again.

S1527: When the SCS/AS 2 determines to delete the subscription to the second event, related network elements perform event subscription deletion operations. Details are as follows.

(1) The SCS/AS 2 sends an Nnef event exposure unsubscribe request (Nnef_EventExposure_UnSubscribe request) message #2 to the NEF 2. Correspondingly, the NEF 2 receives the Nnef event exposure unsubscribe request message #2 sent by the SCS/AS 2.

The Nnef event exposure unsubscribe request #2 is used to indicate the NEF 2 to delete the subscription to the first event.

(2) The NEF 2 sends an Nudm event exposure unsubscribe request #2 to the UDM. Correspondingly, the UDM receives the Nudm event exposure unsubscribe request #2 sent by the NEF 2.

It should be understood that the Nudm event exposure unsubscribe request #2 corresponds to the foregoing another event subscription deletion request message.

(3) The UDM deletes related parameters (that is, the parameters included in the Nudm event exposure subscribe request message #2 in the step S1514) of the subscription to the second event, and sets the subscribed RAU/TAU timer of the UE based on a parameter (that is, the MDT #1 or ML #1 received in the step 1503) of the subscription to the first event.

S1528: Related network elements execute a procedure of activating the subscription to the first event.

Further, refer to the descriptions of the steps S1505 to S1511. Details are not described herein again.

In conclusion, according to the event subscription method in this embodiment of this application, the HSS does not simply reject or accept a new event subscription request, or cancel an existing event subscription request. When the HSS receives a plurality of event subscription requests, only one event subscription request is activated or only one event subscription request remains effective, and other ineffective event subscription requests are not canceled. After an effective event subscription request is deleted, the HSS activates an ineffective event subscription request.

The foregoing describes the methods in the embodiments of this application with reference to FIG. 6A and FIG. 6B to FIG. 15A and FIG. 15B. The following describes apparatuses in the embodiments of this application.

Figure 16:
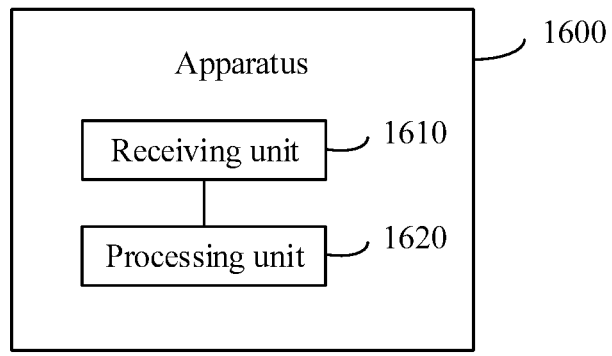
FIG. 16 is a schematic diagram of an apparatus according to this application.

FIG. 16 is a schematic block diagram of an apparatus 1600 according to an embodiment of this application. As shown in FIG. 16, the apparatus 1600 includes a receiving unit 1610 and a processing unit 1620.

The receiving unit 1610 is configured to receive a second message, where the second message is used for subscribing to a second event, the second message includes a second time parameter and a type of the second event, the type of the second event is used to indicate an event type of the second event, and the type of the second event is a loss of connectivity event.

The processing unit 1620 is configured to perform a monitoring management operation on a first event and the second event based on duration of a subscribed periodic update timer of user equipment UE and the second time parameter, or based on at least one of a combination of duration of a subscribed periodic update timer of UE and the second time parameter, and a combination of a type of the first event and the type of the second event, where the type of the first event is used to indicate an event type of the first event, and the duration of the subscribed periodic update timer of the UE is determined based on a subscription to the first event.

Optionally, when performing the monitoring management operation, the processing unit 1620 is further configured to if the second time parameter is greater than the duration of the subscribed periodic update timer of the UE, determine duration of a first timer, and send event parameter information to a mobility management function network element, where the event parameter information includes the duration of the first timer and the type of the second event, and the duration of the first timer is associated with the type of the second event, or the duration of the first timer is used for subscribing to the second event.

Optionally, when performing the monitoring management operation, the processing unit 1620 is further configured to if the second time parameter is equal to the duration of the subscribed periodic update timer of the UE, send event parameter information, where the event parameter information includes the type of the second event.

Optionally, when performing the monitoring management operation, the processing unit 1620 is further configured to if the second time parameter is less than the duration of the subscribed periodic update timer of the UE, determine updated duration of the subscribed periodic update timer of the UE based on the second time parameter, and send event parameter information to a mobility management function network element, where the event parameter information includes the updated duration of the subscribed periodic update timer of the UE and the type of the second event, and the updated duration of the subscribed periodic update timer of the UE is associated with the type of the second event, or the updated duration of the subscribed periodic update timer of the UE is used for subscribing to the second event.

Optionally, if the type of the first event is loss of connectivity, when performing the monitoring management operation, the processing unit 1620 is further configured to determine duration of a first timer, where the event parameter information further includes the duration of the first timer, and the duration of the first timer is associated with the type of the first event, or the duration of the first timer is further used for subscribing to the first event.

Optionally, the duration of the first timer is a larger value between the duration of the subscribed periodic update timer of the UE and the second time parameter, or the duration of the first timer is an absolute value of a difference between the duration of the subscribed periodic update timer of the UE and the second time parameter.

Optionally, the apparatus is an HSS or a UDM function network element, and/or the mobility management function network element is a SGSN, a mobility management unit, or an access control and mobility management function network element.

It should be understood that the units in the apparatus 1600 are respectively configured to perform the actions or processing procedures performed by the user data management network element in the event subscription method or the system 100. For example, the units in the apparatus 1600 may be configured to perform the actions or processing procedures performed by the HSS in the method 600 and the UDM in the method 900. In this way, the beneficial effects in the foregoing method embodiments can also be achieved. Herein, to avoid repetition, detailed descriptions thereof are omitted.

Figure 17:
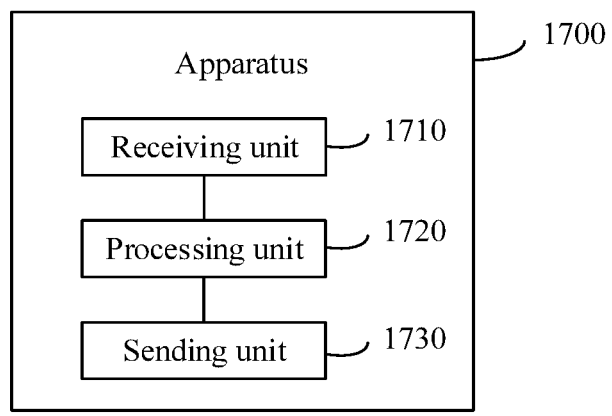
FIG. 17 is a schematic diagram of an apparatus according to this application.

FIG. 17 is a schematic block diagram of an apparatus 1700 according to an embodiment of this application. As shown in FIG. 17, the apparatus 1700 includes a receiving unit 1710, a processing unit 1720, and a sending unit 1730.

The receiving unit 1710 is configured to receive a first message, where the first message is used for subscribing to a first event, the first message includes a first time parameter and a type of the first event, and the type of the first event is used to indicate an event type of the first event.

The processing unit 1720 is configured to determine duration of a subscribed periodic update timer of user equipment UE based on the first time parameter.

The sending unit 1730 is configured to send the duration of the subscribed periodic update timer of the UE and the type of the first event to a mobility management function network element.

The receiving unit 1710 is further configured to receive a second message, where the second message is used for subscribing to a second event, the second message includes a type of the second event, and the type of the second event is used to indicate an event type of the second event.

If the type of the second event is a UE reachability event, the sending unit 1730 is further configured to send event parameter information to the mobility management function network element, where the event parameter information includes the type of the second event.

Optionally, the second message includes a second time parameter.

If the second time parameter is less than the duration of the subscribed periodic update timer of the UE, the processing unit 1720 is further configured to determine updated duration of the subscribed periodic update timer of the UE based on the second time parameter, and the event parameter information further includes the updated duration of the subscribed periodic update timer of the UE.

Optionally, if the type of the first event is a loss of connectivity event, the processing unit 1720 is further configured to determine duration of a first timer, and the event parameter information further includes the duration of the first timer, and the duration of the first timer is used for subscribing to the first event.

It should be understood that the units in the apparatus 1700 are respectively configured to perform the actions or processing procedures performed by the user data management network element in the foregoing event subscription method or the system 100. For example, the units in the apparatus 1700 may be configured to perform the actions or processing procedures performed by the HSS in the method 600 and the UDM in the method 900. In this way, the beneficial effects in the foregoing method embodiments can also be achieved. Herein, to avoid repetition, detailed descriptions thereof are omitted.

Figure 18:
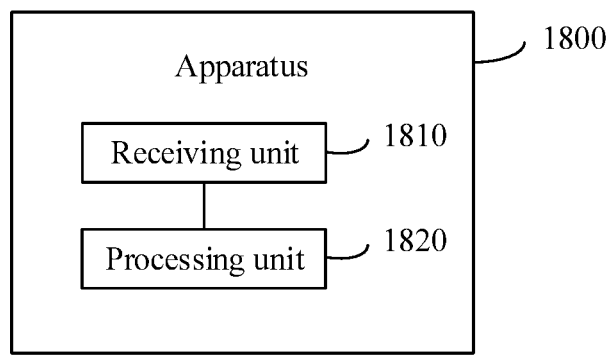
FIG. 18 is a schematic diagram of an apparatus according to this application.

FIG. 18 is a schematic block diagram of an apparatus 1800 according to an embodiment of this application. As shown in FIG. 18, the apparatus 1800 includes a receiving unit 1810 and a processing unit 1820.

The receiving unit 1810 is configured to receive duration of a subscribed periodic update timer of user equipment UE, a type of a first event, and a type of a second event, where the type of the first event is used to indicate an event type of the first event, the type of the second event is used to indicate an event type of the second event, the type of the first event is a loss of connectivity event or a UE reachability event, and the type of the second event is a loss of connectivity event or a UE reachability event.

The processing unit 1820 is configured to set a mobile reachable timer of the mobility management function network element based on the duration of the subscribed periodic update timer of the UE, and monitor the first event and the second event.

Optionally, if the type of the first event is the loss of connectivity event, the apparatus further includes a first sending unit configured to report the first event when the first event is associated with the mobile reachable timer and the mobile reachable timer expires.

Optionally, if the type of the first event is the UE reachability event, the apparatus further includes a second sending unit configured to report the first event when the processing unit detects that the UE changes to a connected mode or the UE can be paged.

Optionally, the receiving unit 1810 is further configured to receive duration of a first timer, the processing unit 1820 is further configured to set the first timer of the mobility management function network element based on the duration of the first timer, where the first timer is associated with the first event, and the apparatus further includes a third sending unit configured to report the first event when the first timer expires.

Optionally, if the type of the second event is the loss of connectivity event, the apparatus further includes a fourth sending unit configured to report the second event when the second event is associated with the mobile reachable timer and the mobile reachable timer expires.

Optionally, the receiving unit is further configured to receive duration of a first timer, the processing unit is further configured to set the first timer of the mobility management function network element based on the duration of the first timer, where the first timer is associated with the second event, and the apparatus further includes a fifth sending unit configured to report the second event when the first timer expires.

Optionally, if the type of the second event is the UE reachability event, the apparatus further includes a sixth sending unit configured to report the second event when the processing unit detects that the UE changes to the connected mode or the UE can be paged.

It should be understood that the units in the apparatus 1800 are respectively configured to perform the actions or processing procedures performed by the mobility management function network element in the foregoing event subscription method, the communication method, or the system 100. For example, the units in the apparatus 1800 may be configured to perform the actions or processing procedures performed by the MME/SGSN in the methods shown in FIG. 6A and FIG. 6B to FIG. 8, and FIG. 12A, FIG. 12B, and FIG. 12C, and performed by the AMF in the methods shown in FIG. 9A, FIG. 9B, and FIG. 9C to FIG. 11, and FIG. 13A, FIG. 13B, and FIG. 13C. In this way, the beneficial effects in the foregoing method embodiments can also be achieved. Herein, to avoid repetition, detailed descriptions thereof are omitted.

Figure 19:
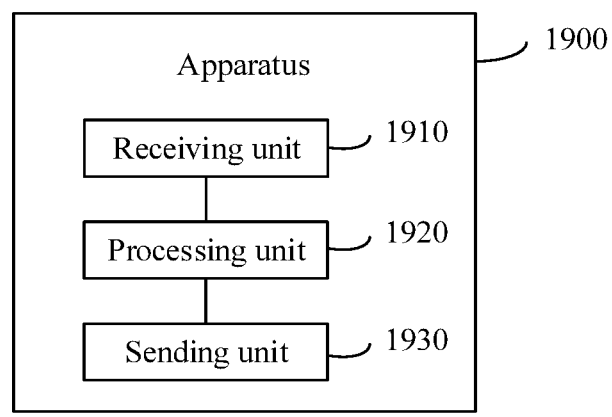
FIG. 19 is a schematic diagram of an apparatus according to this application.

FIG. 19 is a schematic block diagram of an apparatus 1900 according to an embodiment of this application. As shown in FIG. 19, the apparatus 1900 includes a receiving unit 1910, a processing unit 1920, and a sending unit 1930.

The receiving unit 1910 is configured to receive a first message from a first capability exposure function network element, where the first message is used for subscribing to a first event.

The processing unit 1920 is configured to determine whether to activate the subscription to the first event.

The sending unit 1930 is configured to if the processing unit 1920 determines to activate the subscription to the first event, send first activation indication information to the first capability exposure function network element, and send first deactivation indication information to a second capability exposure function network element, where the first activation indication information is used to indicate that the subscription to the first event is activated, and the first deactivation indication information is used to indicate that a currently activated subscription to a second event is deactivated, or the sending unit 1930 is further configured to if the processing unit 1920 determines not to activate the subscription to the first event, send, by the user data management network element, first non-activation indication information to the first capability exposure function network element, where the first non-activation indication information is used to indicate that the subscription to the first event is not activated.

The subscription to the first event and the subscription to the second event are event subscriptions for same user equipment UE.

Optionally, if the processing unit 1920 determines to activate the subscription to the first event, the receiving unit 1910 is further configured to receive an event subscription deletion request message from the first capability exposure function network element, where the event subscription deletion request message is used to delete the subscription to the first event, the processing unit 1920 is further configured to delete the subscription to the first event based on the event subscription deletion request message, and determine to activate the subscription to the second event in at least one event subscription that is currently in a to-be-activated state, and the sending unit 1920 is further configured to send second activation indication information to the second capability exposure function network element, where the second activation indication information is used to indicate that the subscription to the second event is activated.

Optionally, if the processing unit 1920 determines not to activate the subscription to the first event, the receiving unit 1910 is further configured to receive an event subscription deletion request message from the second capability exposure function network element, where the event subscription deletion request message is used to delete the subscription to the second event, the processing unit 1920 is further configured to delete the subscription to the second event based on the event subscription deletion request message, and determine to activate the subscription to the first event in at least one event subscription that is currently in a to-be-activated state, and the sending unit 1920 is further configured to send third activation indication information to the first capability exposure function network element, where the third activation indication information is used to indicate that the subscription to the first event is activated.

Optionally, when determining whether to activate the subscription to the first event, the processing unit 1920 is further configured to determine, based on a priority of the subscription to the first event, whether to activate the subscription to the first event.

Optionally, the subscription to the first event or the subscription to the second event is used to subscribe to a loss of connectivity event or a UE reachability event.

Optionally, the first capability exposure function network element and the second capability exposure function network element are a same capability exposure network element or different capability exposure network elements.

Optionally, a deactivated event subscription and a non-activated event subscription, and an event subscription in the to-be-activated state can be activated.

It should be understood that the units in the apparatus 1900 are respectively configured to perform the actions or processing procedures performed by the mobility management function network element in the foregoing event subscription method or the system 200. For example, the units in the apparatus 1900 may be configured to perform the actions or processing procedures performed by the MME/SGSN in the method shown in FIG. 14A and FIG. 14B and the AMF in the method shown in FIG. 15A and FIG. 15B. In this way, the beneficial effects in the foregoing method embodiments can also be achieved. Herein, to avoid repetition, detailed descriptions thereof are omitted.

Figure 20:
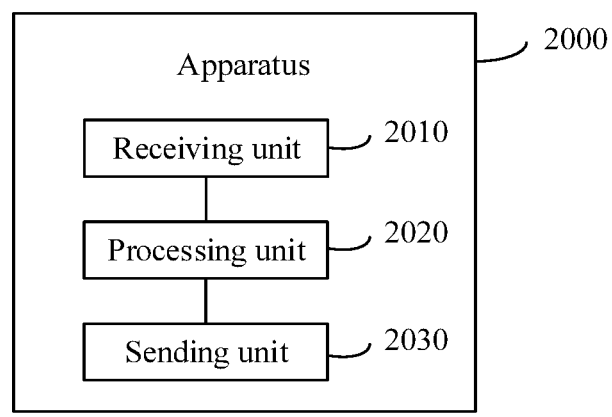
FIG. 20 is a schematic diagram of an apparatus according to this application.

FIG. 20 is a schematic block diagram of an apparatus 2000 according to an embodiment of this application. As shown in FIG. 20, the apparatus 1900 includes a receiving unit 2010, a processing unit 2020, and a sending unit 2030.

The receiving unit 2010 is configured to receive a second message, where the second message includes a second time parameter.

The processing unit 2020 is configured to if the second time parameter is less than duration of a subscribed periodic update timer of user equipment UE, determine updated duration of the subscribed periodic update timer of the UE based on the second time parameter, where the updated duration of the subscribed periodic update timer of the UE is used to update the subscribed periodic update timer of the UE, and the duration of the subscribed periodic update timer of the UE is determined based on a first time parameter in a first message received by the user data management network element.

The sending unit 2030 is configured to send the updated duration of the subscribed periodic update timer of the UE to a mobility management function network element.

Optionally, the first message includes a type of a first event, and the sending unit 2030 is further configured to send the type of the first event to the mobility management function network element, where the type of the first event is used to indicate an event type of the first event.

Optionally, if the type of the first event is a UE loss of connectivity event, the processing unit 2020 is further configured to determine duration of a first timer based on the second time parameter and/or the duration of the subscribed periodic update timer of the UE, and the sending unit 2030 is further configured to send the duration of the first timer to the mobility management function network element, where the duration of the first timer is used to set the first timer of the mobility management function network element, and the first timer is used for subscribing to the first event.

Optionally, the second message includes a second maximum response time, and if the second maximum response time is greater than a first maximum response time, the user data management network element further sends the second maximum response time to the mobility management function network element, where a maximum response time is used to indicate a time in which the UE is in a reachable state, and the first maximum response time is a maximum value in maximum response times included in all event subscription request messages for the UE, and/or the second message includes a second suggested quantity of downlink packets, and if the second suggested quantity of downlink packets is greater than a first suggested quantity of downlink packets, the user data management network element further sends the second suggested quantity of downlink packets to the mobility management function network element, where a suggested quantity of downlink packets is used to indicate a quantity of packets buffered by a network element when the UE is unreachable, and the first suggested quantity of downlink packets is a maximum value in suggested quantities, of downlink packets, included in all the event subscription request messages for the UE.

Optionally, the duration of the first timer is the duration of the subscribed periodic update timer of the UE, or the duration of the first timer is an absolute value of a difference between the duration of the subscribed periodic update timer of the UE and the second time parameter.

It should be understood that the units in the apparatus 2000 are respectively configured to perform the actions or processing procedures performed by the mobility management function network element in the foregoing communication method or the system 100. For example, the units in the apparatus 2000 may be configured to perform the actions or processing procedures performed by the MME/SGSN in the method shown in FIG. 12A, FIG. 12B, and FIG. 12C and the AMF in the method shown in FIG. 13A, FIG. 13B, and FIG. 13C. In this way, the beneficial effects in the foregoing method embodiments can also be achieved. Herein, to avoid repetition, detailed descriptions thereof are omitted.

It should be further understood that the sending units in the apparatuses shown in FIG. 16 to FIG. 20 may be implemented by the communications interface 503 or the output device 504 shown in FIG. 5, the receiving units may be implemented by the communications interface 503 or the input device 505 shown in FIG. 5, and the processing units may be implemented by the processor 501 shown in FIG. 5. Alternatively, all units in the apparatuses shown in FIG. 16 to FIG. 20 may be implemented by the processor 501 shown in FIG. 5.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the other approaches, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a Universal Serial Bus (USB) flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An event subscription method comprising:
receiving, by a user data management network element, a first message for subscribing a user equipment (UE) to a first event, wherein the first message comprises a first time parameter and a first type of the first event indicating a first event type of the first event;
determining, by the user data management network element based on the first time parameter, a first duration of a subscribed periodic timer of the UE;
sending, by the user data management network element, the first duration and the first type to a mobility management function network element;
receiving, by the mobility management function network element, the first duration and the first type;
receiving, by the user data management network element, a second message for subscribing the UE to a second event, wherein the second message comprises a second time parameter and a second type of the second event indicating a second event type of the second event;
determining, by the user data management network element when the second time parameter is less than the first duration, an updated first duration of the subscribed periodic timer based on the second time parameter;
sending, by the user data management network element to the mobility management function network element, event parameter information when the second type is a UE reachability event; and receiving, by the mobility management function network element, the event parameter information, wherein the event parameter information comprises the second type of the second event and the updated first duration of the subscribed periodic timer.

2. The event subscription method of claim 1, further comprising:
setting, by the mobility management function network element, a mobile reachable timer of the mobility management function network element based on the first duration; and
monitoring, by the mobility management function network element, the first event and the second event.

3. The event subscription method of claim 1, wherein the first type is the UE reachability event, and wherein the event subscription method further comprises:
detecting, by the mobility management function network element, that the UE changes to a connected mode or the UE becomes reachable via paging; and
reporting, by the mobility management function network element, the first event.

4. The event subscription method of claim 1, wherein the second type is the UE reachability event, and wherein the event subscription method further comprises:
detecting, by the mobility management function network element, that the UE changes to a connected mode or the UE becomes reachable via paging; and
reporting, by the mobility management function network element, the second event.

5. The event subscription method of claim 1, wherein the first type is a loss of connectivity event, wherein the event subscription method further comprises determining, by the user data management network element, the updated first duration and a second duration of a first timer based on the second time parameter, wherein the second time parameter comprises a maximum latency, wherein the event parameter information further comprises the second duration, and wherein the second duration is for subscribing to the first event.

6. The event subscription method of claim 1, wherein the first message further comprises a first maximum response time, wherein the second type is the UE reachability event, wherein the second message further comprises a second maximum response time greater than the first maximum response time, and wherein the event parameter information further comprises the second maximum response time.

7. The event subscription method of claim 1, wherein the first message further comprises a first suggested quantity of downlink packets, wherein the second type is the UE reachability event, wherein the second message further comprises a second suggested quantity of downlink packets greater than the first suggested quantity, and wherein the event parameter information further comprises the second suggested quantity.

8. An event subscription system comprising:
a user data management network element configured to:
receive a first message for subscribing a user equipment (UE) to a first event, wherein the first message comprises a first time parameter and a first type of the first event indicating an event type of the first event;
determine, based on the first time parameter, a first duration of a subscribed periodic timer of the UE; and
send the first duration and the first type; and a mobility management function network element coupled to the user data management network element and configured to receive the first duration and the first type,
wherein the user data management network element is further configured to:
receive a second message for subscribing the UE to a second event, wherein the second message comprises a second time parameter and a second type of the second event indicating an event type of the second event;
determine, when the second time parameter is less than the first duration, an updated first duration of the subscribed periodic timer based on the second time parameter; and
send, to the mobility management function network element, event parameter information when the second type is a UE reachability event,
wherein the mobility management function network element is further configured to receive the event parameter information, and wherein the event parameter information comprises the second type of the second event and the updated first duration of the subscribed periodic timer.

9. The event subscription system of claim 8, wherein the mobility management function network element is further configured to:
set a mobile reachable timer of the mobility management function network element based on the first duration; and
monitor the first event and the second event based on the mobile reachable timer.

10. The event subscription system of claim 8, wherein the mobility management function network element is further configured to:
detect that the UE changes to a connected mode or the UE becomes reachable via paging; and
report the first event, wherein the first type is the UE reachability event.

11. The event subscription system of claim 8, wherein the second type is the UE reachability event, and wherein the mobility management function network element is further configured to:
detect that the UE changes to a connected mode or the UE becomes reachable via paging; and
report the second event.

12. The event subscription system of claim 8, wherein the first message further carries a first maximum response time, wherein the second type is the UE reachability event, wherein the second message further comprises a second maximum response time greater than the first maximum response time, and wherein the event parameter information further comprises the second maximum response time.

13. The event subscription system of claim 8, wherein the first message further carries a first suggested quantity of downlink packets for a network element to buffer when the UE is unreachable, wherein the second type is the UE reachability event, wherein the second message further comprises a second suggested quantity of downlink packets for the network element to buffer when the UE is unreachable, wherein the second suggested quantity is greater than the first suggested quantity of downlink packets, and wherein the event parameter information further comprises the second suggested quantity of downlink packets.

14. An apparatus comprising:
a non-transitory computer computer-readable storage medium configured to store instructions; and a processor coupled to the non-transitory computer computer-readable storage medium and configured to execute the instructions to cause the apparatus to:

receive a first message for subscribing a user equipment (UE) to a first event, wherein the first message comprises a first time parameter and a first type of the first event indicating an event type of the first event;

determine, based on the first time parameter, a first duration of a subscribed periodic timer of the UE;

send the first duration and the first type to a mobility management function network element;

receive a second message for subscribing the UE to a second event, wherein the second message comprises a second time parameter and a second type of the second event indicating an event type of the second event;

determine, when the second time parameter is less than the first duration, an updated first duration of the subscribed periodic timer based on the second time-parameter; and send, to the mobility management function network element, event parameter information when the second type of the second event is a UE reachability event, wherein the event parameter information comprises the second type of the second event and the updated first duration of the subscribed periodic timer.

15. The apparatus of claim 14, wherein the first message further carries a first maximum response time, wherein the second type is the UE reachability event, wherein the second message further comprises a second maximum response time greater than the first maximum response time, and wherein the event parameter information further comprises the second maximum response time.

16. The apparatus of claim 14, wherein the first message further carries a first suggested quantity of downlink packets, wherein the second type is the UE reachability event, wherein the second message further comprises a second suggested quantity of downlink packets greater than the first suggested quantity of downlink packets, and wherein the event parameter information further comprises the second suggested quantity of downlink packets.

17. The apparatus of claim 14, wherein the first type is a loss of connectivity event, wherein the processor is configured to execute the instructions to further cause the apparatus to determine a second duration of a first timer, wherein the event parameter information further comprises the second duration, and wherein the second duration is used for subscribing to the first event.

18. An event subscription method comprising:

receiving, by a user data management network element, a first message for subscribing a user equipment (UE) to a first event, wherein the first message comprises a first time parameter and a first type of the first event indicating a first event type of the first event;

determining, by the user data management network element based on the first time parameter, a first duration of a subscribed periodic timer of the UE;

sending, by the user data management network element, the first duration and the first type to a mobility management function network element;

receiving, by the user data management network element, a second message for subscribing the UE to a second event, wherein the second message comprises a second time parameter and a second type of the second event indicating a second event type of the second event;

determining, by the user data management network element when the second time parameter is less than the first duration, an updated first duration of the subscribed periodic timer based on the second time parameter; and sending, by the user data management network element to the mobility management function network element, event parameter information when the second type is a UE reachability event, wherein the event parameter information comprises the second type of the second event and the updated first duration of the subscribed periodic timer.

19. The event subscription method of claim 18, wherein the first message further carries a first maximum response time, wherein the second type is the UE reachability event, wherein the second message further comprises a second maximum response time greater than the first maximum response time, and wherein the event parameter information further comprises the second maximum response time.

20. The event subscription method of claim 18, wherein the first message further carries a first suggested quantity of downlink packets, wherein the second type is the UE reachability event, wherein the second message further comprises a second suggested quantity of downlink packets greater than the first suggested quantity of downlink packets, and wherein the event parameter information further comprises the second suggested quantity of downlink packets.

* * * * *